United States Patent
Sakai et al.

(10) Patent No.: US 10,437,106 B2
(45) Date of Patent: Oct. 8, 2019

(54) LIQUID CRYSTAL DISPLAY PANEL WHEREIN A THICKNESS DIRECTION RETARDATION OF AT LEAST ONE OF A FIRST, SECOND, THIRD, AND FOURTH PHASE DIFFERENCE PLATE HAS A NEGATIVE VALUE

(71) Applicant: SHARP KABUSHIKI KAISHA, Sakai, Osaka (JP)

(72) Inventors: Akira Sakai, Sakai (JP); Kohzoh Nakamura, Sakai (JP); Masahiro Hasegawa, Sakai (JP); Takako Koide, Sakai (JP); Kiyoshi Minoura, Sakai (JP)

(73) Assignee: SHARP KABUSHIKI KAISHA, Sakai, Osaka (JP)

( * ) Notice: Subject to any disclaimer, the term of this patent is extended or adjusted under 35 U.S.C. 154(b) by 0 days.

(21) Appl. No.: 15/750,157

(22) PCT Filed: Jul. 28, 2016

(86) PCT No.: PCT/JP2016/072171
§ 371 (c)(1),
(2) Date: Feb. 2, 2018

(87) PCT Pub. No.: WO2017/022623
PCT Pub. Date: Feb. 9, 2017

(65) Prior Publication Data
US 2018/0231844 A1     Aug. 16, 2018

(30) Foreign Application Priority Data
Aug. 4, 2015 (JP) ................................. 2015-154329

(51) Int. Cl.
*G02F 1/13363* (2006.01)
*G02F 1/1335* (2006.01)
(Continued)

(52) U.S. Cl.
CPC ...... *G02F 1/133634* (2013.01); *G02B 5/3083* (2013.01); *G02F 1/1337* (2013.01);
(Continued)

(58) Field of Classification Search
CPC ........ G02F 2001/133567; G02F 2001/133738; G02F 2413/06; G02F 2413/11;
(Continued)

(56) References Cited

U.S. PATENT DOCUMENTS

2007/0279553 A1* 12/2007 Yoda ................... G02F 1/13363
349/96
2008/0018834 A1    1/2008 Matsushima et al.
(Continued)

FOREIGN PATENT DOCUMENTS

| JP | 2005-321615 A | 11/2005 |
| JP | 2006-267625 A | 10/2006 |
| JP | 2008-026420 A | 2/2008 |
| JP | 2012-173672 A | 9/2012 |
| JP | 2013-509612 A | 3/2013 |
| WO | 2011/053082 A2 | 5/2011 |

*Primary Examiner* — Paul C Lee
(74) *Attorney, Agent, or Firm* — ScienBiziP, P.C.

(57) ABSTRACT

A liquid crystal display panel (100A) includes a first polarizing plate (22) and a first phase difference plate (32a) disposed on an observer side, and a second polarizing plate (24) and a second phase difference plate (34a) disposed on a back surface side. And of a liquid crystal layer having a homogeneous alignment when no electrical field is applied is 360 nm or greater and 490 nm or less, and an in-plane retardation R1 of the first phase difference plate is 100 nm or greater and 160 nm or less. A thickness direction retardation of at least one of the first and second phase difference plates has a negative value. The slow axes of the first and second phase difference plates are substantially parallel to each other and substantially orthogonal to an azimuthal direction of the liquid crystal director.

24 Claims, 66 Drawing Sheets

(51) Int. Cl.
*G02F 1/1337* (2006.01)
*G02B 5/30* (2006.01)
*G02F 1/1343* (2006.01)

(52) U.S. Cl.
CPC .... *G02F 1/13363* (2013.01); *G02F 1/133528* (2013.01); *G02F 1/134363* (2013.01); *G02F 2001/133541* (2013.01); *G02F 2001/133562* (2013.01); *G02F 2001/133567* (2013.01); *G02F 2001/133638* (2013.01); *G02F 2001/133738* (2013.01); *G02F 2413/02* (2013.01); *G02F 2413/04* (2013.01); *G02F 2413/05* (2013.01); *G02F 2413/06* (2013.01); *G02F 2413/11* (2013.01); *G02F 2413/12* (2013.01); *G02F 2413/13* (2013.01); *G02F 2413/14* (2013.01)

(58) Field of Classification Search
CPC ..... G02F 2001/133541; G02F 2413/04; G02F 2413/13
See application file for complete search history.

(56) References Cited

U.S. PATENT DOCUMENTS

| | | | |
|---|---|---|---|
| 2009/0153783 A1* | 6/2009 | Umemoto | G02B 27/28 349/96 |
| 2009/0207363 A1* | 8/2009 | Hirosawa | G02F 1/134363 349/139 |
| 2012/0218497 A1 | 8/2012 | Kajita | |

* cited by examiner

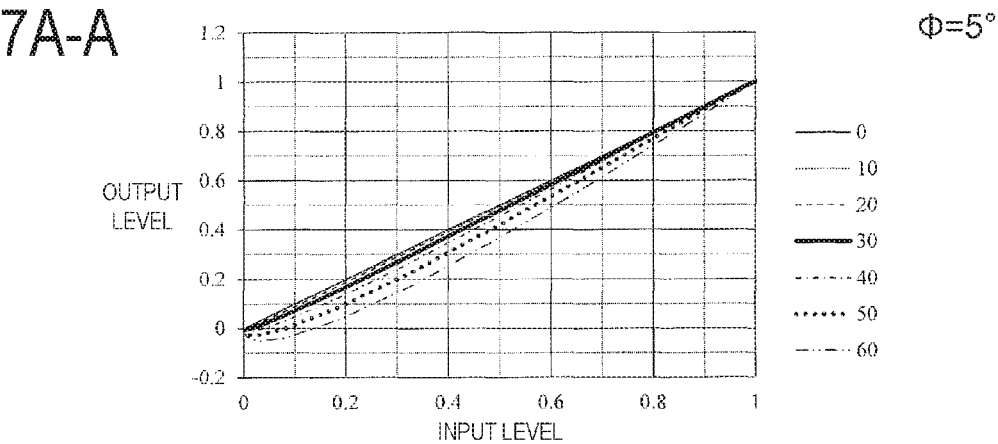
FIG. 7A-A  Φ=5°
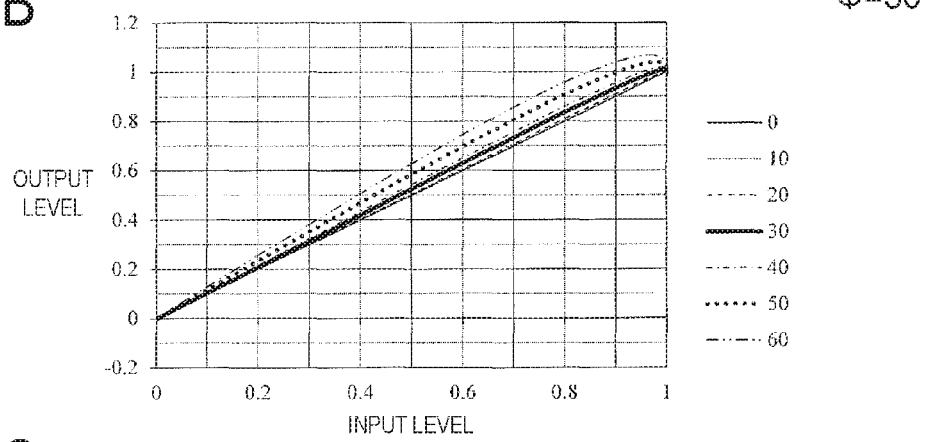
FIG. 7A-B  Φ=50°
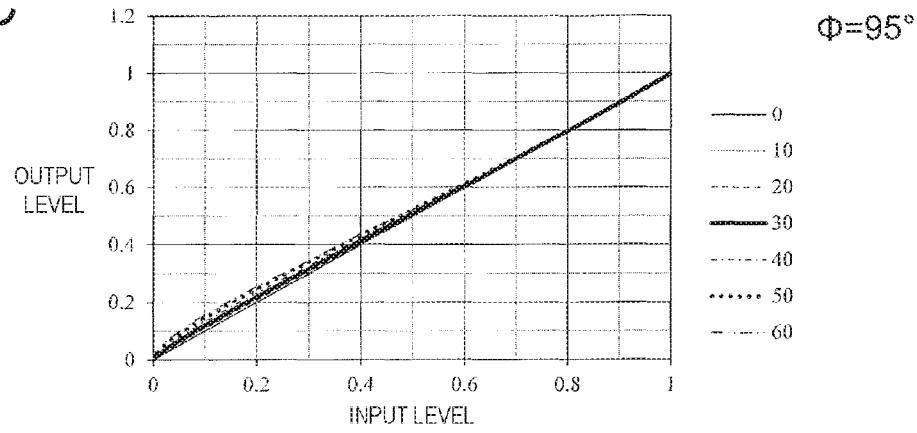
FIG. 7A-C  Φ=95°

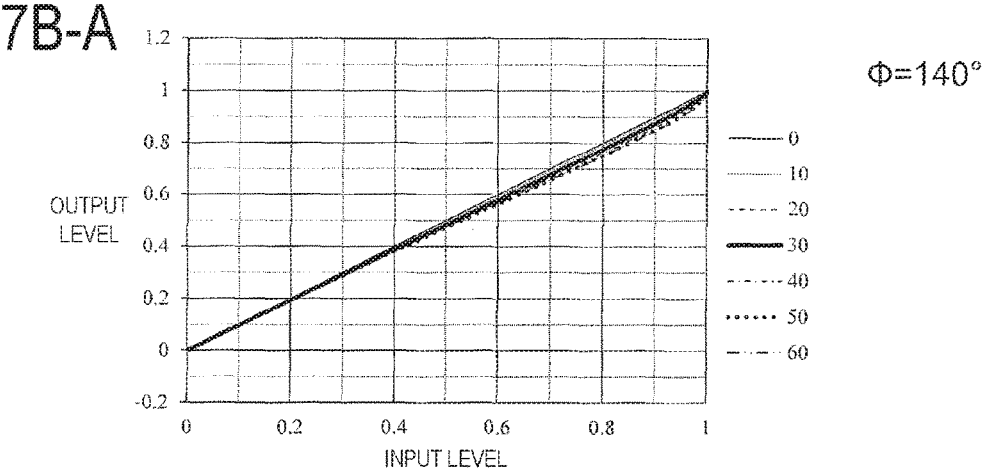
FIG. 7B-A  Φ=140°
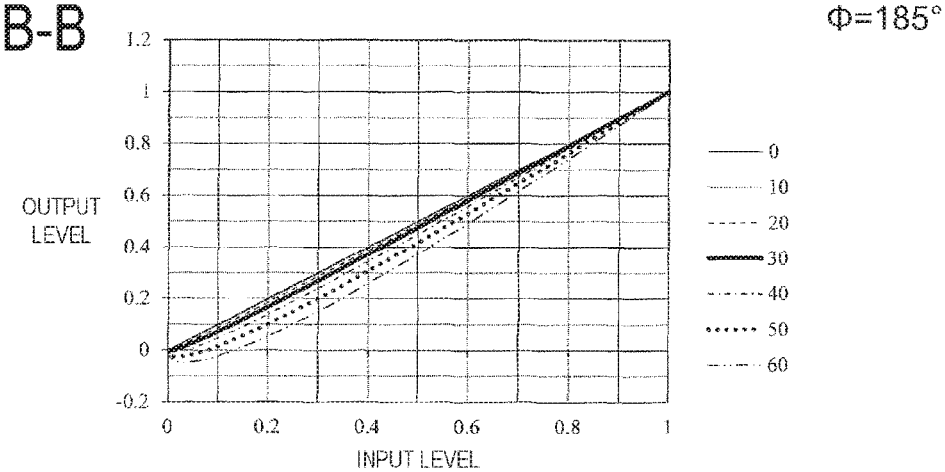
FIG. 7B-B  Φ=185°
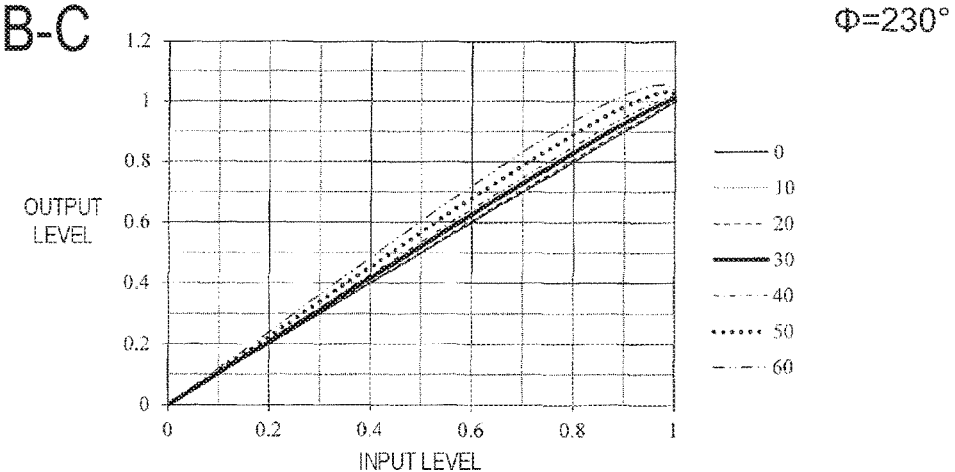
FIG. 7B-C  Φ=230°

FIG. 7C-A
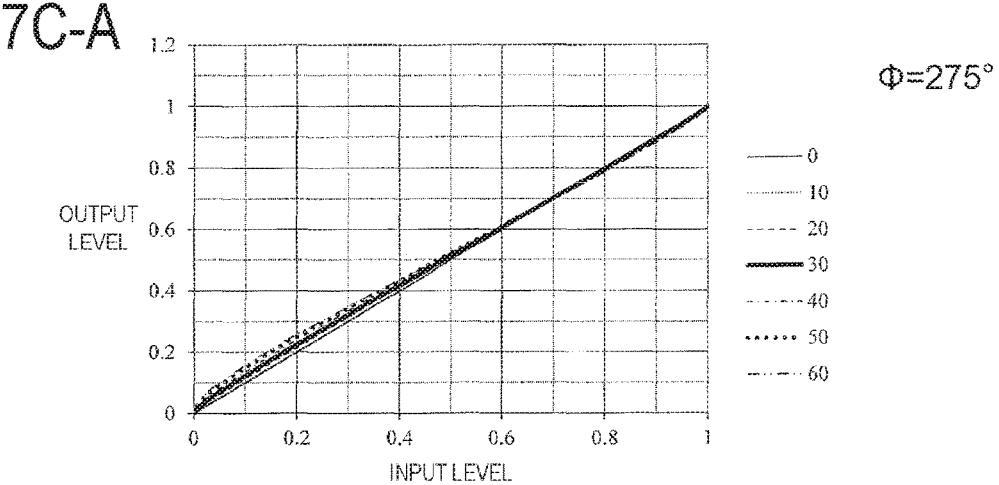
Φ=275°
FIG. 7C-B
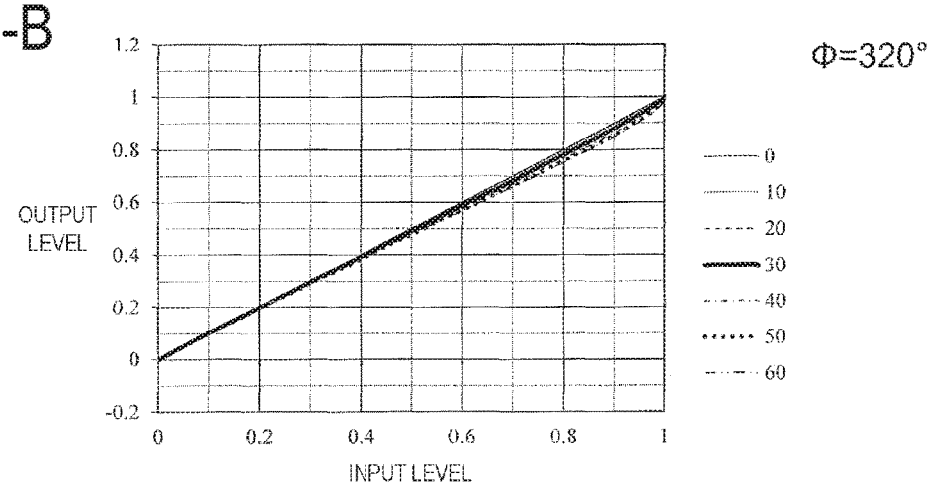
Φ=320°

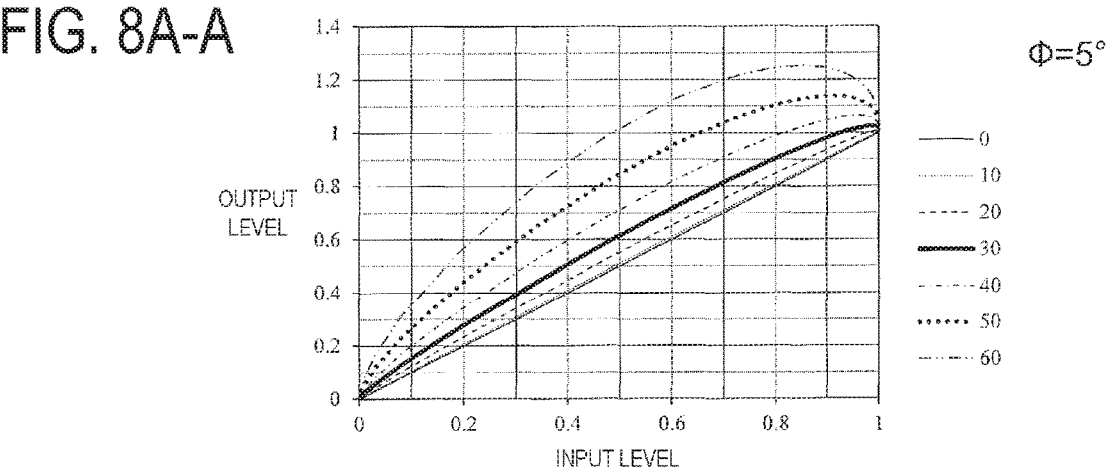
FIG. 8A-A
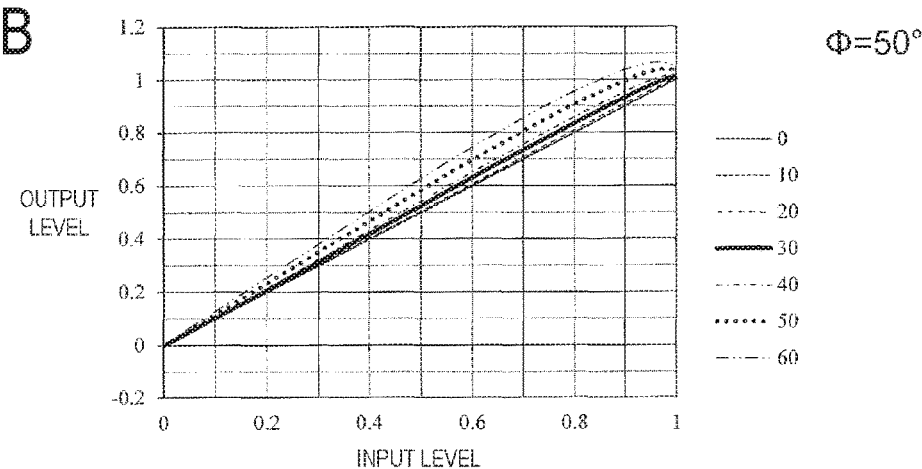
FIG. 8A-B
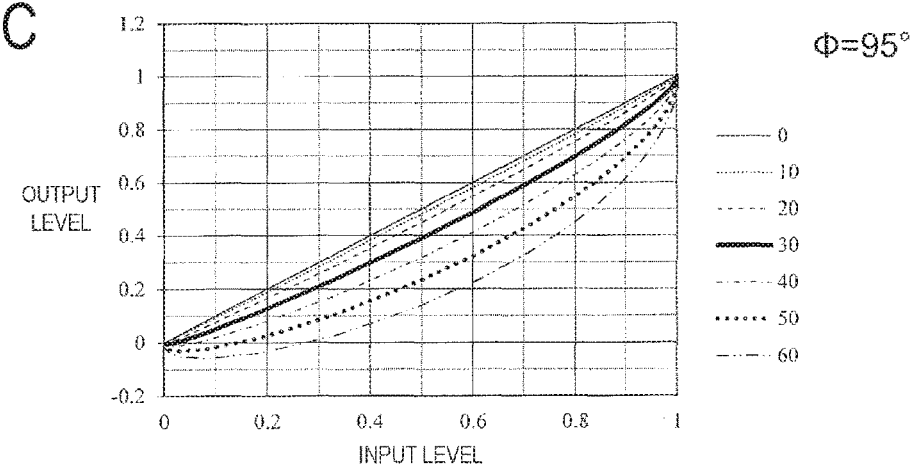
FIG. 8A-C

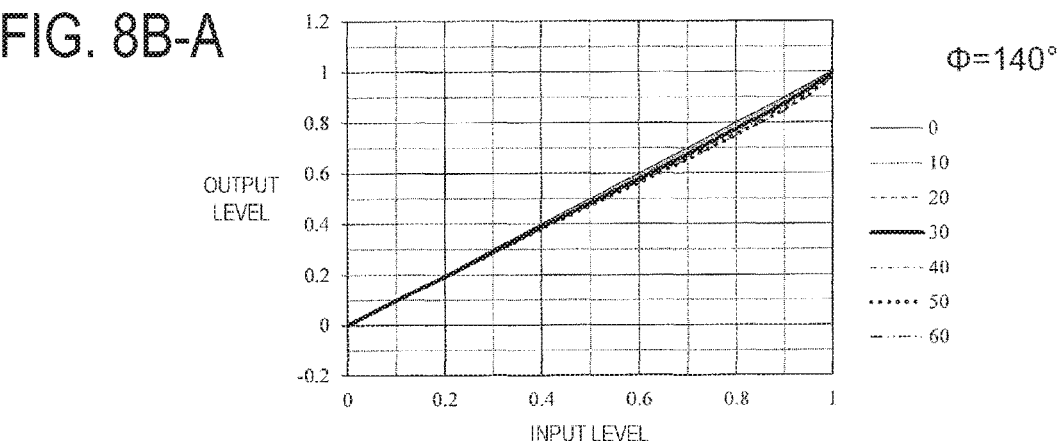
FIG. 8B-A
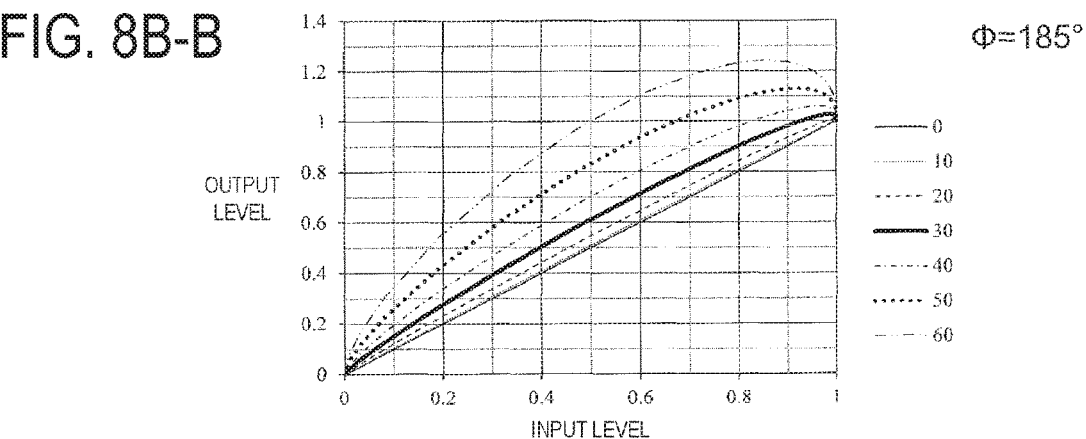
FIG. 8B-B
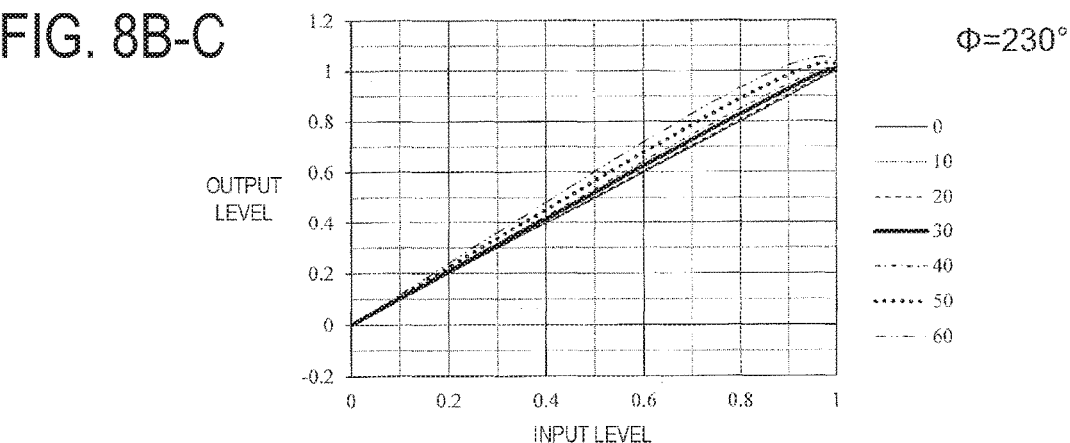
FIG. 8B-C

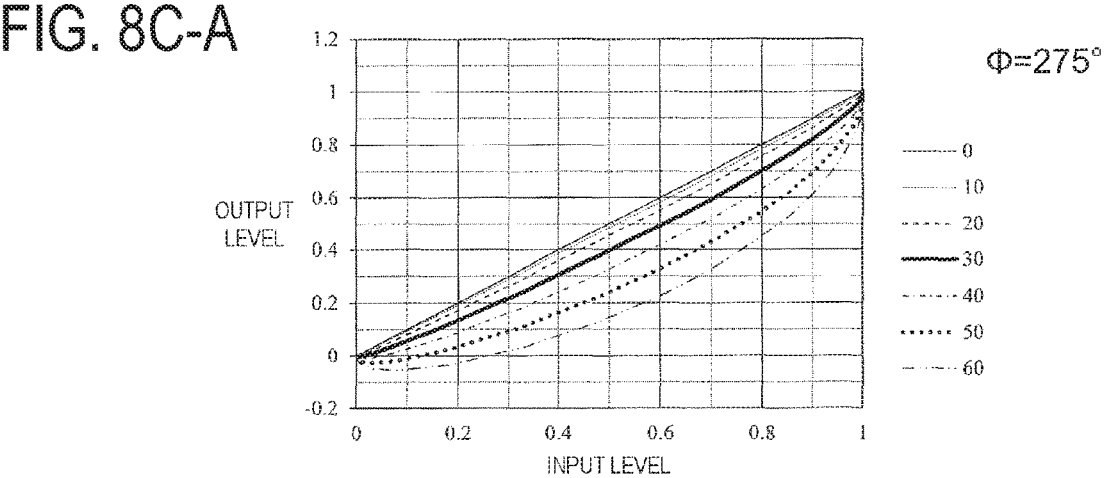
FIG. 8C-A
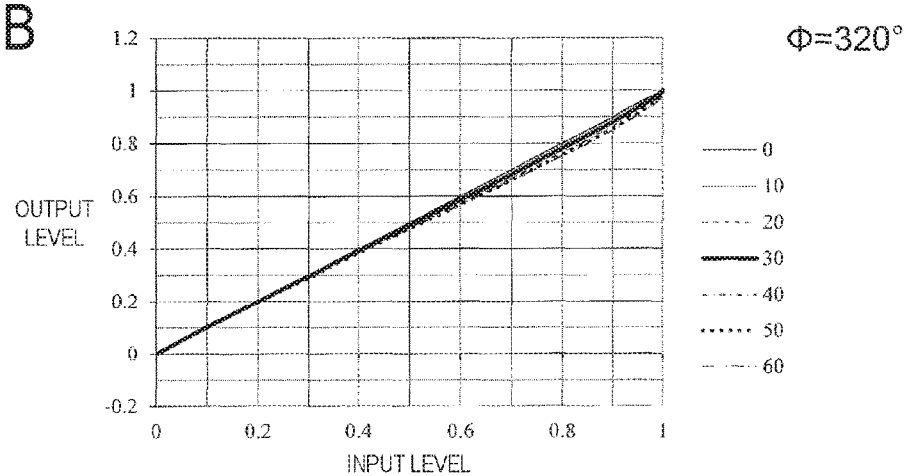
FIG. 8C-B

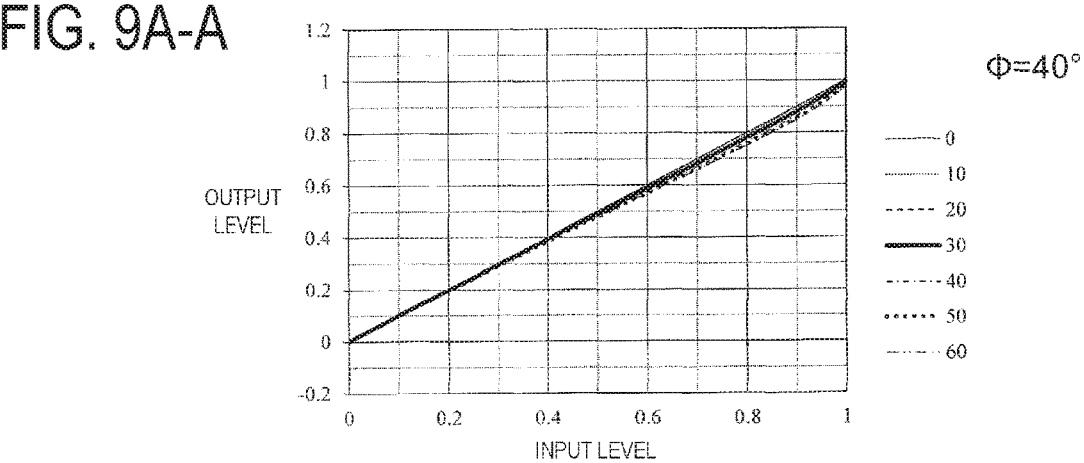
FIG. 9A-A
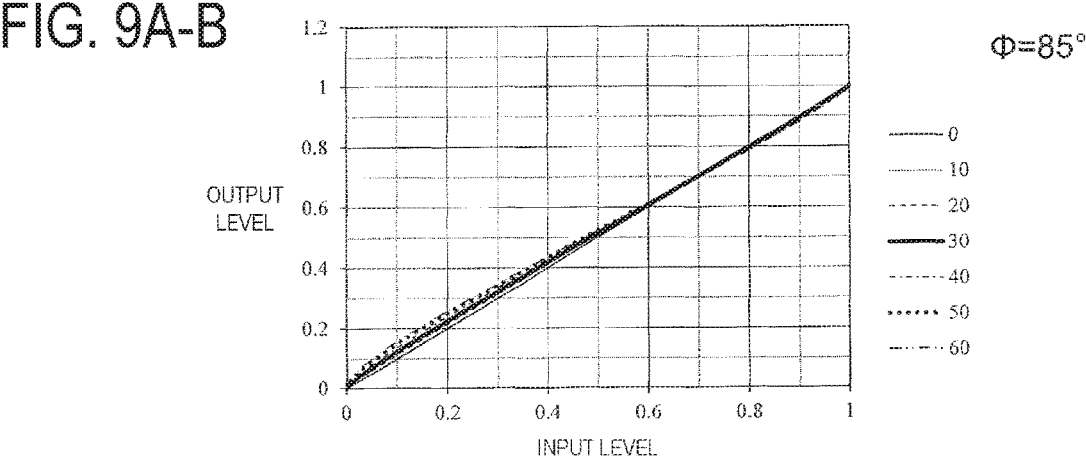
FIG. 9A-B
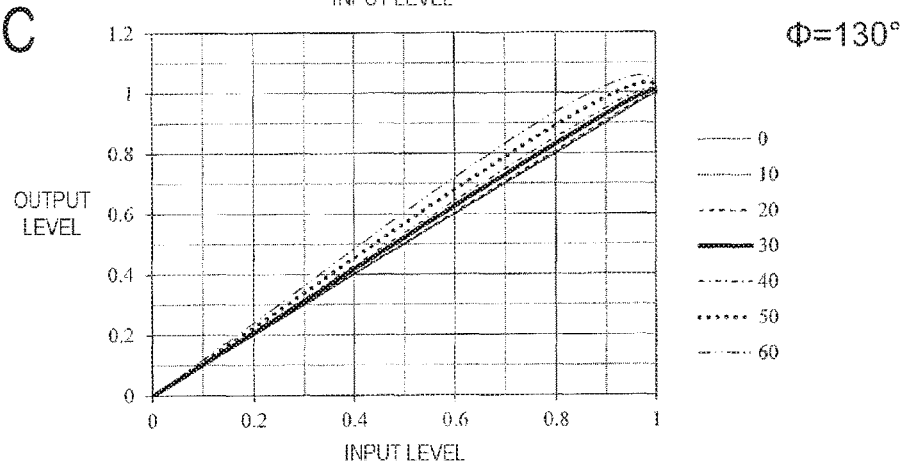
FIG. 9A-C

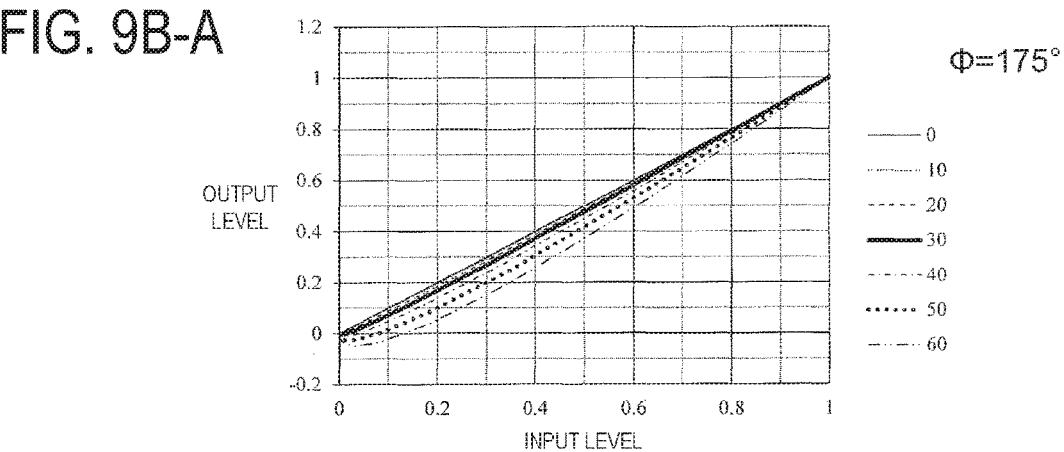
FIG. 9B-A
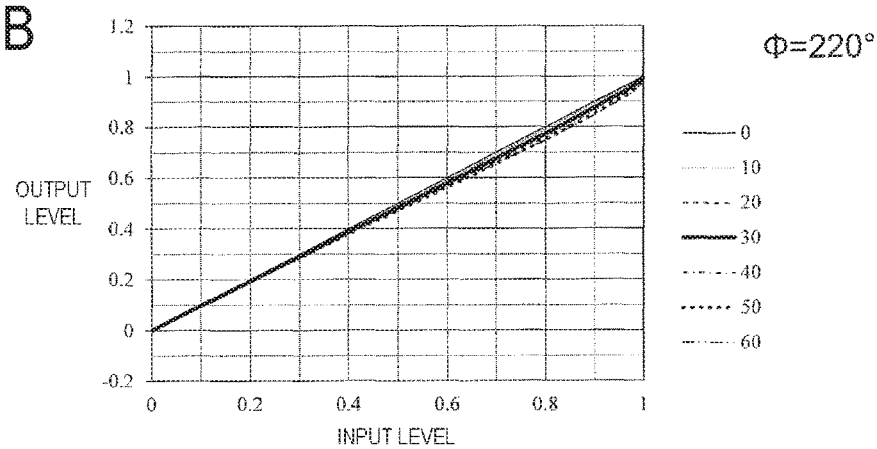
FIG. 9B-B
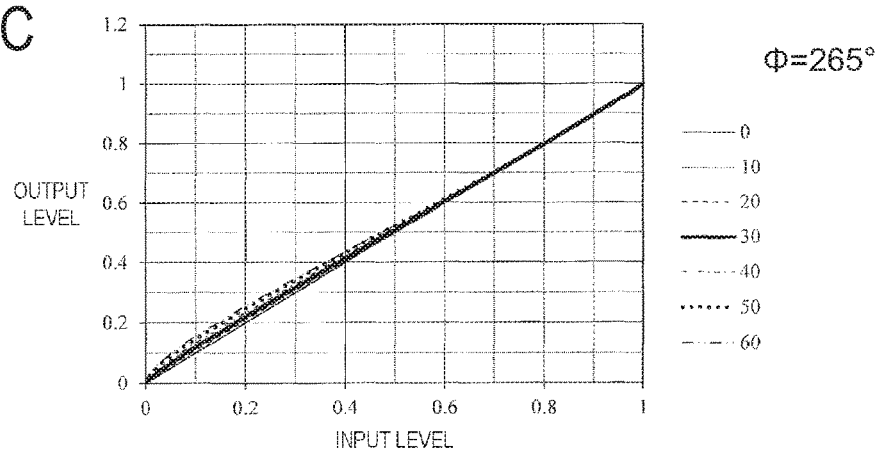
FIG. 9B-C

FIG. 9C-A
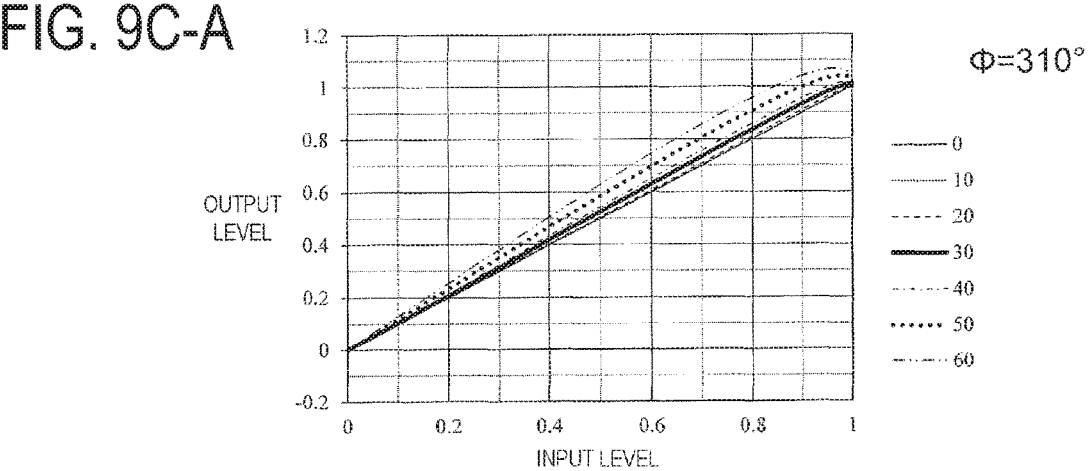
FIG. 9C-B
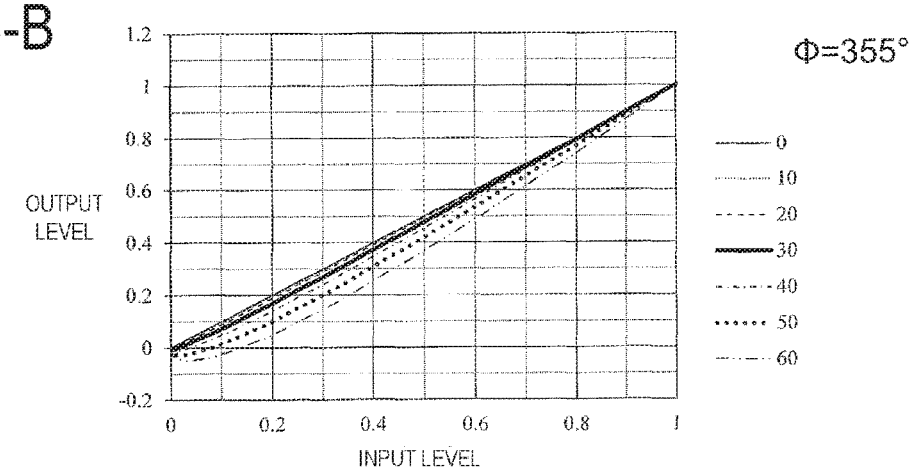

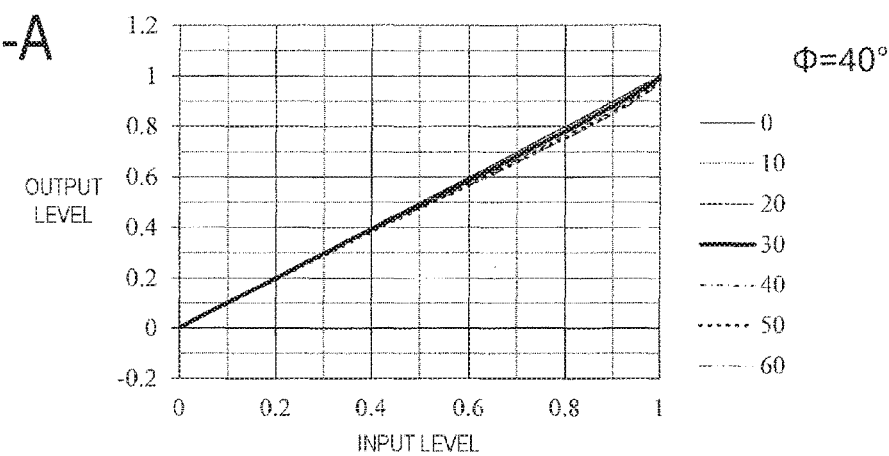
FIG. 10A-A
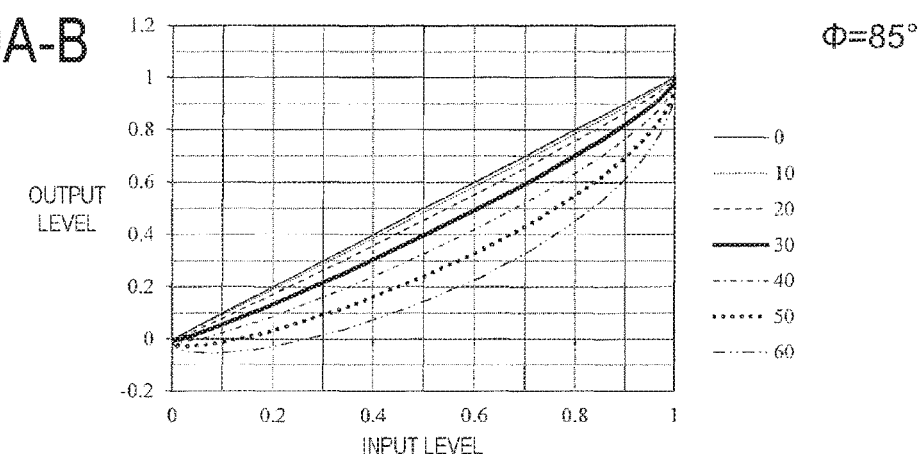
FIG. 10A-B
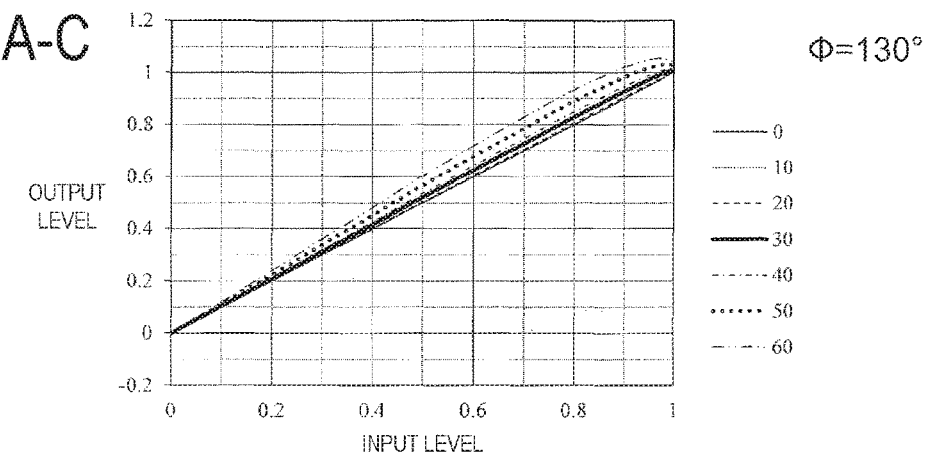
FIG. 10A-C

FIG. 10B-A
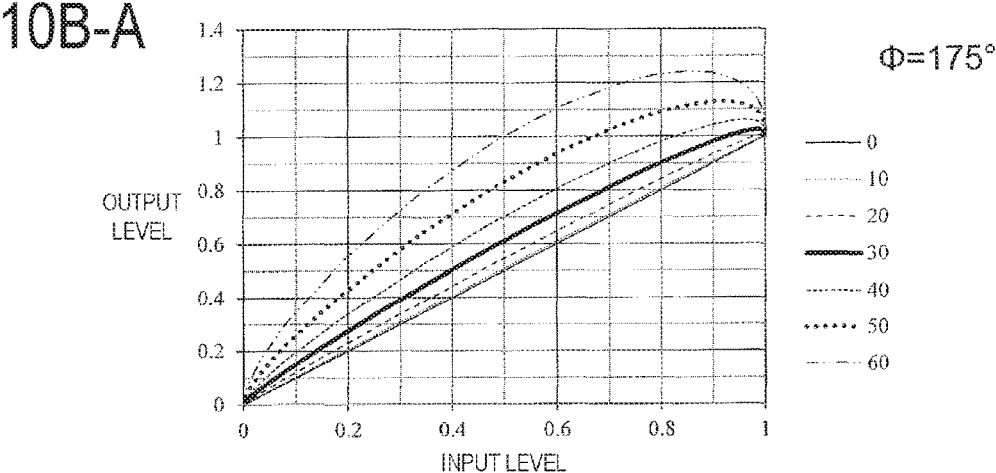
FIG. 10B-B
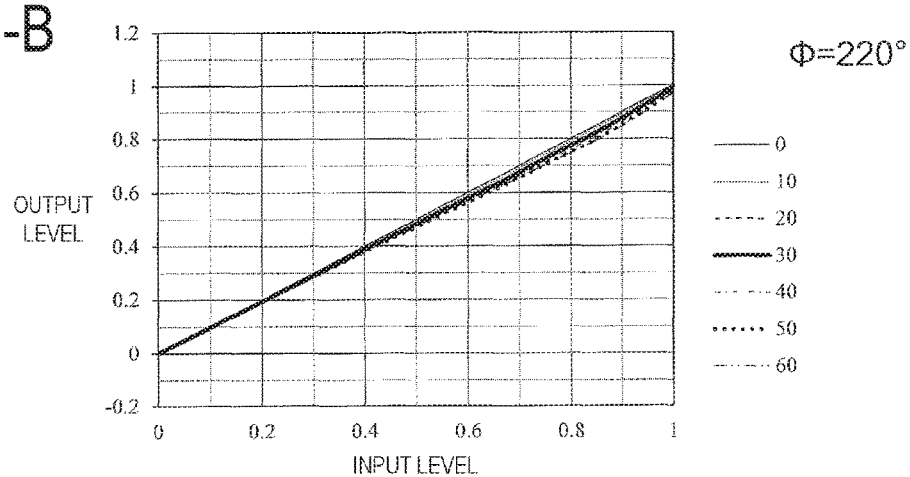
FIG. 10B-C
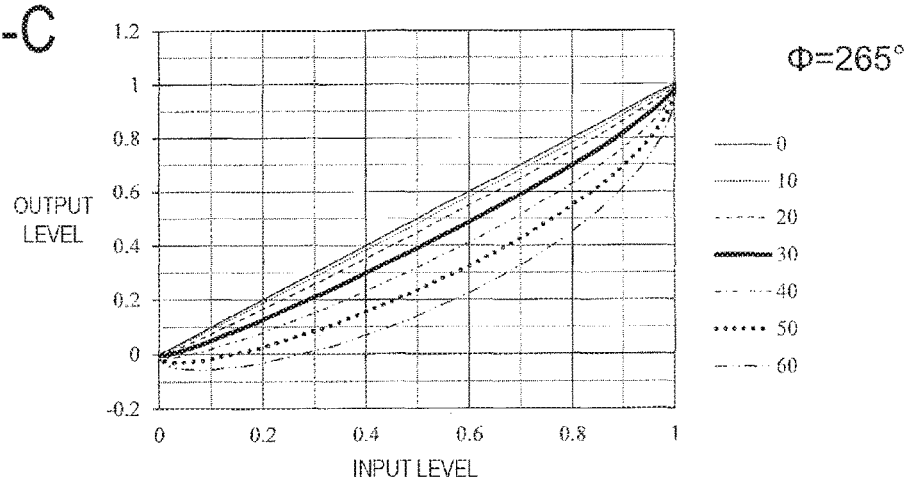

FIG. 10C-A
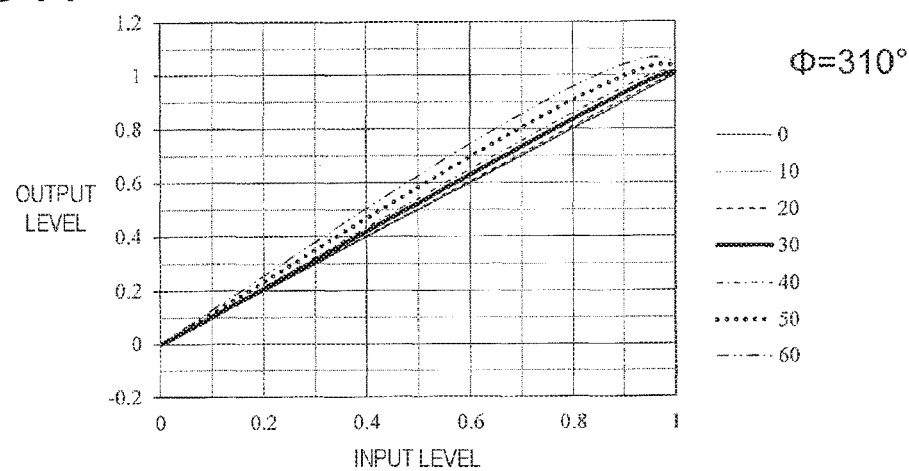
FIG. 10C-B
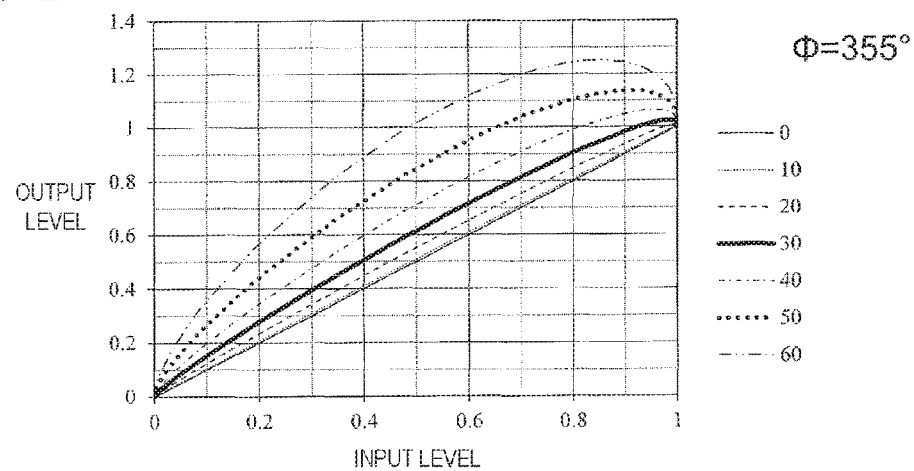

FIG. 16A-A
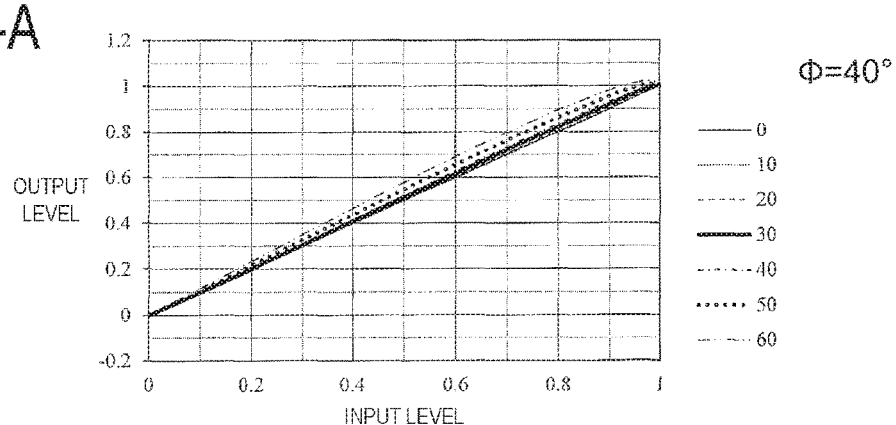
FIG. 16A-B
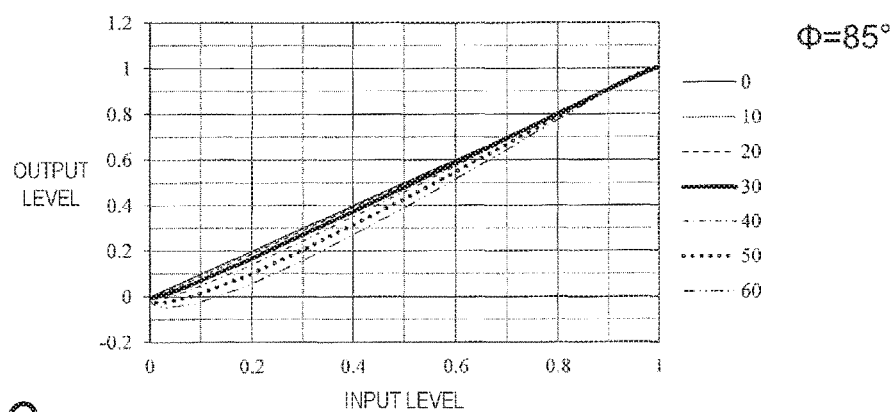
FIG. 16A-C
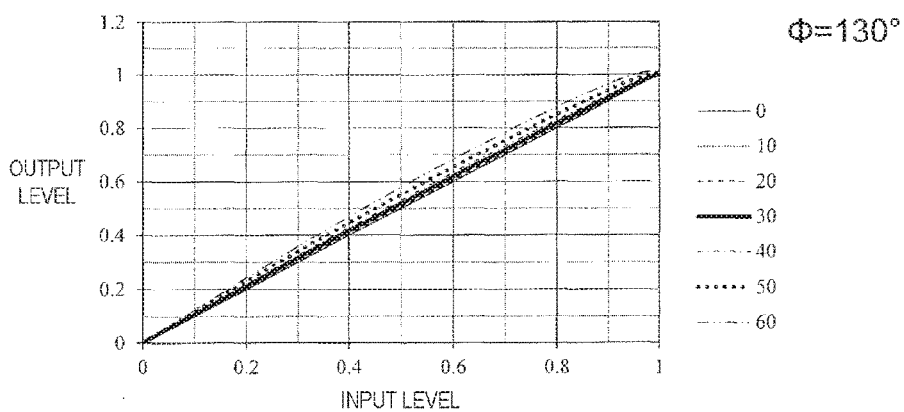

FIG. 16B-A
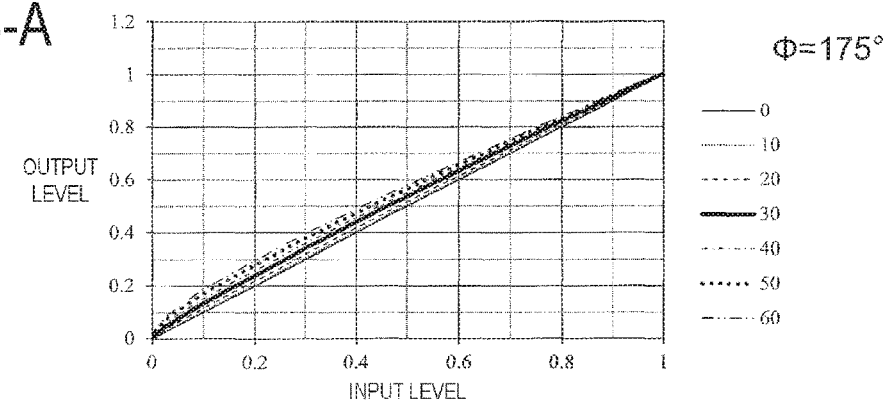
FIG. 16B-B
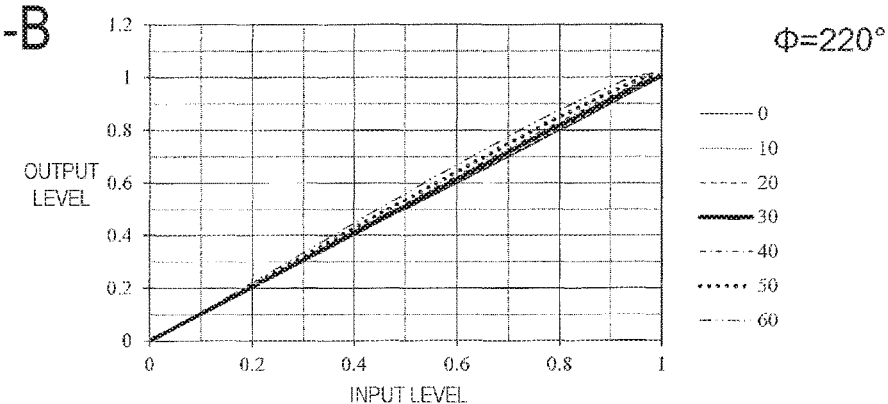
FIG. 16B-C
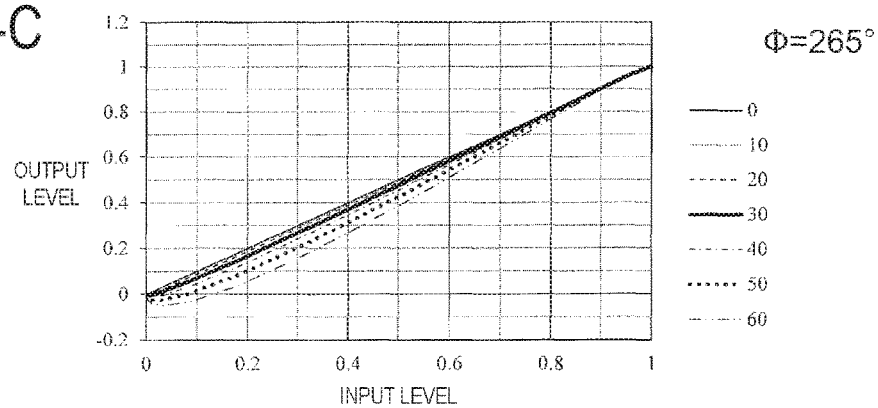

FIG. 16C-A
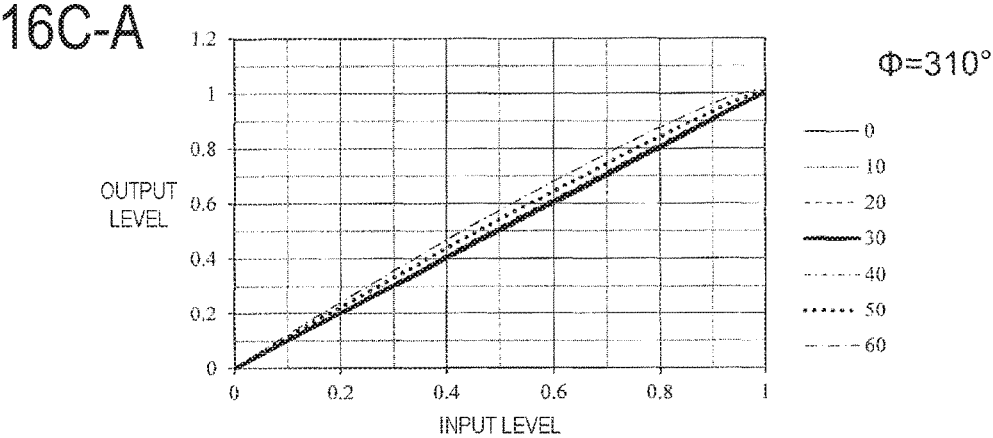
FIG. 16C-B
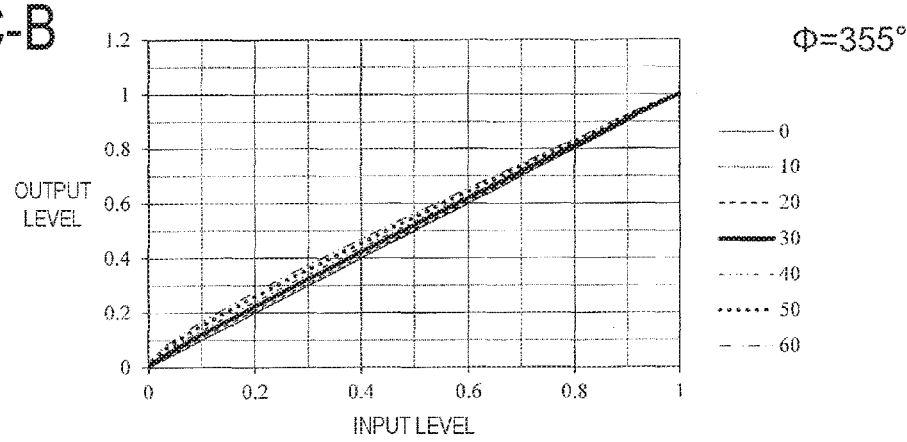

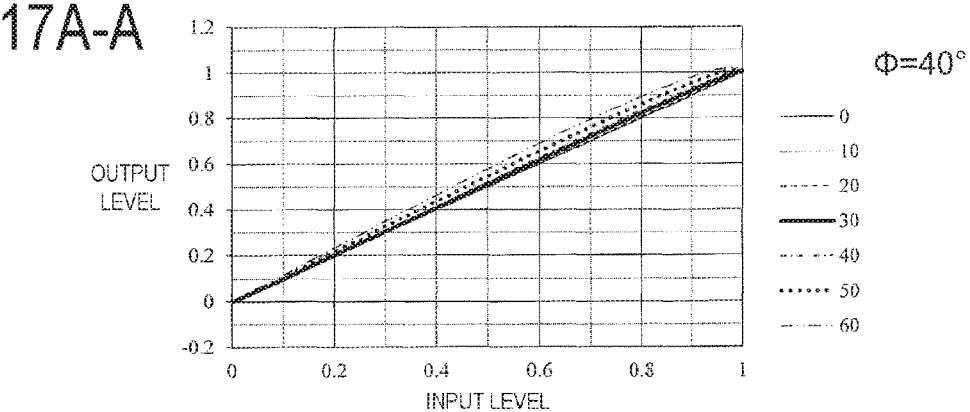
FIG. 17A-A
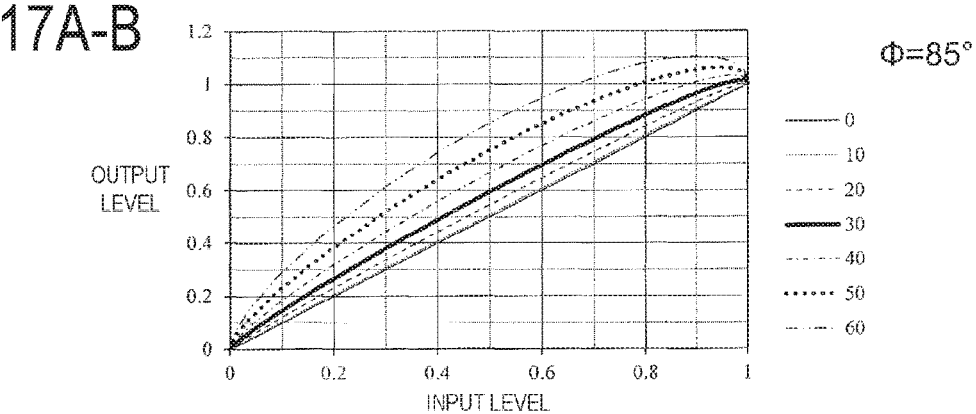
FIG. 17A-B
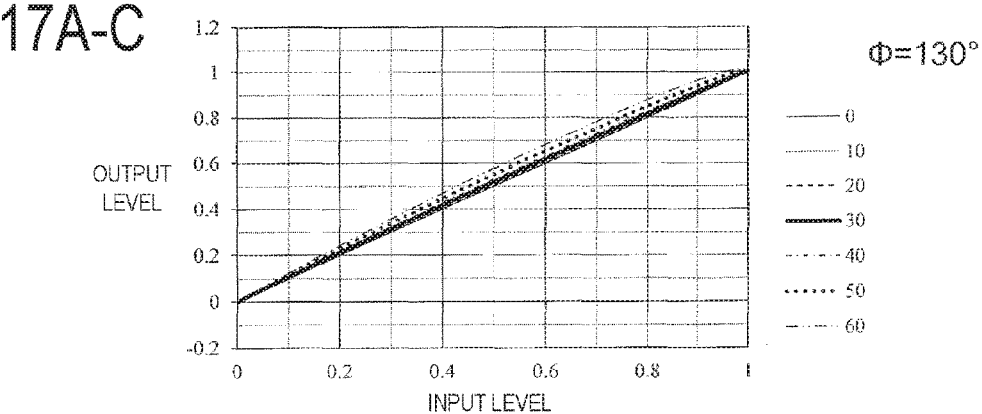
FIG. 17A-C

FIG. 17B-A
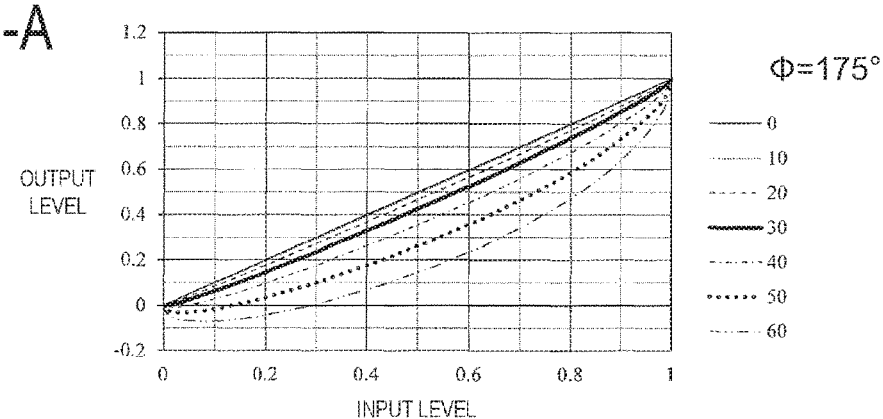
FIG. 17B-B
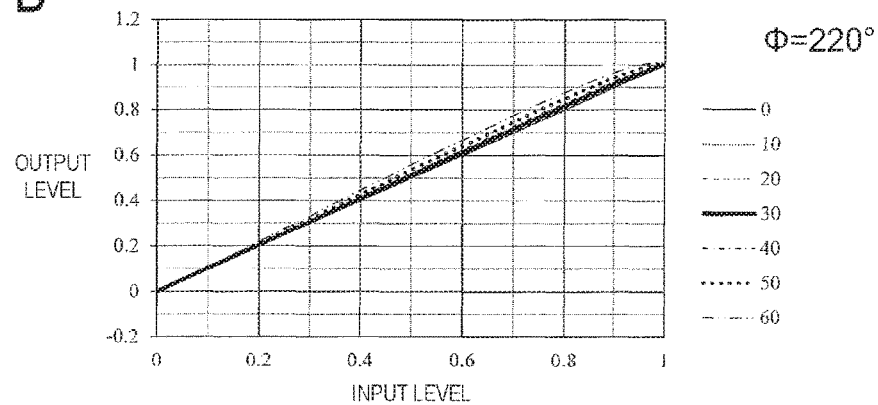
FIG. 17B-C
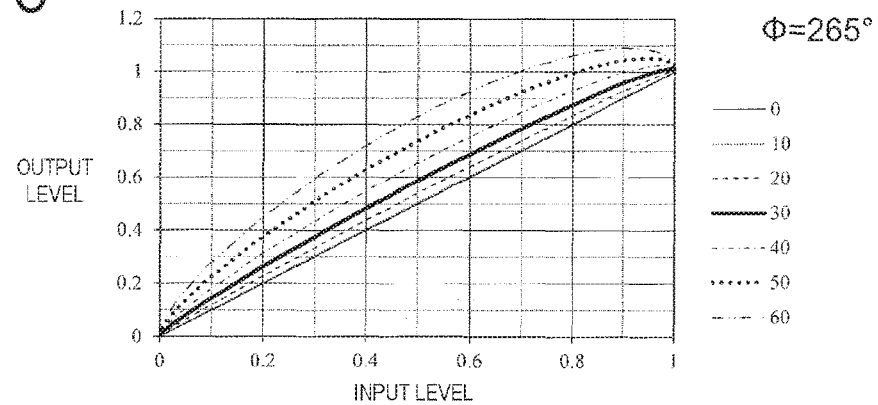

FIG. 17C-A
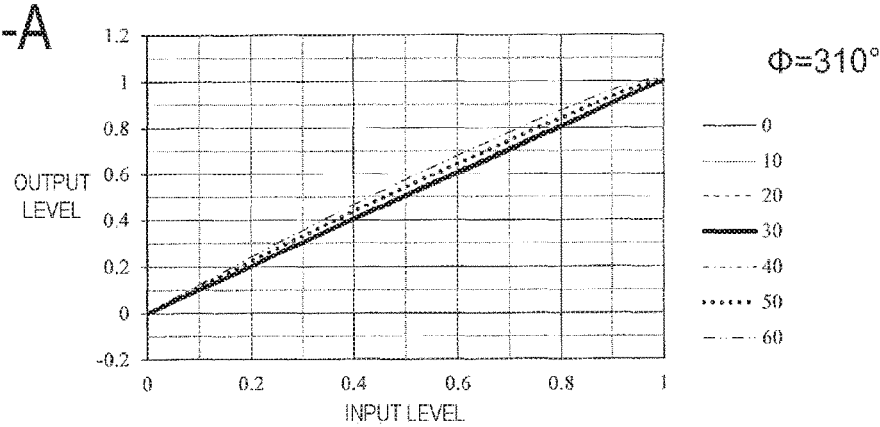
FIG. 17C-B
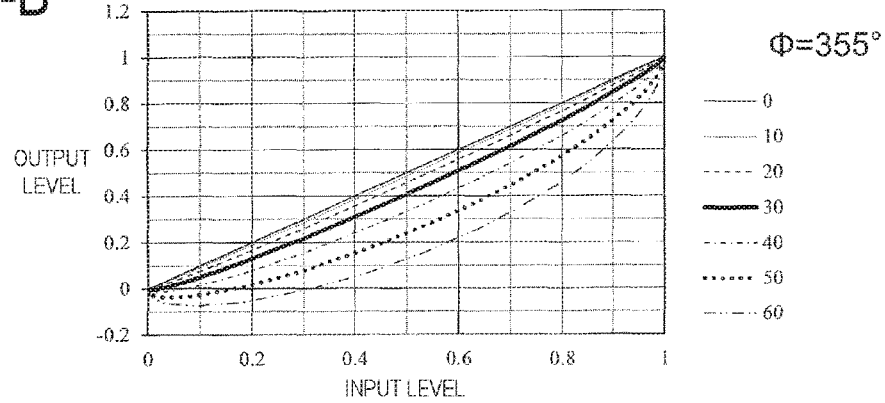

FIG. 18A-A
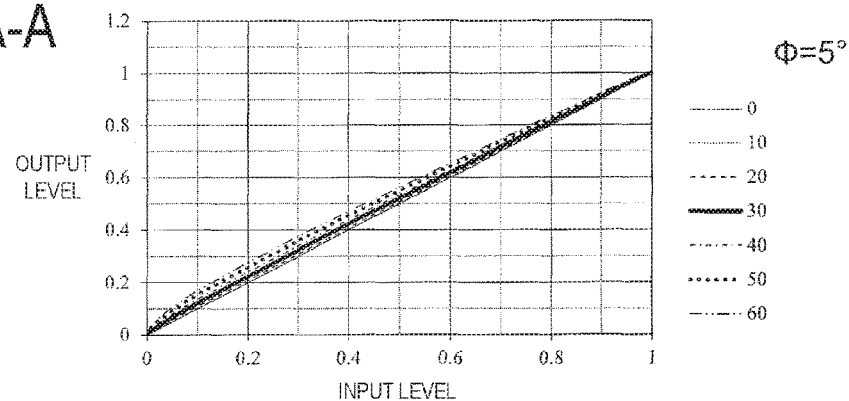
FIG. 18A-B
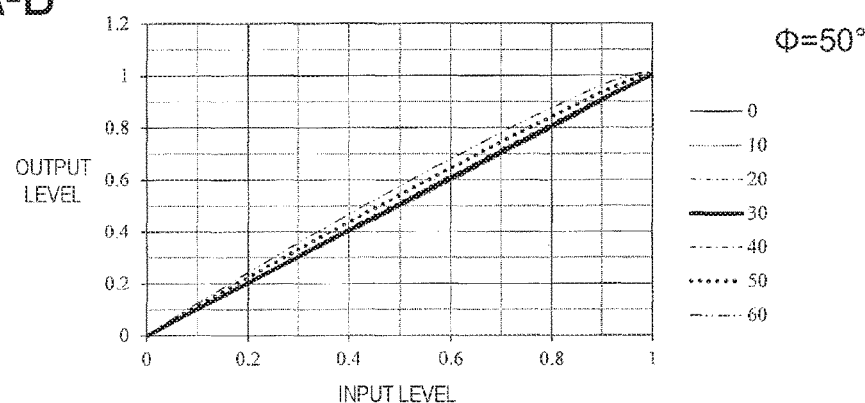
FIG. 18A-C
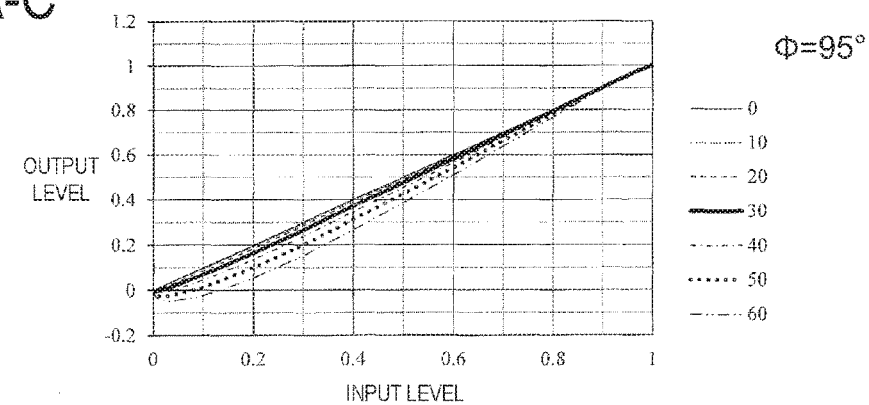

FIG. 18B-A
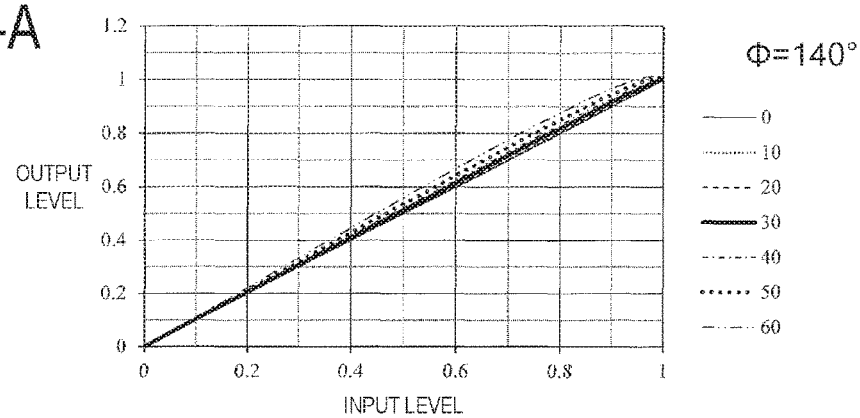
FIG. 18B-B
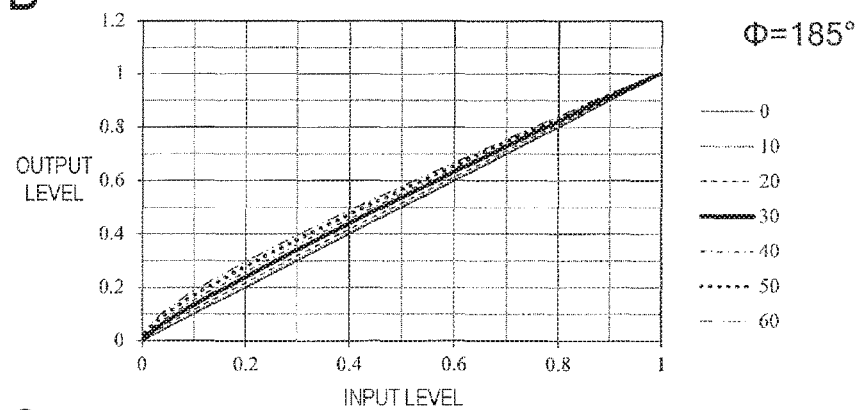
FIG. 18B-C
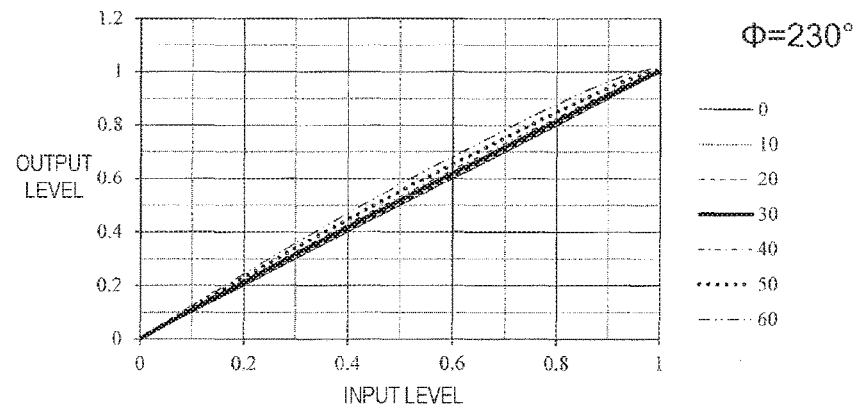

FIG. 18C-A
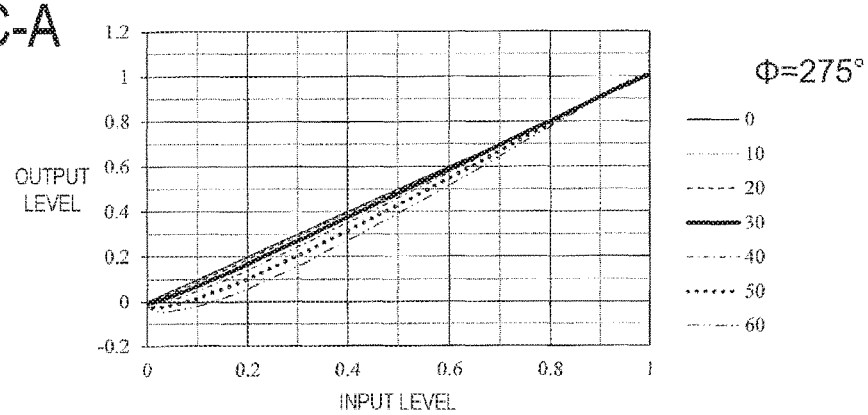
FIG. 18C-B
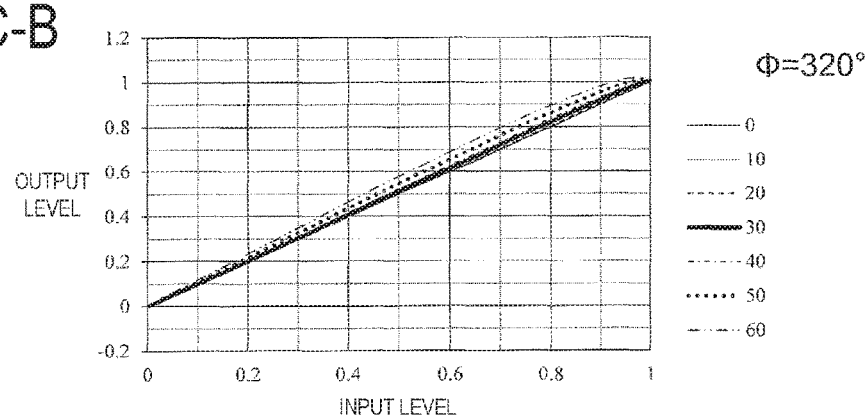

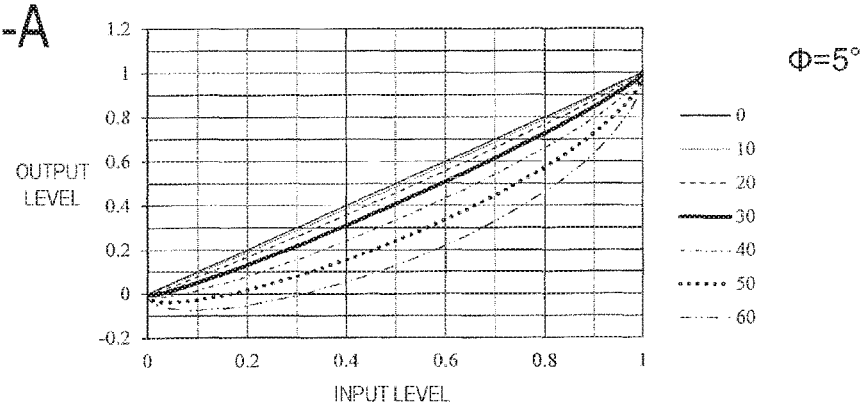
FIG. 19A-A
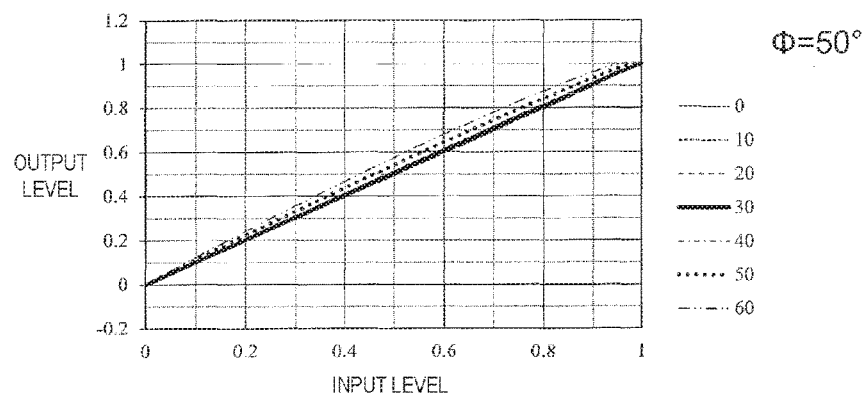
FIG. 19A-B
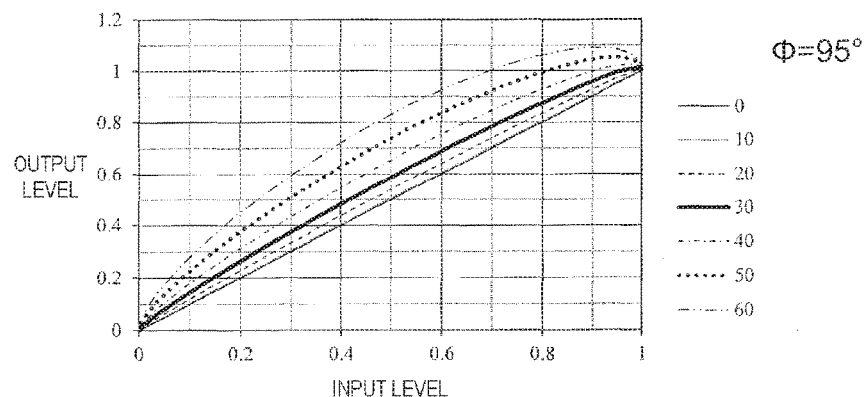
FIG. 19A-C

FIG. 19B-A
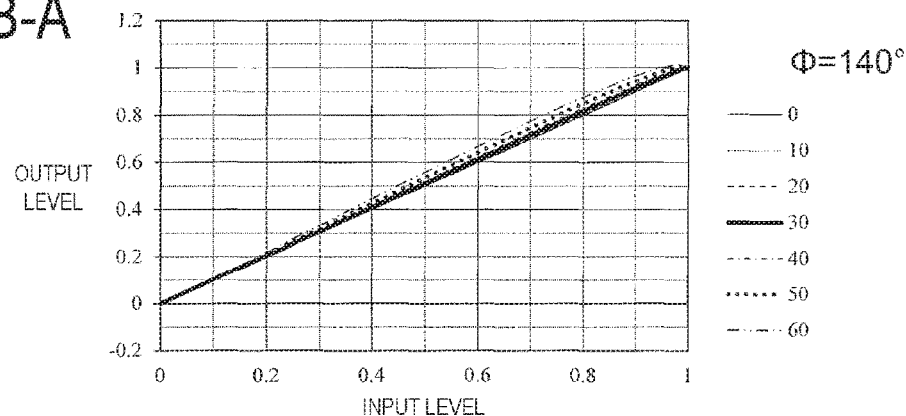
FIG. 19B-B
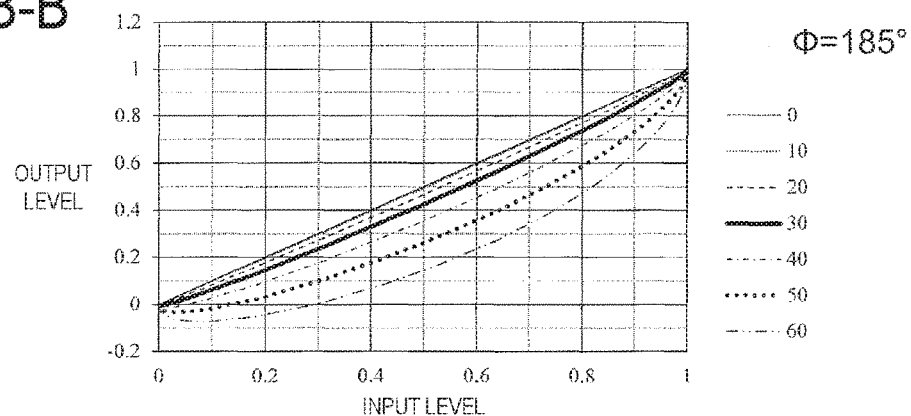
FIG. 19B-C
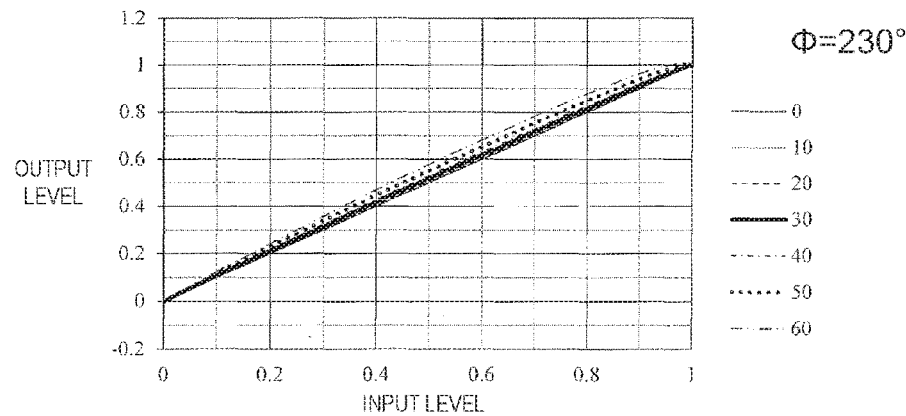

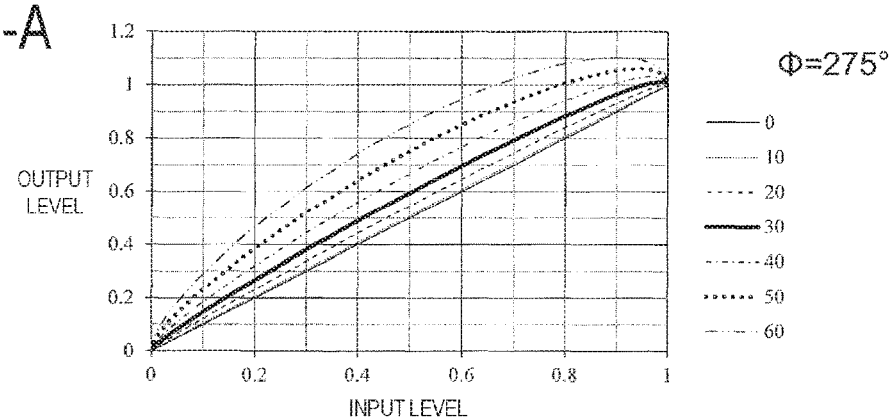
FIG. 19C-A
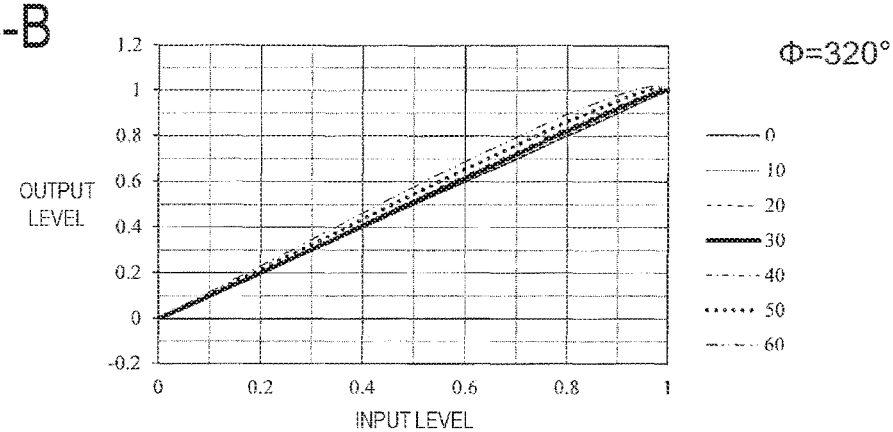
FIG. 19C-B
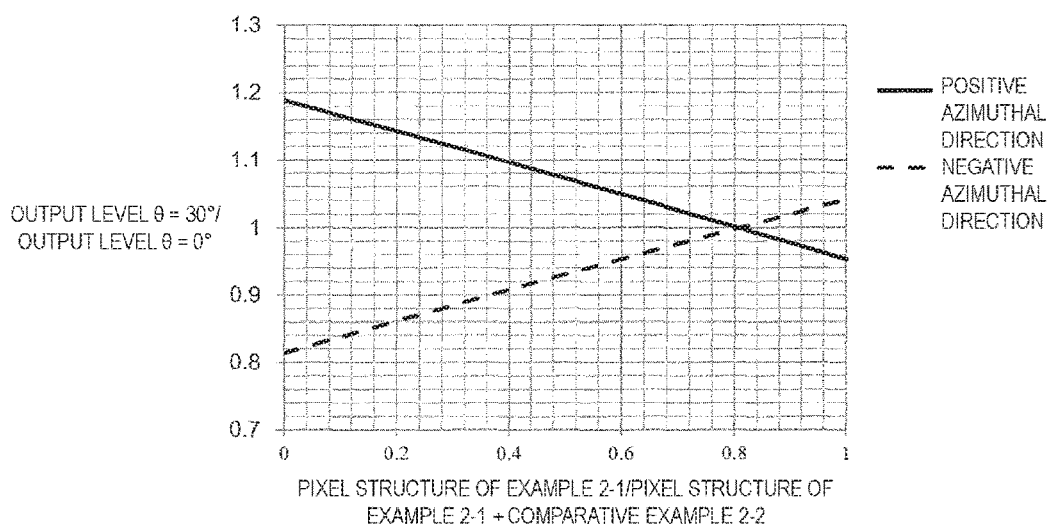
FIG. 20

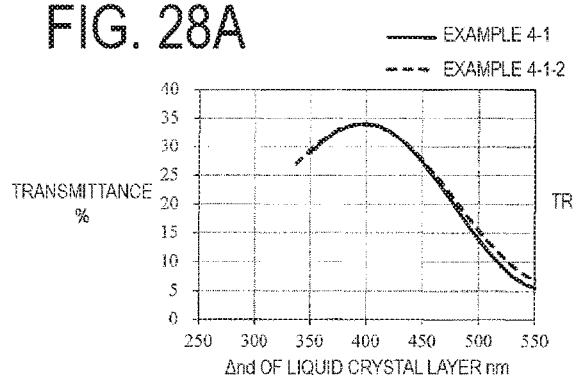
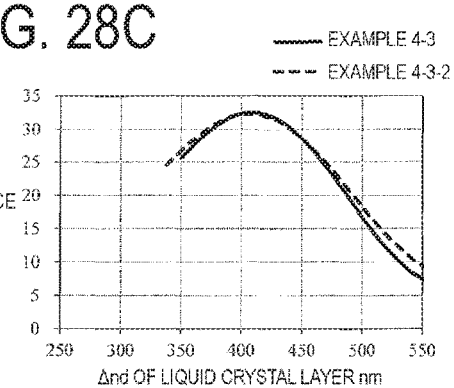
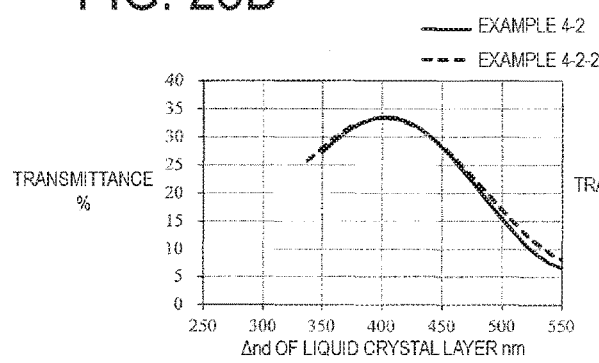
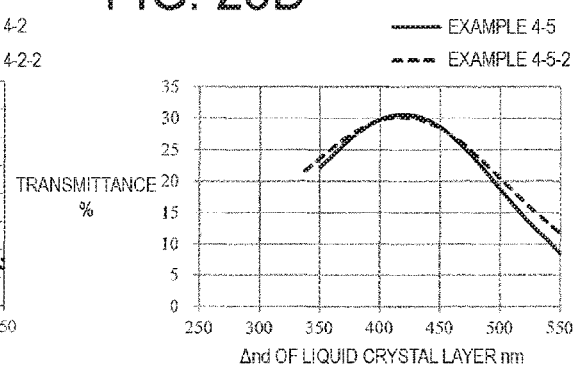
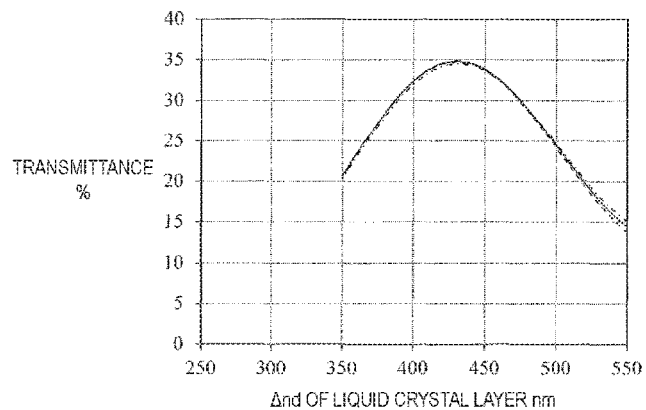
FIG. 29

FIG. 30A-A
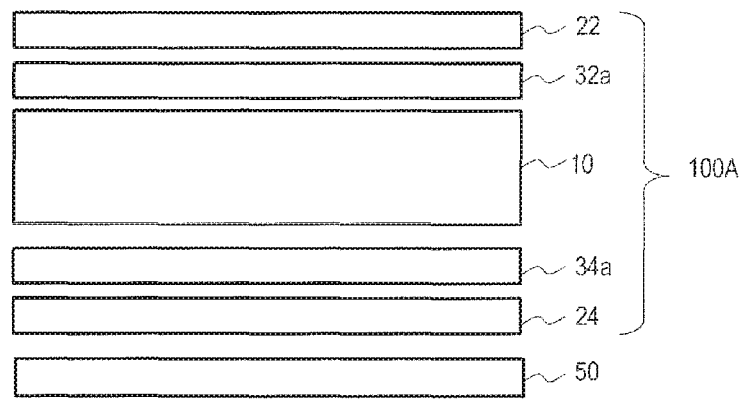
FIG. 30A-B
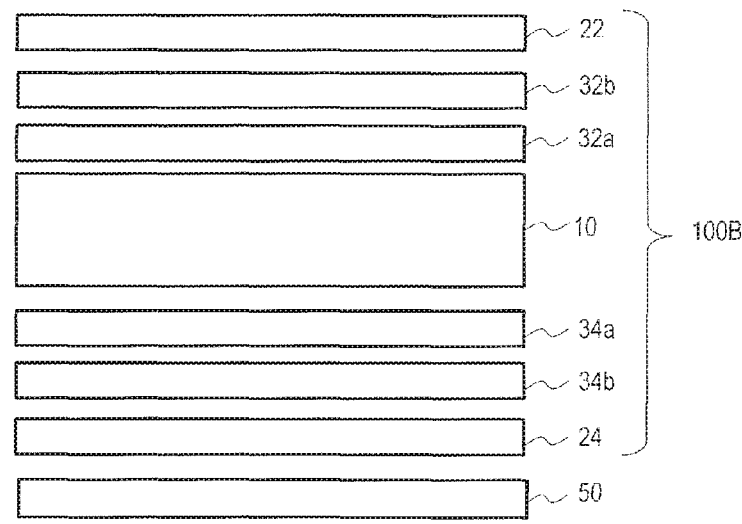

FIG. 30B-A
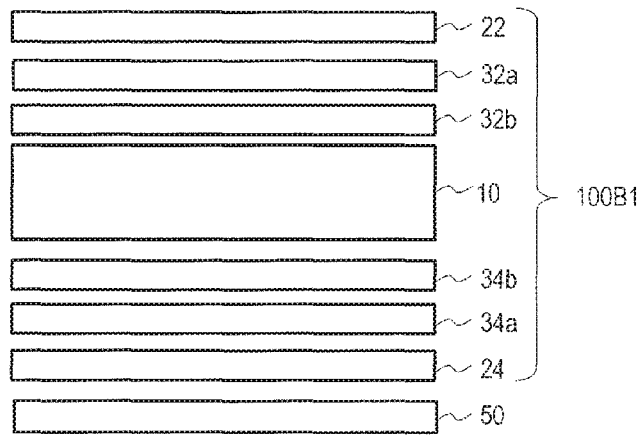
FIG. 30B-B
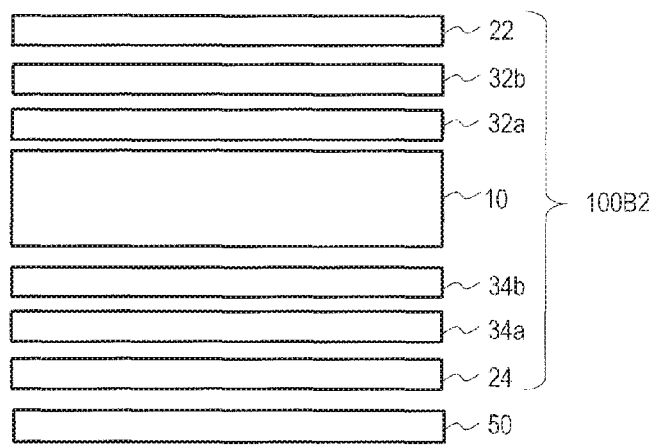
FIG. 30B-C
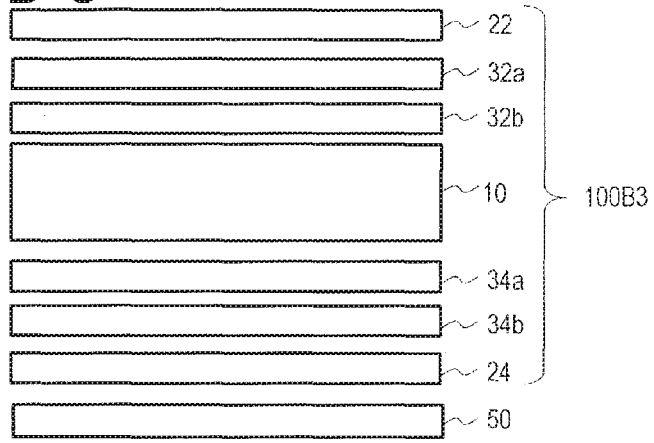

FIG. 30C-A
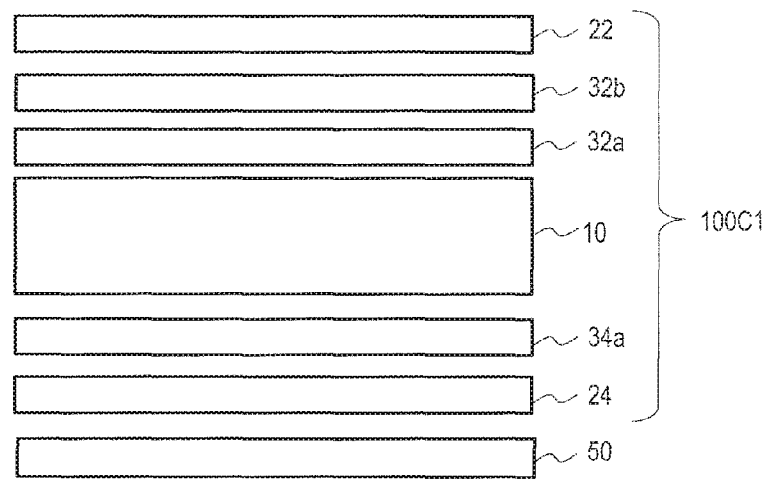
FIG. 30C-B
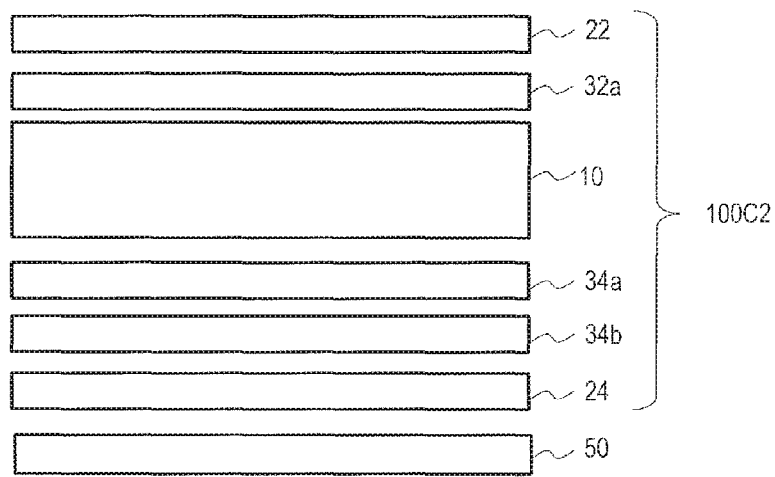

LIQUID CRYSTAL DISPLAY PANEL WHEREIN A THICKNESS DIRECTION RETARDATION OF AT LEAST ONE OF A FIRST, SECOND, THIRD, AND FOURTH PHASE DIFFERENCE PLATE HAS A NEGATIVE VALUE

TECHNICAL FIELD

The present invention relates to a liquid crystal display panel, and particularly relates to a liquid crystal display panel having a transverse electrical field mode.

BACKGROUND ART

Liquid crystal display panels having a transverse electrical field mode, such as an In-Plane Switching (IPS) mode or a Fringe Field Switching (FFS) mode, have an advantage over known liquid crystal display panels having vertical electrical field mode (VA mode, for example) in that the viewing angle dependence of γ (gamma) properties is low. Hence, the use of such panels as small- and medium-sized liquid crystal display panels in particular is increasing.

However, as the resolutions of liquid crystal display panels increase, the pixel aperture ratios (a ratio of the total surface area of the pixel openings occupying the display region) decrease, and it is becoming difficult to achieve a satisfactory display luminance. Particularly in small- and medium-sized liquid crystal display panels for mobile applications, a drop in the contrast ratio when viewing in bright environments such as outdoors is a concern.

Thus far, the contrast ratio is increased by increasing the brightness of a backlight and by increasing the display luminance to deal with such a concern. However, increasing the brightness of the backlight may consume more energy, and responding by increasing the brightness of the backlight is nearing its limit.

Reflection by the liquid crystal display panel is one reason why the contrast ratio of the liquid crystal display panel drops in bright environments. Thus, attempts are being made to improve contrast ratios by reducing reflection by liquid crystal display panels.

For example, PTL 1 discloses an IPS mode liquid crystal display panel that prevents a situation in which light reflected by a liquid crystal cell is emitted to an observer side, by providing a phase difference plate (also referred to as a "front-side phase difference plate") between a linear polarizing plate (also referred to as a "front-side linear polarizing plate") disposed on the observer side (also referred to as a "front side") and the liquid crystal cell. The front-side phase difference plate is provided so that linear polarized light transmitted through the front-side linear polarizing plate becomes circular polarized light that rotates in a first direction, and enters the liquid crystal cell. In other words, the front-side linear polarizing plate and the front-side phase difference plate function as a circular polarizing plate. When circular polarized light is reflected (at an interface where the refractive index changes from low to high), the phases of both P waves and S waves are shifted by π radian, and the rotation direction reverses as a result. Thus, light reflected in the liquid crystal cell (transparent substrate) becomes circular polarized light having the rotation direction of a second direction, which is the reverse of the first direction, and linear polarized light obtained from the circular polarized light passing through the front-side phase difference plate is absorbed by the front-side linear polarizing plate.

The liquid crystal display panel of PTL 1 further includes another phase difference plate (also referred to as a "rear-side phase difference plate") disposed between a linear polarizing plate (also referred to as a "rear-side linear polarizing plate") disposed on a backlight side (also referred to as a "rear side") and the liquid crystal cell. The rear-side phase difference plate is configured so that linear polarized light transmitted through the rear-side linear polarizing plate becomes circular polarized light having a rotation direction that is the second direction, which is the reverse of the first direction, upon passing through the rear-side phase difference plate and a liquid crystal layer in a black display state. By passing through the front-side phase difference plate, the circular polarized light having the second direction as the rotation direction is transformed into linear polarized light to be absorbed by the front side polarizing plate. According to PTL 1, an IPS mode liquid crystal display panel capable of achieving good image quality even when used outdoors can be obtained.

CITATION LIST

Patent Literature

PTL 1: JP 2012-173672 A

SUMMARY OF INVENTION

Technical Problem

However, in the liquid crystal display panel disclosed in PTL 1, the usage efficiency of light emitted from the backlight may be low. The liquid crystal display panel disclosed in PTL 1 also has a circular polarizing plate on the backlight side. Accordingly, reflection of the light from the backlight incident on the liquid crystal panel is prevented, and as a result, the reflected light is not reused by causing the light reflected toward the backlight to be reflected back toward the liquid crystal display panel.

Investigations made by the inventors of the present invention resulted in new findings that the γ properties (a relationship between an input gray scale and an output gray scale) of a transverse electrical field mode liquid crystal display panel depends on the relationship between the rotation direction of a liquid crystal director (liquid crystal molecules) and the azimuthal direction of the slow axis of the circular polarizing plate on the observer side, and on the in-plane retardation of the liquid crystal layer, the phase difference plates, and the like. The inventors further obtained new findings that the black display when observed from an oblique viewing angle depends on the thickness direction retardation of the liquid crystal layer, the phase difference plates, or the like. The liquid crystal display panel according to PTL 1 does not take this factors into consideration, and has a drawback in that the γ properties are highly dependent on the viewing angle, and a drawback in that the transmittance in a black display state is high when observed from an oblique viewing angle.

The present invention has been made to address at least one of the above-described drawbacks. An object of the present invention is at least one of (1) to provide a transverse electrical field mode liquid crystal display panel having a higher usage efficiency of light emitted from a backlight than in the related art; (2) to provide a transverse electrical field mode liquid crystal display panel having a higher brightness contrast ratio than in the related art; (3) to provide a transverse electrical field mode liquid crystal display panel capable of a display in which the γ properties have a lower viewing angle dependence than in the related art; and (4) to provide a transverse electrical field mode liquid crystal display panel that can achieve a better black display when observed at oblique viewing angles than in the related art.

Solution to Problem

A liquid crystal display panel according to embodiments of the present invention is a liquid crystal display panel including: a liquid crystal cell including a bottom-side substrate, a top-side substrate, a liquid crystal layer, and an electrode pair, the top-side substrate being disposed on an observer side of the bottom-side substrate, the liquid crystal layer being provided between the bottom-side substrate and the top-side substrate, and the electrode pair being formed on one of the bottom-side substrate and the top-side substrate and generating a transverse electrical field in the liquid crystal layer; a first polarizing plate disposed on an observer side of the liquid crystal cell; a first phase difference plate disposed between the liquid crystal layer and the first polarizing plate; a second polarizing plate disposed on a back surface side of the liquid crystal cell; and a second phase difference plate disposed between the second polarizing plate and the liquid crystal layer. The liquid crystal layer includes a nematic liquid crystal and has a homogeneous alignment when no electrical field is applied, and $\Delta$nd is greater than or equal to 360 nm and less than or equal to 490 nm, where $\Delta$n represent a birefringence of the nematic liquid crystal and d represent a thickness of the liquid crystal layer. An in-plane retardation R1 of the first phase difference plate is greater than or equal to 100 nm and less than or equal to 160 nm. An in-plane retardation R2 of the second phase difference plate is greater than or equal to 200 nm and less than or equal to 360 nm. A slow axis of the first phase difference plate and a slow axis of the second phase difference plate are substantially parallel to each other and substantially orthogonal to an azimuthal direction of a director of the nematic liquid crystal in the homogeneous alignment.

In some embodiments, the liquid crystal display panel includes a plurality of pixels; and a structure corresponding to each of the plurality of pixels includes a region in which the azimuthal direction of the director, an azimuthal direction of the transverse electrical field, and azimuthal directions of the slow axes of the first and second phase difference plates are set such that the direction in which director of the nematic liquid crystal of the bottom-side substrate is rotated by the transverse electrical field is leftward and light passing through the first phase difference plate from the observer side is leftward circular polarized light or leftward elliptical polarized light, or such that the direction in which director of the nematic liquid crystal of the bottom-side substrate is rotated by the transverse electrical field is rightward and light passing through the first phase difference plate from the observer side is rightward circular polarized light or rightward elliptical polarized light.

In some embodiments, a dielectric anisotropy of the nematic liquid crystal is negative, and a surface area ratio of the region occupying the pixel openings is greater than or equal to 38%.

In some embodiments, a dielectric anisotropy of the nematic liquid crystal is positive, and a surface area ratio of the region occupying the pixel openings is greater than or equal to 45%.

In some embodiments, the $\Delta$nd of the liquid crystal layer is substantially equal to a sum of R1+R2, where R1 represents the in-plane retardation of the first phase difference layer and R2 represents the in-plane retardation of the second phase difference layer.

In some embodiments, the in-plane retardation R2 of the second phase difference plate is greater than or equal to 220 nm and less than or equal to 330 nm.

In some embodiments, the electrode pair includes a pixel electrode having a plurality of rectangular openings extending parallel to each other and a common electrode formed opposite to the pixel electrode with a dielectric layer located interposed between the pixel electrode and the common electrode; and in a case where S is a width of the openings and L is a distance between adjacent ones of the openings, L+S is greater than or equal to 4 μm and less than or equal to 8 μm.

In some embodiments, L/S is greater than 40/60 and less than or equal to 55/45.

In some embodiments, the dielectric anisotropy of the nematic liquid crystal is negative.

A liquid crystal display panel according to another embodiment of the present invention is a liquid crystal display panel including: a liquid crystal cell including a bottom-side substrate, a top-side substrate, a liquid crystal layer, and an electrode pair, the top-side substrate being disposed on an observer side of the bottom-side substrate, the liquid crystal layer being provided between the bottom-side substrate and the top-side substrate, and the electrode pair being formed on one of the bottom-side substrate and the top-side substrate and generating a transverse electrical field in the liquid crystal layer; a first polarizing plate disposed on an observer side of the liquid crystal cell; a first phase difference plate disposed between the liquid crystal layer and the first polarizing plate; a second polarizing plate disposed on a back surface side of the liquid crystal cell; and a second phase difference plate disposed between the second polarizing plate and the liquid crystal layer. The liquid crystal layer includes a nematic liquid crystal and has a homogeneous alignment when no electrical field is applied, and $\Delta$nd is greater than or equal to 360 nm and less than or equal to 490 nm, where $\Delta$n represents a birefringence of the nematic liquid crystal and d represents a thickness of the liquid crystal layer. An in-plane retardation R1 of the first phase difference plate is greater than or equal to 100 nm and less than or equal to 160 nm. A thickness direction retardation of at least one of the first phase difference plate and the second phase difference plate has a negative value. A slow axis of the first phase difference plate and a slow axis of the second phase difference plate are substantially parallel to each other and substantially orthogonal to an azimuthal direction of a director of the nematic liquid crystal in the homogeneous alignment.

In some embodiments, a sum of Rth1+Rth2 is smaller than the $\Delta$nd of the liquid crystal layer, where Rth1 represents a thickness direction retardation of the first phase difference plate and Rth2 represents a thickness direction retardation of the second phase difference plate.

A liquid crystal display panel according to still another embodiment of the present invention is a liquid crystal display panel including: a liquid crystal cell including a bottom-side substrate, a top-side substrate, a liquid crystal layer, and an electrode pair, the top-side substrate being disposed on an observer side of the bottom-side substrate, the liquid crystal layer being provided between the bottom-side substrate and the top-side substrate, and the electrode pair being formed on one of the bottom-side substrate and the top-side substrate and generating a transverse electrical field in the liquid crystal layer; a first polarizing plate disposed on an observer side of the liquid crystal cell; a first phase difference plate disposed between the liquid crystal layer and the first polarizing plate and having an in-plane retardation R1; a second polarizing plate disposed on a back surface side of the liquid crystal cell; a second phase difference plate disposed between the second polarizing plate and the liquid crystal layer and having an in-plane retardation R2; a third phase difference plate disposed between the liquid crystal layer and the first polarizing plate; and a fourth phase difference plate disposed between the second polarizing plate and the liquid crystal layer. The liquid crystal layer includes a nematic liquid crystal and has a homogeneous alignment when no electrical field is applied, and Δnd is greater than or equal to 360 nm and less than or equal to 490 nm, where Δn represents a birefringence of the nematic liquid crystal and d represents a thickness of the liquid crystal layer. The in-plane retardation R1 of the first phase difference plate is greater than or equal to 100 nm and less than or equal to 160 nm. A thickness direction retardation of at least one of the first phase difference plate, the second phase difference plate, the third phase difference plate, and the fourth phase difference plate has a negative value. A slow axis of the first phase difference plate and a slow axis of the second phase difference plate are substantially parallel to each other and substantially orthogonal to an azimuthal direction of a director of the nematic liquid crystal in the homogeneous alignment.

In some embodiments, the third phase difference plate is disposed between the first phase difference plate and the first polarizing plate.

In some embodiments, the third phase difference plate is disposed between the first phase difference plate and the liquid crystal layer.

In some embodiments, the fourth phase difference plate is disposed between the second phase difference plate and the second polarizing plate.

In some embodiments, the fourth phase difference plate is disposed between the second phase difference plate and the liquid crystal layer.

In some embodiments, the thickness direction retardation of the third phase difference plate and the thickness direction retardation of the fourth phase difference plate are substantially equal.

In some embodiments, a sum of Rth1+Rth2+Rth3+Rth4 is smaller than the Δnd of the liquid crystal layer, where Rth1 represents a thickness direction retardation of the first phase difference plate, Rth2 represents a thickness direction retardation of the second phase difference plate, Rth3 represents a thickness direction retardation of the third phase difference plate, and Rth4 represents a thickness direction retardation of the fourth phase difference plate.

In some embodiments, the sum of Rth1+Rth2+Rth3+Rth4 is substantially zero, where Rth1 represents a thickness direction retardation of the first phase difference plate, Rth2 represents a thickness direction retardation of the second phase difference plate, Rth3 represents a thickness direction retardation of the third phase difference plate, and Rth4 represents a thickness direction retardation of the fourth phase difference plate.

In some embodiments, at least one of the first phase difference plate, the second phase difference plate, the third phase difference plate, and the fourth phase difference plate is a phase difference plate having a negative thickness direction retardation and having a dual-axis refractive index ellipsoid.

In some embodiments, the third phase difference plate has an in-plane retardation R3, the fourth phase difference plate has an in-plane retardation R4, the in-plane retardation R3 of the third phase difference plate and the in-plane retardation R4 of the fourth phase difference plate are substantially equal to one another, and a slow axis of the third phase difference plate and a slow axis of the fourth phase difference plate are substantially orthogonal to each other.

In some embodiments, an absorption axis of the first polarizing plate and the slow axis of the third phase difference plate are substantially parallel to each other, and an absorption axis of the second polarizing plate and a slow axis of the fourth phase difference plate are substantially parallel to each other.

In some embodiments, at least one of the third phase difference plate and the fourth phase difference plate is a positive C plate.

In some embodiments, the in-plane retardation R3 of the third phase difference plate and the in-plane retardation R4 of the fourth phase difference plate are substantially zero.

A liquid crystal display panel according to still another embodiment of the present invention is a liquid crystal display panel including: a liquid crystal cell including a bottom-side substrate, a top-side substrate, a liquid crystal layer, and an electrode pair, the top-side substrate being disposed on an observer side of the bottom-side substrate, the liquid crystal layer being provided between the bottom-side substrate and the top-side substrate, and the electrode pair being formed on one of the bottom-side substrate and the top-side substrate and generating a transverse electrical field in the liquid crystal layer; a first polarizing plate disposed on an observer side of the liquid crystal cell; a first phase difference plate disposed between the liquid crystal layer and the first polarizing plate and having an in-plane retardation R1; a second polarizing plate disposed on a back surface side of the liquid crystal cell; a second phase difference plate disposed between the second polarizing plate and the liquid crystal layer and having an in-plane retardation R2; and the liquid crystal display panel further including either a third phase difference plate disposed between the liquid crystal layer and the first polarizing plate, or a fourth phase difference plate disposed between the second polarizing plate and the liquid crystal layer. The liquid crystal layer includes nematic liquid crystal and has a homogeneous alignment when no electrical field is applied, and in a case where Δn represents a birefringence of the nematic liquid crystal and d represents a thickness of the liquid crystal layer, Δnd is greater than or equal to 360 nm and less than or equal to 490 nm. An in-plane retardation R1 of the first phase difference plate is greater than or equal to 100 nm and less than or equal to 160 nm. A thickness direction retardation of at least one of the first phase difference plate, the second phase difference plate, the third phase difference plate, and the fourth phase difference plate has a negative value. A slow axis of the first phase difference plate and a slow axis of the second phase difference plate are substantially parallel to each other and substantially orthogonal to an azimuthal direction of a director of the nematic liquid crystal in the homogeneous alignment.

In some embodiments, the third phase difference plate is disposed between the first phase difference plate and the first polarizing plate, and the fourth phase difference plate is disposed between the second phase difference plate and the second polarizing plate.

In some embodiments, a sum of Rth1+Rth2+Rth3 or a sum of Rth1+Rth2+Rth4 is smaller than the Δnd of the liquid crystal layer, where Rth1 represents a thickness direction retardation of the first phase difference plate, Rth2 represents a thickness direction retardation of the second phase difference plate, Rth3 represents a thickness direction retardation of the third phase difference plate, and Rth4 represents a thickness direction retardation of the fourth phase difference plate.

In some embodiments, either the sum of Rth1+Rth2+Rth3 or the sum of Rth1+Rth2+Rth4 is substantially zero, where Rth1 represents a thickness direction retardation of the first phase difference plate, Rth2 represents a thickness direction retardation of the second phase difference plate, Rth3 represents a thickness direction retardation of the third phase difference plate, and Rth4 represents a thickness direction retardation of the fourth phase difference plate.

In some embodiments, the third phase difference plate or the fourth phase difference plate is a positive C plate.

In some embodiments, at least one of the first phase difference plate and the second phase difference plate is a negative A plate.

In some embodiments, the $\Delta$nd of the liquid crystal layer is substantially equal to a sum of R1+R2, where R1 represents the in-plane retardation of the first phase difference layer and R2 represents the in-plane retardation of the second phase difference layer.

Advantageous Effects of Invention

According to embodiments, of the present invention, at least one of (1) a transverse electrical field mode liquid crystal display panel having a higher usage efficiency of light emitted from a backlight than in the related art; (2) a transverse electrical field mode liquid crystal display panel having a higher brightness contrast ratio than in the related art; (3) a transverse electrical field mode liquid crystal display panel capable of a display in which the $\gamma$ properties have a lower viewing angle dependence than in the related art; and (4) a transverse electrical field mode liquid crystal display panel that can achieve a better black display when observed at oblique viewing angles than in the related art.

BRIEF DESCRIPTION OF DRAWINGS

FIG. 3A is a schematic diagram illustrating a relationship between the absorption axis of a first polarizing plate 22 and the slow axis of a first phase difference plate 32, FIG. 3B is a schematic diagram illustrating a relationship between a nematic liquid crystal director and the direction of a transverse electrical field, and a direction in which liquid crystal molecules rotate due to the transverse electrical field, and FIG. 3C is a schematic diagram illustrating a relationship between the absorption axis of a second polarizing plate 24 and the slow axis of a second phase difference plate 34.

FIG. 4A is a schematic diagram illustrating a relationship between the absorption axis of the first polarizing plate 22 and the slow axis of the first phase difference plate 32, FIG. 4B is a schematic diagram illustrating a relationship between a nematic liquid crystal director and the direction of a transverse electrical field, and a direction in which liquid crystal molecules rotate due to the transverse electrical field, and FIG. 4C is a schematic diagram illustrating a relationship between the absorption axis of the second polarizing plate 24 and the slow axis of the second phase difference plate 34.

FIG. 5A is a schematic diagram illustrating a relationship between the absorption axis of the first polarizing plate 22 and the slow axis of the first phase difference plate 32, FIG. 5B is a schematic diagram illustrating a relationship between a nematic liquid crystal director and the direction of a transverse electrical field, and a direction in which liquid crystal molecules rotate due to the transverse electrical field, and FIG. 5C is a schematic diagram illustrating a relationship between the absorption axis of the second polarizing plate 24 and the slow axis of the second phase difference plate 34.

FIG. 6A is a schematic diagram illustrating a relationship between the absorption axis of the first polarizing plate 22 and the slow axis of the first phase difference plate 32, FIG. 6B is a schematic diagram illustrating a relationship between a nematic liquid crystal director and the direction of a transverse electrical field, and a direction in which liquid crystal molecules rotate due to the transverse electrical field, and FIG. 6C is a schematic diagram illustrating a relationship between the absorption axis of the second polarizing plate 24 and the slow axis of the second phase difference plate 34.

FIGS. 7A-A to 7A-C are graphs illustrating viewing angle dependence of $\gamma$ properties of the liquid crystal display panel according to Example 1-1 (azimuth angle (of $\Phi$ of 5°, 50° and 95°).

FIGS. 7B-A to 7B-C are graphs illustrating viewing angle dependence of $\gamma$ properties of the liquid crystal display panel according to Example 1-1 (azimuth angle $\Phi$ of 140°, 185°, and 230°).

FIGS. 7C-A and 7C-B are graphs illustrating viewing angle dependence of $\gamma$ properties of the liquid crystal display panel according to Example 1-1 (azimuth angle $\Phi$ of 275° and 320°).

FIGS. 8A-A to 8A-C are graphs illustrating viewing angle dependence of $\gamma$ properties of the liquid crystal display panel according to Comparative Example 1-1 (azimuth angle $\Phi$ of 5°, 50°, and 95°).

FIGS. 8B-A to 8B-C are graphs illustrating viewing angle dependence of $\gamma$ properties of the liquid crystal display panel according to Comparative Example 1-1 (azimuth angle $\Phi$ of 140°, 185°, and 230°).

FIGS. 8C-A and 8C-B are graphs illustrating viewing angle dependence of $\gamma$ properties of the liquid crystal display panel according to Comparative Example 1-1 (azimuth angle $\Phi$ of 275° and 320°).

FIGS. 9A-A to 9A-C are graphs illustrating viewing angle dependence of γ properties of the liquid crystal display panel according to Example 1-2 (azimuth angle Φ of 40°, 85°, and 130°).

FIGS. 9B-A to 9B-C are graphs illustrating viewing angle dependence of γ properties of the liquid crystal display panel according to Example 1-2 (azimuth angle Φ of 175°, 220°, and 265°).

FIGS. 9C-A and 9C-B are graphs illustrating viewing angle dependence of γ properties of the liquid crystal display panel according to Example 1-2 (azimuth angle Φ of 310° and 355°).

FIGS. 10A-A to 10A-C are graphs illustrating viewing angle dependence of γ properties of the liquid crystal display panel according to Comparative Example 1-2 (azimuth angle Φ of 40°, 85°, and 130°).

FIGS. 10B-A to 10B-C are graphs illustrating viewing angle dependence of γ properties of the liquid crystal display panel according to Comparative Example 1-2 (azimuth angle Φ of 175°, 220°, and 265°).

FIGS. 10C-A and 10C-B are graphs illustrating viewing angle dependence of γ properties of the liquid crystal display panel according to Comparative Example 1-2 (azimuth angle Φ of 310° and 355°).

FIG. 12A is a schematic diagram illustrating a relationship between the absorption axis of the first polarizing plate 22 and the slow axis of the first phase difference plate 32, FIG. 12B is a schematic diagram illustrating a relationship between a nematic liquid crystal director and the direction of a transverse electrical field, and a direction in which liquid crystal molecules rotate due to the transverse electrical field, and FIG. 12C is a schematic diagram illustrating a relationship between the absorption axis of the second polarizing plate 24 and the slow axis of the second phase difference plate 34.

FIG. 13A is a schematic diagram illustrating a relationship between the absorption axis of the first polarizing plate 22 and the slow axis of the first phase difference plate 32, FIG. 13B is a schematic diagram illustrating a relationship between a nematic liquid crystal director and the direction of a transverse electrical field, and a direction in which liquid crystal molecules rotate due to the transverse electrical field, and FIG. 13C is a schematic diagram illustrating a relationship between the absorption axis of the second polarizing plate 24 and the slow axis of the second phase difference plate 34.

FIG. 14A is a schematic diagram illustrating a relationship between the absorption axis of the first polarizing plate 22 and the slow axis of the first phase difference plate 32, FIG. 14B is a schematic diagram illustrating a relationship between a nematic liquid crystal director and the direction of a transverse electrical field, and a direction in which liquid crystal molecules rotate due to the transverse electrical field, and FIG. 14C is a schematic diagram illustrating a relationship between the absorption axis of the second polarizing plate 24 and the slow axis of the second phase difference plate 34.

FIG. 15A is a schematic diagram illustrating a relationship between the absorption axis of the first polarizing plate 22 and the slow axis of the first phase difference plate 32, FIG. 15B is a schematic diagram illustrating a relationship between a nematic liquid crystal director and the direction of a transverse electrical field, and a direction in which liquid crystal molecules rotate due to the transverse electrical field, and FIG. 15C is a schematic diagram illustrating a relationship between the absorption axis of the second polarizing plate 24 and the slow axis of the second phase difference plate 34.

FIGS. 16A-A to 16A-C are graphs illustrating viewing angle dependence of γ properties of the liquid crystal display panel according to Example 2-1 (azimuth angle Φ of 40°, 85°, and 130°).

FIGS. 16B-A to 16B-C are graphs illustrating viewing angle dependence of γ properties of the liquid crystal display panel according to Example 2-1 (azimuth angle Φ of 175°, 220°, and 265°).

FIGS. 16C-A and 16C-B are graphs illustrating viewing angle dependence of γ properties of the liquid crystal display panel according to Example 2-1 (azimuth angle Φ of 310° and 355°).

FIGS. 17A-A to 17A-C are graphs illustrating viewing angle dependence of γ properties of the liquid crystal display panel according to Comparative Example 2-1 (azimuth angle Φ of 40°, 85°, and 130°).

FIGS. 17B-A to 17B-C are graphs illustrating viewing angle dependence of γ properties of the liquid crystal display panel according to Comparative Example 2-1 (azimuth angle Φ of 175°, 220°, and 265°.

FIGS. 17C-A and 17C-B are graphs illustrating viewing angle dependence of γ properties of the liquid crystal display panel according to Comparative Example 2-1 (azimuth angle Φ of 310° and 355°).

FIGS. 18A-A to 18A-C are graphs illustrating viewing angle dependence of γ properties of the liquid crystal display panel according to Example 2-2 (azimuth angle Φ of 5°, 50°, and 95°).

FIGS. 18B-A to 18B-C are graphs illustrating viewing angle dependence of γ properties of the liquid crystal display panel according to Example 2-2 (azimuth angle Φ of 140°, 185°, and 230°).

FIGS. 18C-A and 18C-B are graphs illustrating viewing angle dependence of γ properties of the liquid crystal display panel according to Example 2-2 (azimuth angle Φ of 275° and 320°).

FIGS. 19A-A to 19A-C are graphs illustrating viewing angle dependence of γ properties of the liquid crystal display panel according to Comparative Example 2-2 (azimuth angle Φ of 5°, 50°, and 95°).

FIGS. 19B-A to 19B-C are graphs illustrating viewing angle dependence of γ properties of the liquid crystal display panel according to Comparative Example 2-2 (azimuth angle Φ of 140°, 185°, and 230°).

FIGS. 19C-A and 19C-B are graphs illustrating viewing angle dependence of γ properties of the liquid crystal display panel according to Comparative Example 2-2 (azimuth angle Φ of 275° and 320°).

FIG. 20 is a graph illustrating, for a liquid crystal display panel having a combined pixel structure including the pixel structure according to Example 2-1 and the pixel structure according to Comparative Example 2-2, a relationship between a combination ratio of the pixel structure and values of an output level at a polar angle of 30°/an output level at a polar angle of 0° when an input level is 0.5.

FIGS. 28A to 28D are graphs illustrating Δnd dependences on the transmittances of liquid crystal display panels in which d is fixed and Δn is varied (Examples 4-1-2, 4-2-2, 4-3-2, and 4-5-2).

FIG. 29 is a graph illustrating results of simulating the Δnd dependence on the transmittance of a liquid crystal display panel according to Example 3-3 in a case where different values are used for an elastic constant K.

FIG. 30A-A is a schematic exploded cross-sectional view of a liquid crystal display panel 100A according to a second embodiment of the present invention, also illustrating the backlight 50, and FIG. 30A-B is a schematic exploded cross-sectional view of a liquid crystal display panel 100B according to the second embodiment of the present invention, also illustrating the backlight 50.

FIG. 30B-A is a schematic exploded cross-sectional view of a liquid crystal display panel 100B1 according to the second embodiment of the present invention, also illustrating the backlight 50; FIG. 30B-B is a schematic exploded cross-sectional view of a liquid crystal display panel 100B2 according to the second embodiment of the present invention, also illustrating the backlight 50; and FIG. 30B-C is a schematic exploded cross-sectional view of a liquid crystal display panel 100B3 according to the second embodiment of the present invention, also illustrating the backlight 50.

FIG. 30C-A is a schematic exploded cross-sectional view of a liquid crystal display panel 100C1 according to the second embodiment of the present invention, also illustrating the backlight 50, and FIG. 30C-B is a schematic exploded cross-sectional view of a liquid crystal display panel 100C2 according to the second embodiment of the present invention, also illustrating the backlight 50.

DESCRIPTION OF EMBODIMENT

Figure 1A:
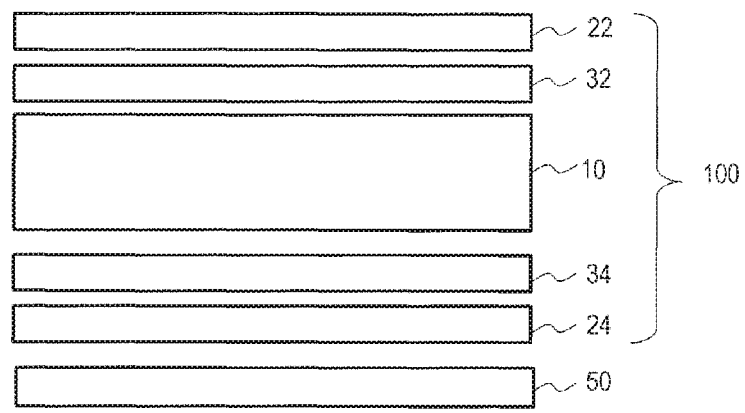
FIG. 1A is a schematic exploded cross-sectional view of a liquid crystal display panel 100 according to a first embodiment of the present invention, also illustrating a backlight 50.

A liquid crystal display panel according to embodiments (including first and second embodiments) of the present invention includes: a liquid crystal cell, the liquid crystal cell including a bottom-side substrate (a back surface-side substrate disposed on a backlight-side substrate, such as a TFT substrate), a top-side substrate (an observer-side substrate, such as a color filter substrate), a liquid crystal layer provided between the bottom-side substrate and the top-side substrate, and an electrode pair formed on one of the bottom-side substrate and the top-side substrate and generating a transverse electrical field in the liquid crystal layer; a first polarizing plate disposed on the observer side of the liquid crystal cell; a first phase difference plate disposed between the liquid crystal layer and the first polarizing plate; a second polarizing plate disposed on the back surface side of the liquid crystal cell; and a second phase difference plate disposed between the second polarizing plate and the liquid crystal layer. The following will describe a liquid crystal display panel according to embodiments of the present invention using a liquid crystal display panel in which the bottom-side substrate is a TFT substrate and the bottom-side substrate includes the electrode pair that generates a transverse electrical field in the liquid crystal layer as an example. However, the top-side substrate may be a TFT substrate and the top-side substrate may include the electrode pair that generates a transverse electrical field in the liquid crystal layer. The liquid crystal display panel according to embodiments of the present invention is a liquid crystal display panel having a transverse electrical field mode, such as an in-plane switching mode or a fringe field switching mode.

The liquid crystal layer includes nematic liquid crystals, and has a homogeneous alignment when no electrical field is applied. Here, "homogeneous alignment" includes an alignment in which pretilt directions, defined by an alignment film of the bottom-side substrate and an alignment film of the top-side substrate provided in contact with the liquid crystal layer, are parallel to each other, and an alignment in which the pretilt directions are antiparallel to each other. The liquid crystal layer may include nematic liquid crystals having negative dielectric anisotropy, or nematic liquid crystals having positive dielectric anisotropy.

In a case where $\Delta n$ represents a birefringence of the nematic liquid crystals and d represents a thickness of the liquid crystal layer, $\Delta nd$ is greater than or equal to 360 nm and less than or equal to 490 nm. An in-plane retardation R1 of the first phase difference plate is greater than or equal to 100 nm and less than or equal to 160 nm. A slow axis of the first phase difference plate and a slow axis of the second phase difference plate are substantially parallel to each other and substantially orthogonal to an azimuthal direction of a director of the nematic liquid crystals in the homogeneous alignment.

Typically, the first phase difference plate is a quarter wave plate ($\lambda/4$ plate). Note that 550 nm is used for the wavelength $\lambda$. This is because 550 nm, which has the highest visibility, is typically used for the wavelength $\lambda$ for design purposes.

In the liquid crystal display panel according to the first embodiment, an in-plane retardation R2 of the second phase difference plate is greater than or equal to 200 nm and less than or equal to 360 nm. Typically, the second phase difference plate is a half wave plate ($\lambda/2$ plate). A half wave plate rotates the polarization direction of linear polarized light having a polarization direction that forms an angle $\alpha$ with the slow axis of the slow axis thereof by $2\alpha$. As disclosed in PTL 1, when a quarter wave plate ($\lambda/4$ plate) is used as the second phase difference plate, reflection of the light from the backlight incident on the liquid crystal panel is suppressed, and thus the reflected light cannot be reused by causing the light reflected toward the backlight to be reflected back toward the liquid crystal display panel. However, when a half wave plate ($\lambda/2$ plate) is used as the second phase difference plate, and is disposed such that, for example, the polarization direction of linear polarized light passing through the second polarizing plate is 45° relative to the slow axis of the half wave plate, the polarization direction of the linear polarized light (polarization plane) simply rotates by 90°, and thus the reflected light can be reused.

The in-plane retardation $\Delta nd$ of the liquid crystal layer is typically a 3/4 wave ($3\lambda/4=412.5$ nm), and is equal to a sum of R1+R2 of the in-plane retardation R1 of the first phase difference plate (typically, $\lambda/4=137.5$ nm) and the in-plane retardation R2 of the second phase difference plate (typically, $\lambda/2=275.0$ nm). The first phase difference plate and the second phase difference plate are disposed such that the slow axes thereof are substantially parallel to each other and substantially orthogonal to an azimuthal direction of a director of the nematic liquid crystals (this corresponds to the slow axis of the liquid crystal layer) in the homogeneous alignment. Such a configuration enables a good black display when no voltage is applied (NB mode). The slow axes of the first phase difference plate and the second phase difference plate are substantially orthogonal to the slow axis of the liquid crystal layer when no voltage is applied, and thus the retardations thereof cancel out. Thus, in a case where $\Delta nd$ and R1+R2 are equal, $\Delta nd$ and R1+R2 cancel each other out in a state where no voltage is applied to the liquid crystal layer, and the in-plane retardation becomes substantially zero. In other words, a good black display when observed from a forward viewing angle can be achieved.

In-plane retardation (in-plane phase difference) refers to a retardation (phase difference) with respect to two linear polarized lights orthogonal to each other and incident orthogonally on phase difference layer (here, the liquid crystal layer or a phase difference plate). In a case where d is the thickness of the phase difference layer, ns and ny are each an in-plane principle refractive index, and nz is a principle refractive index in the normal direction, the in-plane retardation is defined as the absolute value of (nx−ny)×d (|(nx−ny)×d|). ("×" indicates multiplication in the present specification.) Using ns and nf, the in-plane retardation can also be defined as (ns−nf)×d. Here, ns is the greater of the in-plane principle refractive indices nx and ny, and nf is the smaller of the in-plane principle refractive indices nx and ny. As opposed to this, the thickness direction retardation is defined as ((nx+ny)/2−nz)×d. The thickness direction retardations of the liquid crystal layer and the phase difference plates will be discussed mainly in the second embodiment.

Note that in the present specification, the slow axis of a phase difference layer (here, the liquid crystal layer or a phase difference plate) is an "in-plane slow axis" unless otherwise specified.

As indicated by the results of simulations according to the first embodiment, described later, reflection of light incident on the liquid crystal display panel from the observer side can be suppressed and a display having a high contrast ratio can be achieved even without the above-described typical configuration, as long as the $\Delta nd$ of the liquid crystal layer is greater than or equal to 360 nm and less than or equal to 490 nm, the in-plane retardation R1 of the first phase difference plate is greater than or equal to 100 nm and less than or equal to 160 nm, and the in-plane retardation R2 of the second phase difference plate is greater than or equal to 200 nm and less than or equal to 360 nm.

Furthermore, the pixel structure in the liquid crystal display panel according to the first embodiment of the present invention may have a region in which the director azimuthal direction, the azimuthal direction of the transverse electrical field, and the azimuthal directions of the slow axes of the first and second phase difference plates satisfy a condition (1) or (2) below. Note that "pixel structure" refers to the structure of the liquid crystal display panel defined by the outer edges of the pixels when the pixels are viewed from the normal direction of the display surface of the liquid crystal display panel.

Condition (1): the direction in which the nematic liquid crystal director is rotated by the transverse electrical field at or near the bottom-side substrate is leftward, and the light passing through the first phase difference plate from the observer side is leftward circular polarized light or leftward elliptical polarized light.

Condition (2): the direction in which the nematic liquid crystal director is rotated by the transverse electrical field at or near the bottom-side substrate is rightward, and the light passing through the first phase difference plate from the observer side is rightward circular polarized light or rightward elliptical polarized light.

As indicated by the results of simulations according to the first embodiment, described later, when the director azimuthal direction, the azimuthal direction of the transverse electrical field, and the azimuthal directions of the slow axes of the first and second phase difference plates are set to satisfy the condition (1) or (2), the viewing angle dependence of γ properties (the relationship between the input gray scale and the output gray scale) can be improved. This effect was not anticipated by the inventors, and was first discovered through simulations.

Although the effects of a liquid crystal display panel in which the overall pixel openings satisfy the condition (1) or (2) will be described later with reference to examples, the effect of improving the viewing angle dependence of the γ properties can be achieved even in a case where the overall pixel openings do not satisfy the condition (1) or (2). When the dielectric anisotropy of nematic liquid crystals is negative, it is preferable that the surface area ratio of the region satisfying the condition (1) or (2) that occupies the pixel openings be greater than or equal to 38%, for example. On the other hand, when the dielectric anisotropy of nematic liquid crystals is positive, it is preferable that the surface area ratio of the stated region that occupies the pixel openings be greater than or equal to 45%, for example. In the present specification, a part in a pixel through which light contributing to the display is transmitted in particular is referred to as a "pixel opening". For example, in a case where the edge portions of pixel electrodes are shielded by a black matrix, the openings in the black matrix define the pixel openings.

A transverse electrical field mode liquid crystal display panel having two or more liquid crystal domains of different alignment directions in a single pixel (a so-called "multi-domain structure") is known. In such a pixel, the viewing angle dependence of the γ properties can be improved even in a case where only a region corresponding to some of the liquid crystal domains satisfies the condition (1) or (2).

A phase difference plate having regions where the azimuthal direction of the slow axis is different (also referred to as a "patterned phase difference plate") is known as well. When a patterned phase difference plate is used, the viewing angle dependence of the γ properties can be improved even in a case where only some regions of the pixel openings satisfy the condition (1) or (2). Furthermore, a configuration in which regions of some or all of the pixel openings satisfy the condition (1) or (2) can also be realized by combining a patterned phase difference plate and pixels having a multi-domain structure. Note that the patterned phase difference plate is sometimes formed within the liquid crystal cell.

In the liquid crystal display panel according to the second embodiment, the thickness direction retardation of at least one of the first phase difference plate and the second phase difference plate has a negative value. When the thickness direction retardation of at least one of the first phase difference plate and the second phase difference plate has a negative value, the sum of the thickness direction retardations of the first phase difference plate, the second phase difference plate, and the liquid crystal layer decreases. When the absolute value of the sum of the thickness direction retardations is low, a good black display when no voltage is applied can be achieved when observed from oblique viewing angles. This effect was not anticipated by the inventors, and was first discovered through simulations.

The liquid crystal display panel according to the second embodiment may include a third phase difference plate disposed between the first phase difference plate and the first polarizing plate, and a fourth phase difference plate disposed between the second phase difference plate and the second polarizing plate. In this case, the thickness direction retardation of at least one of the first phase difference plate, the second phase difference plate, the third phase difference plate, and the fourth phase difference plate has a negative value. When the thickness direction retardation of at least one of the first to fourth phase difference plates has a negative value, the sum of the thickness direction retardations of the first to fourth phase difference plates and the liquid crystal layer decreases. As described above, when the absolute value of the sum of the thickness direction retardations is low, a good black display when no voltage is applied can be achieved when observed from oblique viewing angles.

The structure and features of a liquid crystal display panel according to embodiments of the present invention will be described below with reference to the drawings. Note that the embodiments of the present invention are not limited to this example of the liquid crystal display panel.

First Embodiment

Figure 1B:
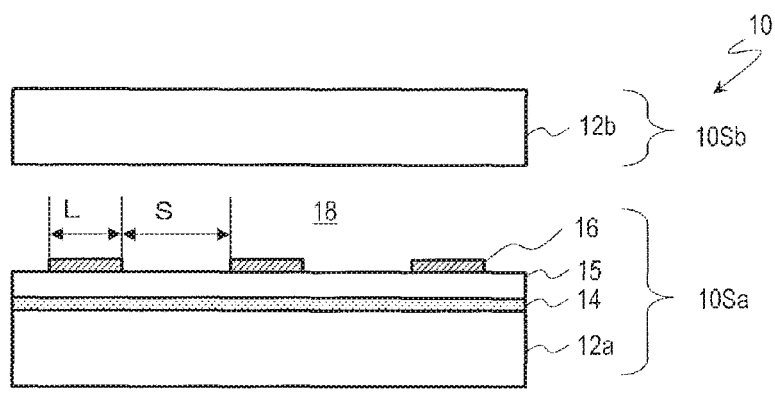
FIG. 1B is a schematic cross-section of a part corresponding to a single pixel in a liquid crystal cell 10 included in the liquid crystal display panel 100.
Figure 1C:
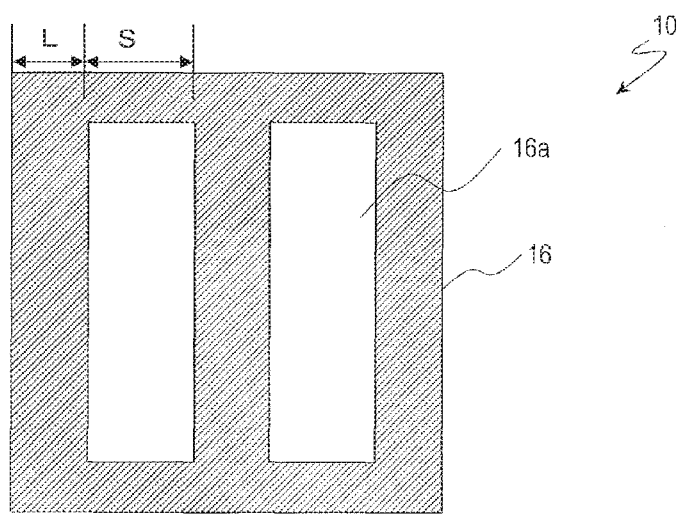
FIG. 1C is a schematic plan view of a part corresponding to a single pixel in the liquid crystal cell 10.

A configuration of a liquid crystal display panel 100 according to the first embodiment of the present invention will be described with reference to FIG. 1. FIG. 1A is a schematic exploded cross-sectional view of the liquid crystal display panel 100 according to a first embodiment of the present invention, also illustrating a backlight 50; FIG. 1B is a schematic cross-section of a part corresponding to a single pixel in a liquid crystal cell 10 included in the liquid crystal display panel 100; and FIG. 1C is a schematic plan view of a part corresponding to a single pixel in the liquid crystal cell 10.

As illustrated in FIG. 1A, the liquid crystal display panel 100 includes: the liquid crystal cell 10; a first polarizing plate 22 disposed on an observer side of the liquid crystal cell 10; a first phase difference plate 32 disposed between the liquid crystal cell 10 and the first polarizing plate 22; a second polarizing plate 24 disposed on a back surface side of the liquid crystal cell 10; and a second phase difference plate 34 disposed between the second polarizing plate 24 and the liquid crystal cell 10. Note that the first phase difference plate 32 and the second phase difference plate 34 can be disposed between the first polarizing plate 22 and a liquid crystal layer 18 and between the second polarizing plate 24 and the liquid crystal layer 18, respectively, and thus the first phase difference plate 32 and the second phase difference plate 34 may be provided within the liquid crystal cell 10.

As illustrated in FIG. 1B, the liquid crystal cell 10 includes a first substrate 10Sa, a second substrate 10Sb, and the liquid crystal layer 18 provided between the first substrate 10Sa and the second substrate 10Sb. The first substrate 10Sa includes a transparent substrate 12a, a common electrode 14 formed on the transparent substrate 12a, a dielectric layer 15 formed on the common electrode 14, and a pixel electrode 16 formed on the dielectric layer 15. A protection film, an alignment film, or the like is formed on the liquid crystal layer 18 side of the pixel electrode 16 as appropriate. The first substrate 10Sa may also include thin film transistors (referred to as "TFTs" hereinafter) for supplying display signal voltages to the pixel electrode 16, as well as gate bus lines and source bus lines for supplying signal voltages to the TFTs (none of these are illustrated). The first substrate 10Sa includes electrode pairs for producing transverse electrical fields in the liquid crystal layer 18, and here, the common electrode 14 and the pixel electrode 16 form an electrode pair. As illustrated in FIG. 1C, the pixel electrode 16 has a plurality of rectangular openings 16a extending parallel to each other. The liquid crystal cell 10 serves as a FFS mode liquid crystal cell. The second substrate 10Sb includes a transparent substrate 12b. For example, a color filter layer or an alignment film (neither of which are illustrated) can be formed on the liquid crystal layer 18 side of the transparent substrate 12b. The FFS mode liquid crystal display panel according to the present embodiment of the present invention is not limited to the example described here, and can be broadly applied to known FFS mode liquid crystal display panels. For example, the arrangement relationship of the common electrode 14 and the pixel electrodes 16 may be reversed.

In the liquid crystal display panel 100, first, the viewing angle dependence of the γ properties can be improved by employing a configuration in which (1) the direction in which a nematic liquid crystal director is rotated by the transverse electrical field at or near the first substrate 10Sa is leftward, and the light passing through the first phase difference plate from the observer side is leftward circular polarized light or leftward elliptical polarized light, or (2) the direction in which the nematic liquid crystal director is rotated by the transverse electrical field at or near the first substrate 10Sa is rightward, and the light passing through the first phase difference plate from the observer side is rightward circular polarized light or rightward elliptical polarized light. This will be described first.

Figure 2A:
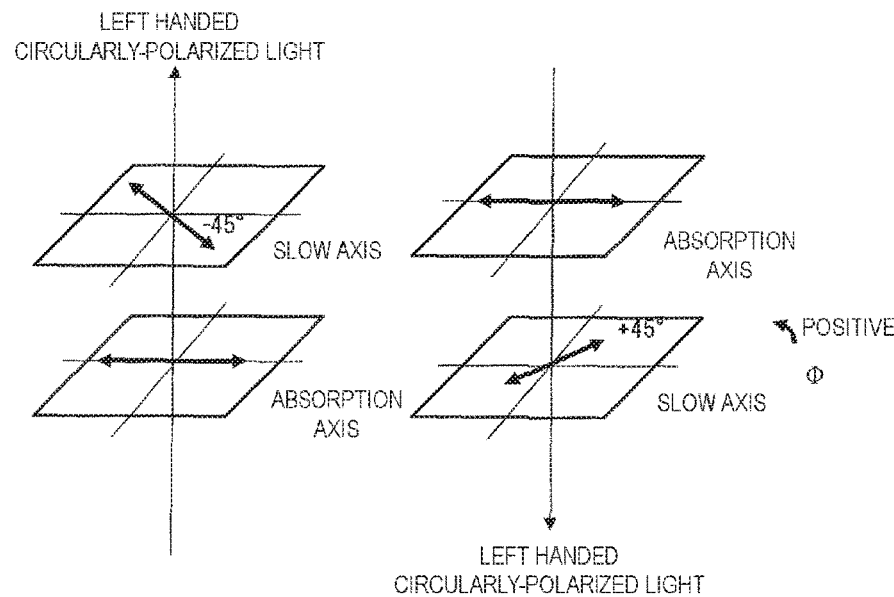
FIG. 2A is a diagram illustrating an arrangement relationship between an absorption axis (polarization axis=orthogonal to a transmission axis) of a polarizing plate and a slow axis of a $\lambda/4$ plate in a case of generating rightward circular polarized light by combining a linear polarizing plate and a $\lambda/4$ plate.
Figure 2B:
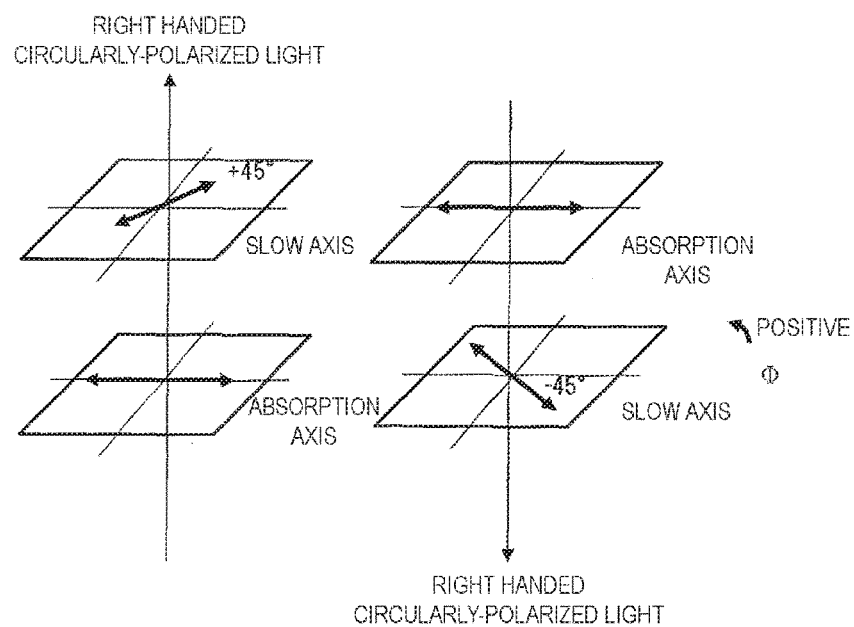
FIG. 2B is a diagram illustrating an arrangement relationship between an absorption axis of a polarizing plate and a slow axis of a $\lambda/4$ plate in a case of generating leftward circular polarized light by combining a linear polarizing plate and a $\lambda/4$ plate.

Here, "rightward circular polarized light" and "leftward circular polarized light" are defined as follows. Circular polarized light in which the rotation direction of an electric vector of the circular polarized light rotates clockwise as viewed along the travel direction is referred to as "rightward circular polarized light" (or "right handed circularly-polarized light"), and in which the stated rotation direction rotates counter-clockwise as viewed along the travel direction is referred to as "leftward circular polarized light" (or "left handed circularly-polarized light"), FIG. 2A illustrates an arrangement relationship between an absorption axis (polarization axis=orthogonal to a transmission axis) of a polarizing plate and a slow axis of λ/4 plate in a case of generating leftward circular polarized light by combining a linear polarizing plate and a λ/4 plate, and FIG. 2B illustrates an arrangement relationship, in a case of generating rightward circular polarized light by combining a linear polarizing plate and λ/4 plate. Note that in the present specification, an azimuth angle Φ is taken as 0° in the direction of three o'clock on the face of a clock, and the counter-clockwise direction is defined as positive.

The "direction in which a nematic liquid crystal director is rotated by the transverse electrical field at or near the first substrate 10Sa" is defined as the rotation direction, viewed from the observer side, in which the liquid crystal director is rotated by the transverse electrical field.

The in-plane retardations of the liquid crystal layer 18, the first phase difference plate 32, and the second phase difference plate 34 are all assumed to be typical values. That is, in a case where the Δnd of the liquid crystal layer 18 is 3λ/4=412.5 nm, the in-plane retardation R1 of the first phase difference plate 32 is λ/4=137.5 nm, and the in-plane retardation R2 of the second phase difference plate 34 is/2=275.0 nm, Δnd=R1+R2 is satisfied. The birefringence Δn of the nematic liquid crystal material was 0.111, and the thickness d of the liquid crystal layer 18 was 3.716 μm.

Here, nematic liquid crystals having a negative dielectric anisotropy were used. The dielectric constant Δε of the nematic liquid crystals was −3.2. Using nematic liquid crystals having a negative dielectric anisotropy has the following advantages. When a voltage is applied to the electrode pair for generating a transverse electrical field in the liquid crystal layer, vertical electrical field components are produced (e.g., at or near the edges of the electrode pair) in addition to the transverse electrical field (an electrical field in the horizontal direction, an electrical field parallel to the liquid crystal layer surface) in the liquid crystal layer. The molecules of nematic liquid crystals having positive dielectric anisotropy align in such a manner that the long axes of the molecules (parallel to the director) are parallel to the electrical field, and thus in regions of strong vertical electrical field components, the liquid crystal molecules stand up, and the retardation in the liquid crystal layer plane drops or becomes uneven. In contrast, the molecules of nematic liquid crystals having negative dielectric anisotropy align such that the long axes of the molecules are orthogonal to the electrical field, and thus the liquid crystal molecules stand up little even in regions of strong vertical electrical field components, maintaining an alignment parallel to the liquid crystal layer plane. Accordingly, using nematic liquid crystals having negative dielectric anisotropy improves the transmittance and the display quality.

A width S of the openings 16a in the pixel electrodes 16 was set to 3.3 μm, and a distance L between the openings 16a and the edges of the pixel electrodes 16 was set to 2.7 μm. In other words, a slitted structure in which L+S is 6.0 μm, and L/S is 2.7 μm/3.3 μm, i.e. 45/55, was used. The thickness of the dielectric layer 15 was set to 100 nm, and the relative dielectric constant was set to 6.

Graphs of the viewing angle dependence of 7 properties were found, for various azimuth angles, through simulations of the configurations illustrated in Table 1 below (Examples 1-1 and 1-2, Comparative Examples 1-1 and 1-2). An LCDMaster 2-D (Shintech, Inc.) was used in the simulations. Table 1 also illustrates quality determinations for viewing angle dependences based on the results of the simulations. The viewing angle dependence was determined to be high (x) in a case where, at an input level of 0.5, an output level at a polar angle of 30° varied by greater than ±10% relative to an output level at a polar angle of 0°.

TABLE 1

|  | Example 1-1 | Example 1-2 | Comparative Example 1-1 | Comparative Example 1-2 |
| --- | --- | --- | --- | --- |
| Rotation direction of observer side circular polarized light | Left | Right | Right | Left |
| Rotation direction of LC director when voltage is applied | Left | Right | Left | Right |
| Viewing angle dependence of γ properties | ○ | ○ | x | x |

Figure 3A:
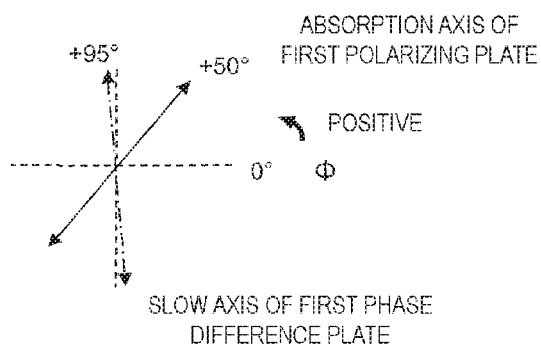
FIGS. 3A to 3C are diagrams schematically illustrating a configuration of a liquid crystal display panel according to Example 1-1, where
Figure 3B:
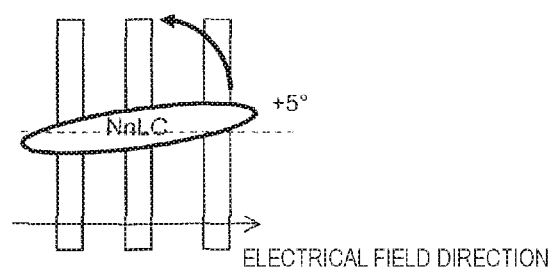
Figure 3C:
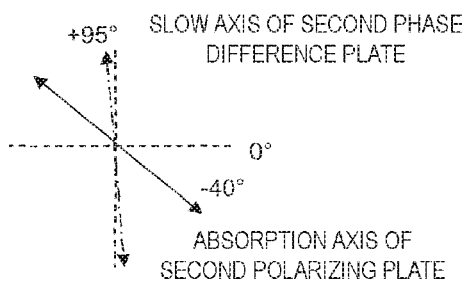

FIGS. 3A to 3C schematically illustrate configurations of a liquid crystal display panel according to Example 1-1. FIG. 3A is a schematic diagram illustrating a relationship between an absorption axis of the first polarizing plate 22 and a slow axis of the first phase difference plate 32, FIG. 3B is a schematic diagram illustrating a relationship between the nematic liquid crystal director and the direction of a transverse electrical field, and a direction in which liquid crystal molecules at or near the bottom-side substrate rotate due to the transverse electrical field, and FIG. 3C is a schematic diagram illustrating a relationship between an absorption axis of the second polarizing plate 24 and a slow axis of the second phase difference plate 34. All of these diagrams illustrate the relationships when viewed from the observer side.

The director of nematic liquid crystals having negative dielectric anisotropy (NnLC) (parallel to the long axes of the oval-shaped liquid crystal molecules) is aligned to form an angle of 5° with respect to a direction of the transverse electrical field (azimuth angle 0°) when no voltage is applied, as indicated in FIG. 3B. When the transverse electrical field is applied, the director of the nematic liquid crystals having negative dielectric anisotropy is aligned to be orthogonal to the electrical field direction, and therefore rotates in the counter-clockwise direction (left rotation), as indicated by the arrow.

The slow axis of the first phase difference plate 32 and the slow axis of the second phase difference plate 34 (azimuth angle 95°) are arranged to be orthogonal to the liquid crystal director (azimuth angle 5°), as illustrated in FIGS. 3A and 3C, respectively.

The absorption axis of the first polarizing plate 22 (azimuth angle 50°) is arranged to form an angle of 45° with respect to the liquid crystal director (azimuth angle 5°), as illustrated in FIG. 3A. The absorption axis of the second polarizing plate 24 (azimuth angle −40°) is arranged to form an angle of −45° with respect to the liquid crystal director (azimuth angle 5°), as illustrated in FIG. 3C. The absorption axis of the first polarizing plate 22 and the absorption axis of the second polarizing plate 24 are orthogonal to each other (a cross Nicol arrangement).

The above-described angles depend on, for example, the precision of lamination carried out in the process of assembling the liquid crystal display panel, and may therefore vary from the design values. Error of approximately ±10 is allowed for each of the angles. Thus, for example, two directions described as being "substantially orthogonal" in the present specification allows for error of ±1 in each of the two directions, and thus means that the two directions form an angle of greater than or equal to 88° and less than or equal to 92°. Error is also allowed for retardation (including in-plane retardations and thickness direction retardations). For example, the thickness of the liquid crystal layer, the retardations of the phase difference plates, and the like may have manufacturing variations. The error in in-plane retardation is approximately ±3 nm. Accordingly, error of ±3 nm from the design values is allowed for Δnd, R1, and R2. The error of the thickness direction retardations of the liquid crystal layer and the phase difference plates is approximately ±10 nm. Accordingly, error of ±10 nm from the design values of the thickness direction retardations of the liquid crystal layer and the phase difference plates is allowed. The same applies hereinafter.

Figure 4A:
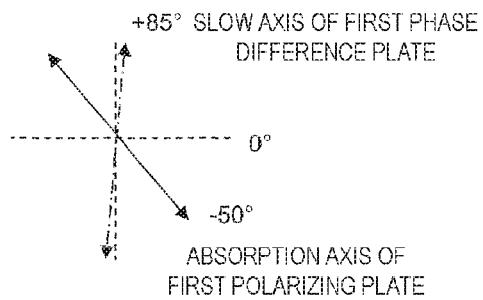
FIGS. 4A to 4C are diagrams schematically illustrating a configuration of a liquid crystal display panel according to Example 1-2, where
Figure 4B:
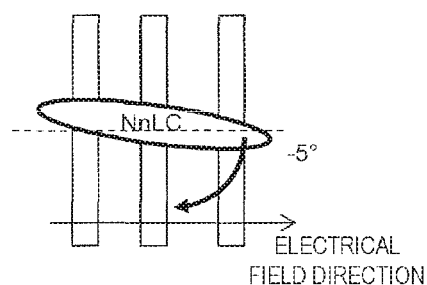
Figure 4C:
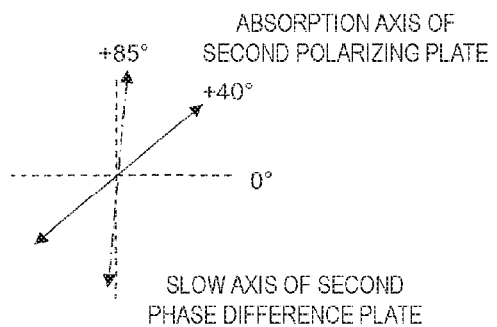

FIGS. 4A to 4C schematically illustrate configurations of a liquid crystal display panel according to Example 1-2. FIG. 4A is a schematic diagram illustrating a relationship between the absorption axis of the first polarizing plate 22 and the slow axis of the first phase difference plate 32, FIG. 4B is a schematic diagram illustrating a relationship between the nematic liquid crystal director and the direction of a transverse electrical field, and a direction in which liquid crystal molecules rotate due to the transverse electrical field, and FIG. 4C is a schematic diagram illustrating a relationship between the absorption axis of the second polarizing plate 24 and the slow axis of the second phase difference plate 34. All of these diagrams illustrate the relationships when viewed from the observer side.

The director of nematic liquid crystals having negative dielectric anisotropy (NnLC) is aligned to form an angle of −5° with respect to the direction of the transverse electrical field (azimuth angle 0°) when no voltage is applied, as indicated in FIG. 4B. When the transverse electrical field is applied, the director of the nematic liquid crystals having negative dielectric anisotropy is aligned to be orthogonal to the electrical field direction, and therefore rotates in the clockwise direction (right rotation), as indicated by the arrow.

The slow axis of the first phase difference plate 32 and the slow axis of the second phase difference plate 34 (azimuth angle 85°) are arranged orthogonal to the liquid crystal director (azimuth angle −5°), as illustrated in FIGS. 4A and 4C, respectively.

The absorption axis of the first polarizing plate 22 (azimuth angle −50°) is arranged to form an angle of −45° with respect to the liquid crystal director (azimuth angle −5°), as illustrated in FIG. 4A. The absorption axis of the second polarizing plate 24 (azimuth angle 40°) is arranged to form an angle of 45° with respect to the liquid crystal director (azimuth angle −5°), as illustrated in FIG. 4C. The absorption axis of the first polarizing plate 22 and the absorption axis of the second polarizing plate 24 are orthogonal to each other (a cross Nicol arrangement).

Figure 5A:
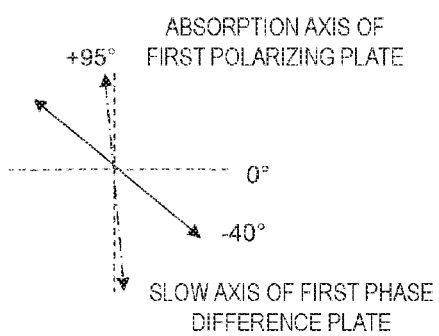
FIGS. 5A to 5C are diagrams schematically illustrating a configuration of a liquid crystal display panel according to Comparative Example 1-1, where
Figure 5B:
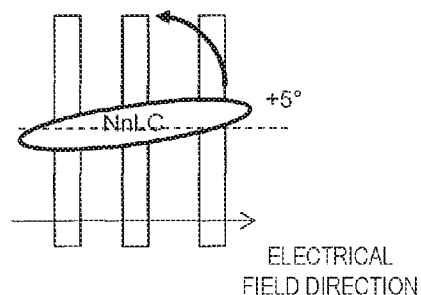
Figure 5C:
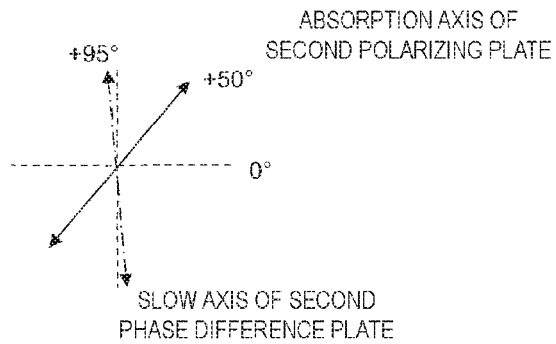

FIGS. 5A to 5C schematically illustrate configurations of a liquid crystal display panel according to Comparative Example 1-1. FIG. 5A is a schematic diagram illustrating a relationship between the absorption axis of the first polarizing plate 22 and the slow axis of the first phase difference plate 32, FIG. 5B is a schematic diagram illustrating a relationship between the nematic liquid crystal director and the direction of a transverse electrical field, and a direction in which liquid crystal molecules rotate due to the transverse electrical field, and FIG. 5C is a schematic diagram illustrating a relationship between the absorption axis of the second polarizing plate 24 and the slow axis of the second phase difference plate 34. All of these diagrams illustrate the relationships when viewed from the observer side.

The director of nematic liquid crystals having negative dielectric anisotropy (NnLC) is aligned to form an angle of 5° with respect to the direction of the transverse electrical field (azimuth angle 0°) when no voltage is applied, as indicated in FIG. 5B. When the transverse electrical field is applied, the director of the nematic liquid crystals having negative dielectric anisotropy is aligned to be orthogonal to the electrical field direction, and therefore rotates in the counter-clockwise direction (left rotation), as indicated by the arrow.

The slow axis of the first phase difference plate 32 and the slow axis of the second phase difference plate 34 (azimuth angle 95°) are arranged orthogonal to the liquid crystal director (azimuth angle 5°), as illustrated in FIGS. 5A and 5C, respectively.

The absorption axis of the first polarizing plate 22 (azimuth angle −40°) is arranged to form an angle of −45° with respect to the liquid crystal director (azimuth angle 5°), as illustrated in FIG. 5A. The absorption axis of the second polarizing plate 24 (azimuth angle 50°) is arranged to form an angle of 45° with respect to the liquid crystal director (azimuth angle 5°), as illustrated in FIG. 5C. The absorption axis of the first polarizing plate 22 and the absorption axis of the second polarizing plate 24 are orthogonal to each other (a cross Nicol arrangement).

Figure 6A:
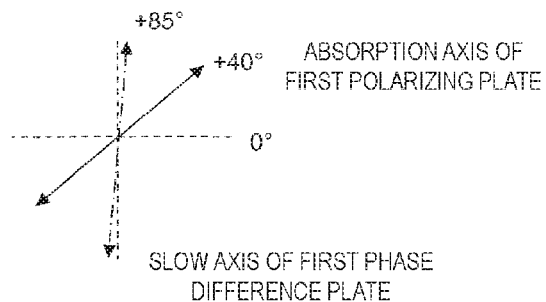
FIGS. 6A to 6C are diagrams schematically illustrating a configuration of a liquid crystal display panel according to Comparative Example 1-2, where
Figure 6B:
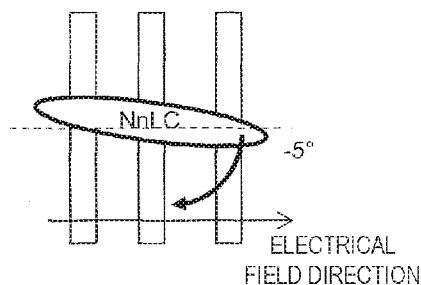
Figure 6C:
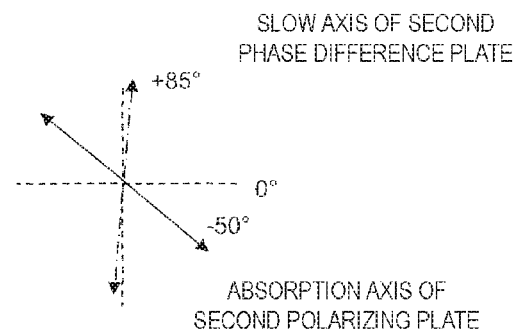

FIGS. 6A to 6C schematically illustrate configurations of a liquid crystal display panel according to Comparative Example 1-2. FIG. 6A is a schematic diagram illustrating a relationship between the absorption axis of the first polarizing plate 22 and the slow axis of the first phase difference plate 32, FIG. 6B is a schematic diagram illustrating a relationship between the nematic liquid crystal director and the direction of a transverse electrical field, and a direction in which liquid crystal molecules rotate due to the transverse electrical field, and FIG. 6C is a schematic diagram illustrating a relationship between the absorption axis of the second polarizing plate 24 and the slow axis of the second phase difference plate 34. All of these diagrams illustrate the relationships when viewed from the observer side.

The director of nematic liquid crystals having negative dielectric anisotropy (NnLC) is aligned to form an angle of −5° with respect to the direction of the transverse electrical field (azimuth angle 0°) when no voltage is applied, as indicated in FIG. 6B. When the transverse electrical field is applied, the director of the nematic liquid crystals having negative dielectric anisotropy is aligned to be orthogonal to the electrical field direction, and therefore rotates in the clockwise direction (right rotation), as indicated by the arrow.

The slow axis of the first phase difference plate 32 and the slow axis of the second phase difference plate 34 (azimuth angle 85°) are arranged orthogonal to the liquid crystal director (azimuth angle −5°), as illustrated in FIGS. 6A and 6C, respectively.

The absorption axis of the first polarizing plate 22 (azimuth angle 40°) is arranged to form an angle of 45° with respect to the liquid crystal director (azimuth angle −5°), as illustrated in FIG. 6A. The absorption axis of the second polarizing plate 24 (azimuth angle −50°) is arranged to form an angle of −45° with respect to the liquid crystal director (azimuth angle −5°), as illustrated in FIG. 6C. The absorption axis of the first polarizing plate 22 and the absorption axis of the second polarizing plate 24 are orthogonal to each other (a cross Nicol arrangement).

FIGS. 7A-A to 7A-C, FIGS. 7B-A to 7A-C, and FIGS. 7C-A and 7C-B are graphs illustrating the viewing angle dependence of the γ properties of the liquid crystal display panel according to Example 1-1. The graphs illustrate polar angle (θ) dependences of the γ properties when the azimuth angle Φ is 5°, 50°, 95°, 140°, 185°, 230°, 275°, and 320° (azimuthal directions at 45°-intervals from the azimuthal direction of the liquid crystal director). The polar angle 0° corresponds to the normal direction of the display surface, and results for 0°, 10°, 20°, 30°, 40°, 50°, and 60° are indicated. In each graph, the horizontal axis represents the input (gray scale) level and the vertical axis represents the output (gray scale) level, and these are normalized according to a maximum gray scale. In a case where the γ properties have no polar angle dependence, in each graph, all of the lines will match a single straight line (connecting a point (0,0) with a point (1,1)). FIGS. 8A-A to 8A-C, FIGS. 8B-A to 8B-C, and FIGS. 8C-A and 8C-B are graphs illustrating the viewing angle dependence of the γ properties of the liquid crystal display panel according to Comparative Example 1-1. FIGS. 8A-A to 8C-B correspond to FIGS. 7A-A to 7C-B, respectively.

Looking at FIGS. 7A-A to 7C-B, the viewing angle dependence of the γ properties of the liquid crystal display panel according to Example 1-1 is low at every azimuth angle, and the viewing angle dependence of the γ properties is particularly low when N=95°, 140°, 275°, and 320°.

In contrast, looking at the viewing angle dependence of the γ properties of the liquid crystal display panel according to Comparative Example 1-1, illustrated in FIGS. 8A-A to 8C-B, the viewing angle dependence of the γ properties is low at Φ=140° and 320°, but the viewing angle dependence of the γ properties is clearly higher than in Example 1-1 at the other azimuth angles.

Next, FIGS. 9A-A to 9A-C, FIGS. 9B-A to 9B-C, and FIGS. 9C-A and 9C-B are graphs illustrating the viewing angle dependence of the γ properties of the liquid crystal display panel according to Example 1-2. The graphs illustrate polar angle (θ) dependences of the γ properties when the azimuth angle Φ is 40°, 85°, 130°, 175°, 220°, 265°, 310°, and 355° (azimuthal directions at 45°-intervals from the azimuthal direction of the liquid crystal director). FIGS. 10A-A to 10A-C, FIGS. 10B-A to 10B-C, and FIGS. 10C-A and 10C-B are graphs illustrating the viewing angle dependence of the γ properties of the liquid crystal display panel according to Comparative Example 1-2. FIGS. 10A-A to 10C-B correspond to FIGS. 9A-A to 9C-B, respectively.

Looking at FIGS. 9A-A to 9C-B, the viewing angle dependence of the γ properties of the liquid crystal display panel according to Example 1-2 is low at every azimuth angle, and the viewing angle dependence of the γ properties is particularly low when Φ=40°, 85°, 220°, and 265°.

In contrast, looking at the viewing angle dependence of the γ properties of the liquid crystal display panel according to Comparative Example 1-2, illustrated in FIGS. 10A-A to 10C-B, the viewing angle dependence of the γ properties is low at Φ=40° and 220°, but the viewing angle dependence of the γ properties is clearly higher than in Example 1-2 at the other azimuth angles.

Thus, it can be seen that using nematic liquid crystals having negative dielectric anisotropy makes it possible to obtain a liquid crystal display panel in which, depending on the combination of the rotation direction of circular polarized light and the rotation of the liquid crystal director (left-left or right-right), the viewing angle dependence of the γ properties is low at all azimuthal directions, as indicated by Example 1-1 and Example 1-2 in Table 1.

Although the liquid crystal display panels according to Example 1-1 and Example 1-2 have overall pixel openings satisfying the condition (1) or (2), the effect of improving the viewing angle dependence of the γ properties can be achieved even the overall pixel openings do not satisfy the condition (1) or (2).

Figure 11:
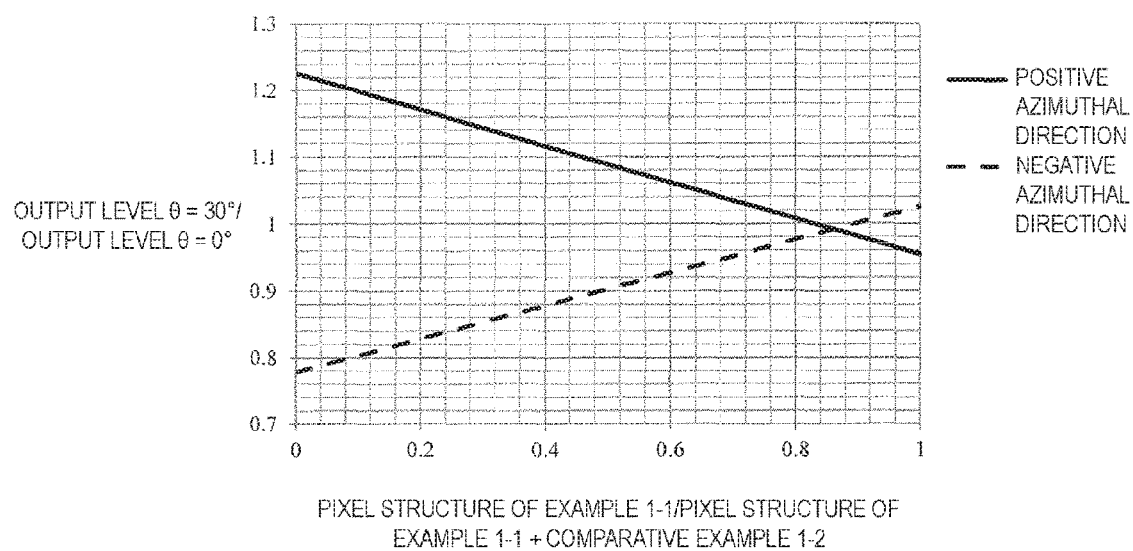
FIG. 11 is a graph illustrating, for a liquid crystal display panel having a combined pixel structure including the pixel structure according to Example 1-1 and the pixel structure according to Comparative Example 1-2, a relationship between a combination ratio of the pixel structure and values of an output level at a polar angle of 30°/an output level at a polar angle of 0° when an input level is 0.5.

For example, FIG. 11 illustrates results of evaluating the γ properties of a liquid crystal display panel having a combined pixel structure, having the pixel structure according to Example 1-1 and the pixel structure according to Comparative Example 1-2, on the basis of a simulation. FIG. 11 is a graph illustrating, for a liquid crystal display panel having the stated combined pixel structure, a relationship between a combination ratio of the pixel structure and values of the output level at a polar angle of 30°/the output level at a polar angle of 0° when the input level is 0.5. The positive azimuthal direction indicates an azimuthal direction at which the output level is the highest, whereas the negative azimuthal direction indicates an azimuthal direction at which the output level is the lowest.

As can be seen from FIG. 11, as long as the ratio of the pixel structure according to Example 1-1 is greater than or equal to 45%, variations in the output level are less than or equal to ±10%, and the viewing angle dependence of the γ properties can be improved.

The effects of a simulation in which nematic liquid crystals having positive dielectric anisotropy (NpLC) are used will be described next. The basic configuration of the liquid crystal display panel is the same as in the above-described examples. The Δn of the nematic liquid crystals having positive dielectric anisotropy was 0.106, and the thickness d of the liquid crystal layer was 3.892 μm. The dielectric constant Δε of the nematic liquid crystals was +7.0.

In a similar manner as described above, graphs of the viewing angle dependence of γ properties were found, for various azimuth angles, through simulations of the configurations illustrated in Table 2 below (Examples 2-1 and 2-2, Comparative Examples 2-1 and 2-2). Table 2 also illustrates quality determinations for viewing angle dependences based on the results of the simulations. The viewing angle dependence was determined to be high (x) in a case where, at an input level of 0.5, an output level at a polar angle of 30° varied by greater than ±10% relative to an output level at a polar angle of 0°.

TABLE 2

|  | Example 2-1 | Example 2-2 | Comparative Example 2-1 | Comparative Example 2-2 |
|---|---|---|---|---|
| Rotation direction of observer side circular polarized light | Right | Left | Left | Right |
| Rotation direction of LC director when voltage is applied | Right | Left | Right | Left |
| Viewing angle dependence of γ properties | ○ | ○ | x | x |

Figure 12A:
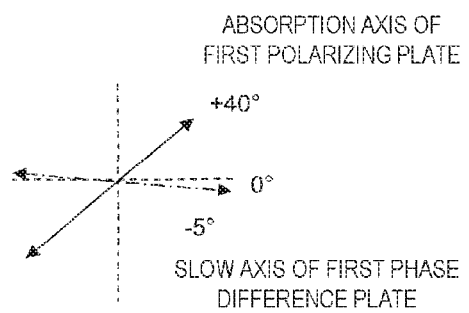
FIGS. 12A to 12C are diagrams schematically illustrating a configuration of a liquid crystal display panel according to Example 2-1, where
Figure 12B:
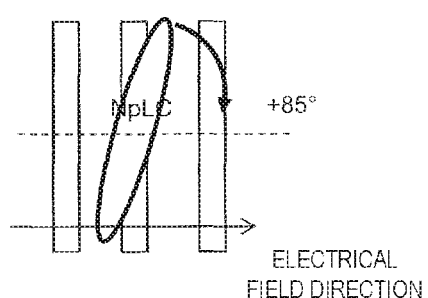
Figure 12C:
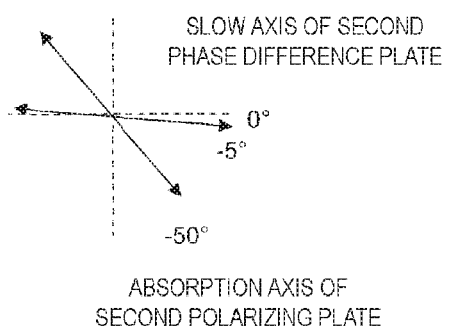

FIGS. 12A to 12C schematically illustrate configurations of a liquid crystal display panel according to Example 2-1. FIG. 12A is a schematic diagram illustrating a relationship between the absorption axis of the first polarizing plate 22 and the slow axis of the first phase difference plate 32, FIG. 12B is a schematic diagram illustrating a relationship between the nematic liquid crystal director and the direction of a transverse electrical field, and a direction in which liquid crystal molecules rotate due to the transverse electrical field, and FIG. 12C is a schematic diagram illustrating a relationship between the absorption axis of the second polarizing plate 24 and the slow axis of the second phase difference plate 34. All of these diagrams illustrate the relationships when viewed from the observer side.

The director of nematic liquid crystals having positive dielectric anisotropy (NpLC) (parallel to the long axes of the oval-shaped liquid crystal molecules) is aligned to form an angle of 85° with respect to the direction of the transverse electrical field (azimuth angle 0°) when no voltage is applied, as indicated in FIG. 12B. When the transverse electrical field is applied, the director of the nematic liquid crystals having positive dielectric anisotropy is aligned parallel to the electrical field direction, and therefore rotates in the clockwise direction (right rotation), as indicated by the arrow.

The slow axis of the first phase difference plate 32 and the slow axis of the second phase difference plate 34 (azimuth angle −5°) are arranged orthogonal to the liquid crystal director (azimuth angle 85°), as illustrated in FIGS. 12A and 12C, respectively.

The absorption axis of the first polarizing plate 22 (azimuth angle 40°) is arranged to form an angle of −45° with respect to the liquid crystal director (azimuth angle 85°), as illustrated in FIG. 12A. The absorption axis of the second polarizing plate 24 (azimuth angle −50°=130°) is arranged to form an angle of 45° with respect to the liquid crystal director (azimuth angle 85°), as illustrated in FIG. 12C. The absorption axis of the first polarizing plate 22 and the absorption axis of the second polarizing plate 24 are orthogonal to each other (a cross Nicol arrangement).

Figure 13A:
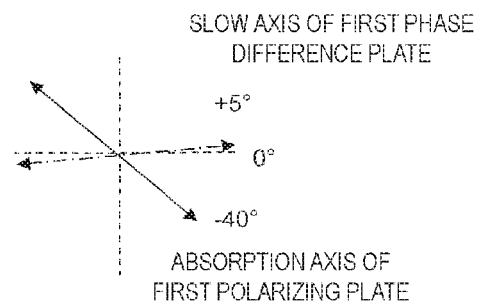
FIGS. 13A to 13C are diagrams schematically illustrating a configuration of a liquid crystal display panel according to Example 2-2, where
Figure 13B:
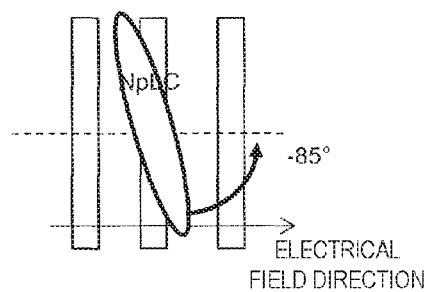
Figure 13C:
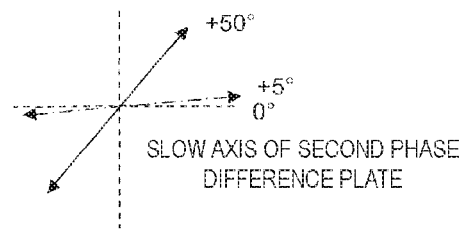

FIGS. 13A to 13C schematically illustrate configurations of a liquid crystal display panel according to Example 2-2. FIG. 13A is a schematic diagram illustrating a relationship between the absorption axis of the first polarizing plate 22 and the slow axis of the first phase difference plate 32, FIG. 13B is a schematic diagram illustrating a relationship between the nematic liquid crystal director and the direction of a transverse electrical field, and a direction in which liquid crystal molecules rotate due to the transverse electrical field, and FIG. 13C is a schematic diagram illustrating a relationship between the absorption axis of the second polarizing plate 24 and the slow axis of the second phase difference plate 34. All of these diagrams illustrate the relationships when viewed from the observer side.

The director of nematic liquid crystals having positive dielectric anisotropy (NpLC) is aligned to form an angle of −85° with respect to the direction of the transverse electrical field (azimuth angle 0°) when no voltage is applied, as indicated in FIG. 13B. When the transverse electrical field is applied, the director of the nematic liquid crystals having positive dielectric anisotropy is aligned parallel to the electrical field direction, and therefore rotates in the counterclockwise direction (left rotation), as indicated by the arrow.

The slow axis of the first phase difference plate 32 and the slow axis of the second phase difference plate 34 (azimuth angle 5°) are arranged orthogonal to the liquid crystal director (azimuth angle −85°), as illustrated in FIGS. 13A and 13C, respectively.

The absorption axis of the first polarizing plate 22 (azimuth angle −40°) is arranged to form an angle of 45° with respect to the liquid crystal director (azimuth angle −85°), as illustrated in FIG. 13A. The absorption axis of the second polarizing plate 24 (azimuth angle 50°=−130°) is arranged to form an angle of −45° with respect to the liquid crystal director (azimuth angle −85°), as illustrated in FIG. 13C. The absorption axis of the first polarizing plate 22 and the absorption axis of the second polarizing plate 24 are orthogonal to each other (a cross Nicol arrangement).

Figure 14A:
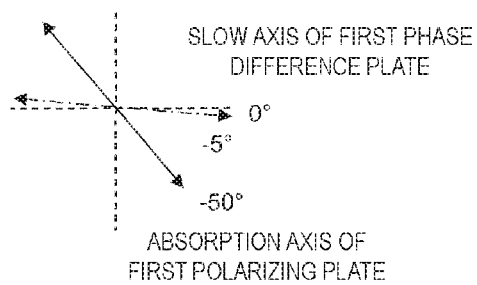
FIGS. 14A to 14C are diagrams schematically illustrating a configuration of a liquid crystal display panel according to Comparative Example 2-1, where
Figure 14B:
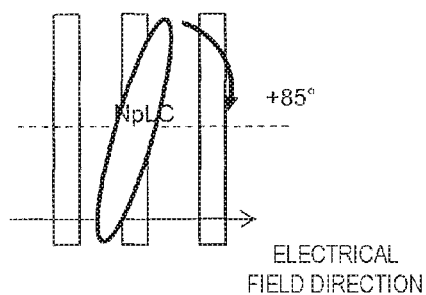
Figure 14C:
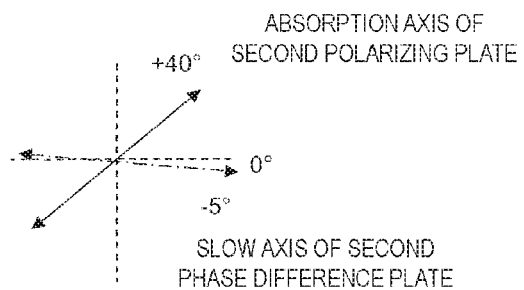

FIGS. 14A to 14C schematically illustrate configurations of a liquid crystal display panel according to Comparative Example 2-1. FIG. 14A is a schematic diagram illustrating a relationship between the absorption axis of the first polarizing plate 22 and the slow axis of the first phase difference plate 32, FIG. 14B is a schematic diagram illustrating a relationship between the nematic liquid crystal director and the direction of a transverse electrical field, and a direction in which liquid crystal molecules rotate due to the transverse electrical field, and FIG. 14C is a schematic diagram illustrating a relationship between the absorption axis of the second polarizing plate 24 and the slow axis of the second phase difference plate 34. All of these diagrams illustrate the relationships when viewed from the observer side.

The director of nematic liquid crystals having positive dielectric anisotropy (NpLC) is aligned to form an angle of 85° with respect to the direction of the transverse electrical field (azimuth angle 0°) when no voltage is applied, as indicated in FIG. 14B. When the transverse electrical field is applied, the director of the nematic liquid crystals having positive dielectric anisotropy is aligned parallel to the electrical field direction, and therefore rotates in the clockwise direction (right rotation), as indicated by the arrow.

The slow axis of the first phase difference plate 32 and the slow axis of the second phase difference plate 34 (azimuth angle −5°) are arranged orthogonal to the liquid crystal director (azimuth angle 85°), as illustrated in FIGS. 14A and 14C, respectively.

The absorption axis of the first polarizing plate 22 (azimuth angle −50°=130°) is arranged to form an angle of 45° with respect to the liquid crystal director (azimuth angle 85°), as illustrated in FIG. 14A. The absorption axis of the second polarizing plate 24 (azimuth angle 40°) is arranged to form an angle of −45° with respect to the liquid crystal director (azimuth angle 85°), as illustrated in FIG. 14C. The absorption axis of the first polarizing plate 22 and the absorption axis of the second polarizing plate 24 are orthogonal to each other (a cross Nicol arrangement).

Figure 15A:
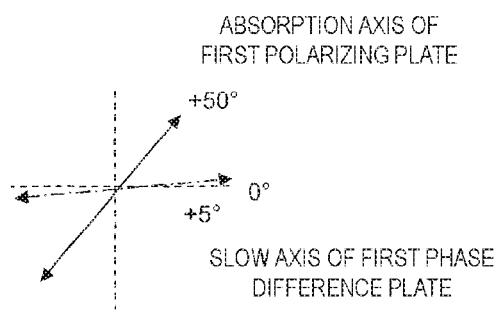
FIGS. 15A to 15C are diagrams schematically illustrating a configuration of a liquid crystal display panel according to Comparative Example 2-2, where
Figure 15B:
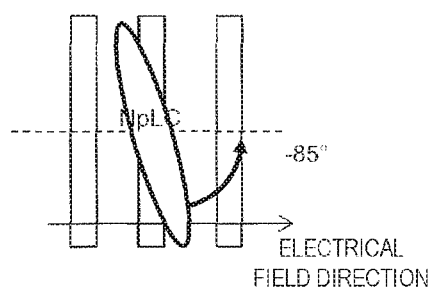
Figure 15C:
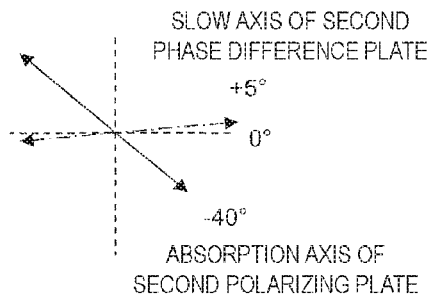

FIGS. 15A to 15C schematically illustrate configurations of a liquid crystal display panel according to Comparative Example 2-2. FIG. 15A is a schematic diagram illustrating a relationship between the absorption axis of the first polarizing plate 22 and the slow axis of the first phase difference plate 32, FIG. 15B is a schematic diagram illustrating a relationship between the nematic liquid crystal director and the direction of a transverse electrical field, and a direction in which liquid crystal molecules rotate due to the transverse electrical field, and FIG. 15C is a schematic diagram illustrating a relationship between the absorption axis of the second polarizing plate 24 and the slow axis of the second phase difference plate 34. All of these diagrams illustrate the relationships when viewed from the observer side.

The director of nematic liquid crystals having positive dielectric anisotropy (NpLC) is aligned to form an angle of −85° with respect to the direction of the transverse electrical field (azimuth angle 0°) when no voltage is applied, as indicated in FIG. 15B. When the transverse electrical field is applied, the director of the nematic liquid crystals having positive dielectric anisotropy is aligned parallel to the electrical field direction, and therefore rotates in the counterclockwise direction (left rotation), as indicated by the arrow.

The slow axis of the first phase difference plate 32 and the slow axis of the second phase difference plate 34 (azimuth angle 5°) are arranged orthogonal to the liquid crystal director (azimuth angle −85°), as illustrated in FIGS. 15A and 15C, respectively.

The absorption axis of the first polarizing plate 22 (azimuth angle 50°=−130°) is arranged to form an angle of −45° with respect to the liquid crystal director (azimuth angle −85°), as illustrated in FIG. 15A. The absorption axis of the second polarizing plate 24 (azimuth angle −40°) is arranged to form an angle of 45° with respect to the liquid crystal director (azimuth angle −85°), as illustrated in FIG. 15C. The absorption axis of the first polarizing plate 22 and the absorption axis of the second polarizing plate 24 are orthogonal to each other (a cross Nicol arrangement).

FIGS. 16A-A to 16A-C, FIGS. 16B-A to 16B-C, and FIGS. 16C-A and 16C-B are graphs illustrating the viewing angle dependence of the γ properties of the liquid crystal display panel according to Example 2-1. The graphs illustrate polar angle (θ) dependences of the γ properties when the azimuth angle Φ is 40°, 85°, 130°, 175°, 220°, 265°, 310°, and 355° (azimuthal directions at 45°-intervals from the azimuthal direction of the liquid crystal director). FIGS. 17A-A to 17A-C, FIGS. 17B-A to 17B-C, and FIGS. 17C-A and 17C-B are graphs illustrating the viewing angle dependence of the γ properties of the liquid crystal display panel according to Comparative Example 2-1. FIGS. 17A-A to 17C-B correspond to FIGS. 16A-A to 16C-B, respectively.

Looking at FIGS. 16A-A to 16C-B, the viewing angle dependence of the γ properties of the liquid crystal display panel according to Example 2-1 is low at every azimuth angle.

In contrast, looking at the viewing angle dependence of the γ properties of the liquid crystal display panel according to Comparative Example 2-1, illustrated in FIGS. 17A-A to 17C-B, the viewing angle dependence of the γ properties is clearly higher than in Example 2-1 at Φ=85°, 175°, 265°, and 355°.

Next, FIGS. 18A-A to 18A-C, FIGS. 18B-A to 18B-C, and FIGS. 18C-A and 18C-B are graphs illustrating the viewing angle dependence of the γ properties of the liquid crystal display panel according to Example 2-2. The graphs illustrate polar angle (θ) dependences of the γ properties when the azimuth angle Φ is 5°, 50°, 95°, 140°, 185°, 230°, 275°, and 320° (azimuthal directions at 45°-intervals from the azimuthal direction of the liquid crystal director). FIGS. 19AA to 19A-C, FIGS. 19B-A to 19B-C, and FIGS. 19C-A and 19C-B are graphs illustrating the viewing angle dependence of the γ properties of the liquid crystal display panel according to Comparative Example 2-2. FIGS. 19A-A to 19C-B correspond to FIGS. 18A-A to 18C-B, respectively.

Looking at FIGS. 18A-A to 18C-B, the viewing angle dependence of the γ properties of the liquid crystal display panel according to Example 2-2 is low at every azimuth angle.

In contrast, looking at the viewing angle dependence of the γ properties of the liquid crystal display panel according to Comparative Example 2-2, illustrated in FIGS. 19A-A to 19C-B, the viewing angle dependence of the γ properties is clearly higher than in Example 2-2 at 1=5°, 95°, 185°, and 275°.

Thus, it can be seen that using nematic liquid crystals having positive dielectric anisotropy, too, makes it possible to obtain a liquid crystal display panel in which, depending on the combination of the rotation direction of circular polarized light and the rotation of the liquid crystal director (left-left or right-right), the viewing angle dependence of the γ properties is low at all azimuthal directions, as indicated by Example 2-1 and Example 2-2 in Table 1.

Although the liquid crystal display panels according to Example 2-1 and Example 2-2 have overall pixel openings satisfying the condition (1) or (2), the effect of improving the viewing angle dependence of the γ properties can be achieved even in a case where the overall pixel openings do not satisfy the condition (1) or (2).

For example, FIG. 20 illustrates results of evaluating the γ properties of a liquid crystal display panel having a combined pixel structure, having the pixel structure according to Example 2-1 and the pixel structure according to Comparative Example 2-2, on the basis of a simulation. FIG. 20 is a graph illustrating, for a liquid crystal display panel having the stated combined pixel structure, a relationship between a combination ratio of the pixel structure and values of the output level at a polar angle of 30°/the output level at a polar angle of 0° when the input level is 0.5. The positive azimuthal direction indicates an azimuthal direction at which the output level is the highest, whereas the negative azimuthal direction indicates an azimuthal direction at which the output level is the lowest.

As can be seen from FIG. 20, as long as the ratio of the pixel structure according to Example 2-1 is greater than or equal to 38%, variation in the output level is less than or equal to ±10%, and the viewing angle dependence of the γ properties can be improved.

Results of investigating an allowable range for the Δnd of the liquid crystal layer 18 in a case where nematic liquid crystals having negative dielectric anisotropy are used will be described next with reference to FIGS. 21A and 21B. In the liquid crystal display panel 100, changes in the transmittance were found by setting the in-plane retardation R1 of the first phase difference plate 32 to 137.5 nm (λ/4) and varying the Δnd of the liquid crystal layer 18 from 350 nm to 550 nm. The in-plane retardation R2 of the second phase difference plate 34 was set so that R2=Δnd−R1.

Additionally, simulations were carried out for liquid crystal display panels having different L+S for the slitted structure of the pixel electrodes 16. Table 3 below illustrates the L+S and the L/S of the slitted structures used in the simulations.

Simulations were also carried out for Comparative Examples 3-1 to 3-3 and 3-5, which are liquid crystal display panels having similar structures as those of Examples 3-1 to 3-3 and 3-5 but use past fringe field switching modes with the first and second phase difference plates omitted.

a range of 4 μm±0.5 μm. A transmittance of greater than or equal to 30% can be achieved in a Δnd range of greater than or equal to 380 nm and less than or equal to 460 nm in a case where L+S is in a range of 5 μm±0.5 μm. A transmittance of greater than or equal to 30% can be achieved in a Δnd range of greater than or equal to 390 nm and less than or equal to 470 nm in a case where L+S is in a range of 6 μm±0.5 μm. A transmittance of greater than or equal to 30% can be achieved in a Δnd range of greater than or equal to 400 nm and less than or equal to 480 nm in a case where L+S is in a range of 7 μm±0.5 μm. A transmittance of greater than or equal to 30% can be achieved in a Δnd range of greater than or equal to 410 nm and less than or equal to 490 nm in a case where L+S is in a range of 8 μm±0.5 μm.

Figure 21A:
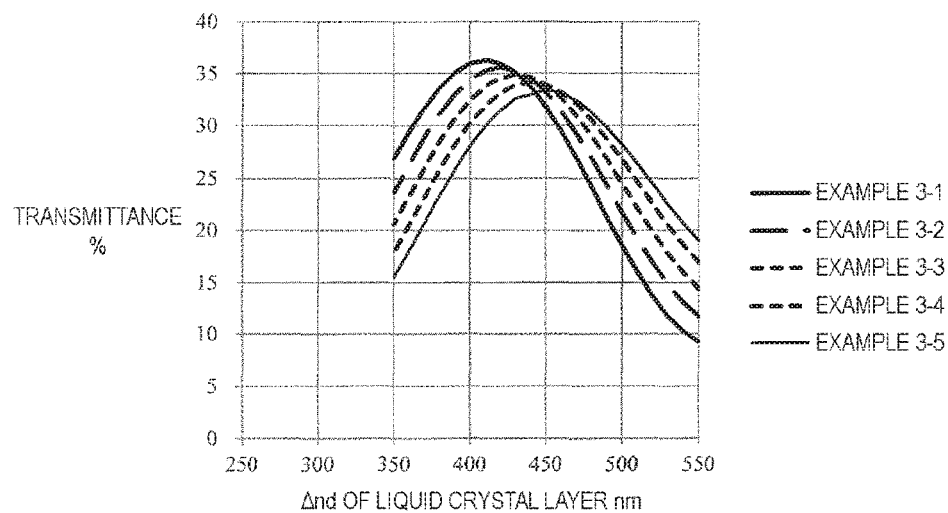
FIG. 21A is a graph illustrating Δnd dependences on transmittances of liquid crystal display panels according to Examples 3-1 to 3-5.
Figure 21B:
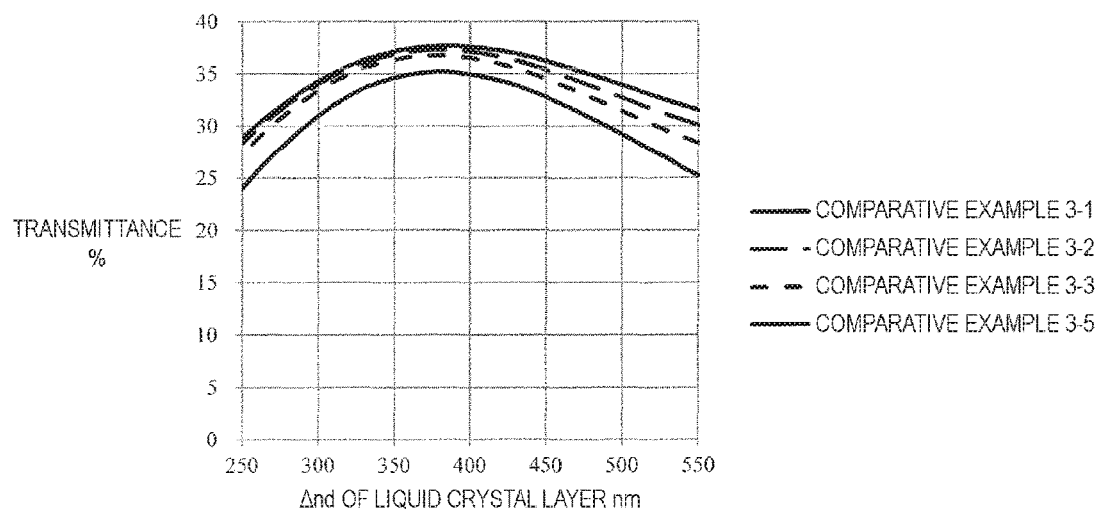
FIG. 21B is a graph illustrating Δnd dependences on transmittances of liquid crystal display panels according to Comparative Examples 3-1 to 3-3 and 3-5.

From FIG. 21B, it can be seen that the transmittances of the liquid crystal display panels according to the comparative examples do not depend on Δnd significantly, and that the Δnd where the transmittance is maximum is at or near 380 nm. In comparing these values, it can be said that in terms of the transmittances of the liquid crystal display panels according to the examples, the preferred range for Δnd is broad. Thus, in the configurations according to the examples, a region of high transmittance is present only in

TABLE 3

|  | Example 3-1 | Example 3-2 | Example 3-3 | Example 3-4 | Example 3-5 |
|---|---|---|---|---|---|
| First phase difference plate R1 | 137.5 nm | 137.5 nm | 137.5 nm | 137.5 nm | 137.5 nm |
| Liquid crystal layer Δnd | 370 nm to 450 nm | 380 nm to 460 nm | 390 nm to 470 nm | 400 nm to 480 nm | 410 nm to 490 nm |
| Second phase difference plate R2 | Δnd-R1 | Δnd-R1 | Δnd-R1 | Δnd-R1 | Δnd-R1 |
| L + S | 4 μm | 5 μm | 6 μm | 7 μm | 8 μm |
| L/S | 1.8 μm/2.2 μm 45/55 | 2.2 μm/2.8 μm 44/56 | 2.7 μm/3.3 μm 45/55 | 3.1 μm/3.9 μm 44/56 | 3.6 μm/4.4 μm 45/55 |

FIG. 21A is a graph illustrating the Δnd dependence of the transmittance in Examples 3-1 to 3-5, whereas FIG. 21B is a graph illustrating the Δnd dependence of the transmittance in Comparative Examples 3-1 to 3-3 and 3-5.

By comparing FIG. 21A with FIG. 21B, it can be seen that unlike the liquid crystal display panels according to the comparative examples, in the liquid crystal display panels according to the examples, the transmittance varies greatly depending on the L+S of the slitted structure, and the transmittance also varies greatly depending on the Δnd of the liquid crystal layer. As indicated in FIG. 21A and Table 3, it can be seen that as L+S increases from 4 μm to 8 μm, the Δnd at which the transmittance is maximum also increases, and that there is a preferred Δnd with respect to the L+S. It can be said that as long as L+S is greater than or equal to 4 μm and less than or equal to 8 μm, there will be a Δnd where the transmittance is maximum in a Δnd range of greater than or equal to 370 nm and less than or equal to 490 nm. Additionally, a transmittance of greater than or equal to 30% can be achieved in this range. More preferably, a transmittance of greater than or equal to 30% can be achieved in a Δnd range of greater than or equal to 370 nm and less than or equal to 450 nm in a case where L+S is in a limited range of the Δnd of the liquid crystal layer, unlike in the configurations according to the comparative examples.

As will be described later, this result does not substantially depend on the L/S, the Δn, and an elastic constant of the liquid crystal material.

Results of investigating an allowable range for the Δnd of the liquid crystal layer 18 in a case where nematic liquid crystals having positive dielectric anisotropy are used will be described next with reference to FIGS. 22A and 22B. Except for using nematic liquid crystals having positive dielectric anisotropy, the configurations of Examples 4-1 to 4-5 are the same as Examples 3-1 to 3-5. Because nematic liquid crystals having positive dielectric anisotropy are used, the values of the Δnd of the liquid crystal layer and of the in-plane retardation R2 of the second phase difference plate (=Δnd−R1) are different from the values used in Examples 3-1 to 3-5. Simulations were also carried out for Comparative Examples 4-1 to 4-3 and 4-5, which are liquid crystal display panels having similar structures as those of Examples 4-1 to 4-3 and 4-5 but use past fringe field switching modes with the first and second phase difference plates omitted.

TABLE 4

|  | Example 4-1 | Example 4-2 | Example 4-3 | Example 4-4 | Example 4-5 |
|---|---|---|---|---|---|
| First phase difference plate R1 | 137.5 nm | 137.5 nm | 137.5 nm | 137.5 nm | 137.5 nm |

TABLE 4-continued

|  | Example 4-1 | Example 4-2 | Example 4-3 | Example 4-4 | Example 4-5 |
|---|---|---|---|---|---|
| Liquid crystal layer $\Delta$nd | 360 nm to 440 nm | 370 nm to 440 nm | 370 nm to 450 nm | 380 nm to 440 nm | 400 nm to 440 nm |
| Second phase difference plate R2 | $\Delta$nd-R1 | $\Delta$nd-R1 | $\Delta$nd-R1 | $\Delta$nd-R1 | $\Delta$nd-R1 |
| L + S | 4 µm | 5 µm | 6 µm | 7 µm | 8 µm |
| L/S | 1.8 µm/2.2 µm 45/55 | 2.2 µm/2.8 µm 44/56 | 2.7 µm/3.3 µm 45/55 | 3.1 µm/3.9 µm 44/56 | 3.6 µm/4.4 µm 45/55 |

Figure 22A:
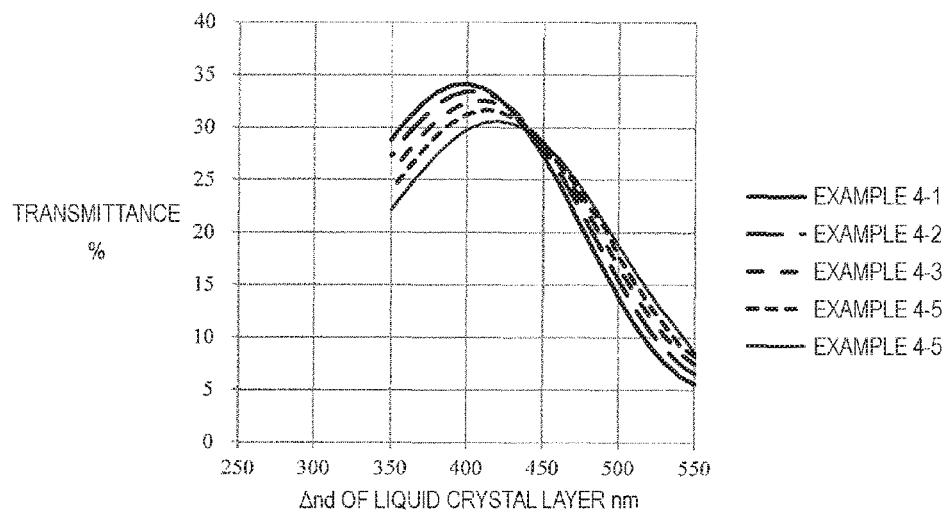
FIG. 22A is a graph illustrating Δnd dependences on transmittances of liquid crystal display panels according to Examples 4-1 to 4-5.
Figure 22B:
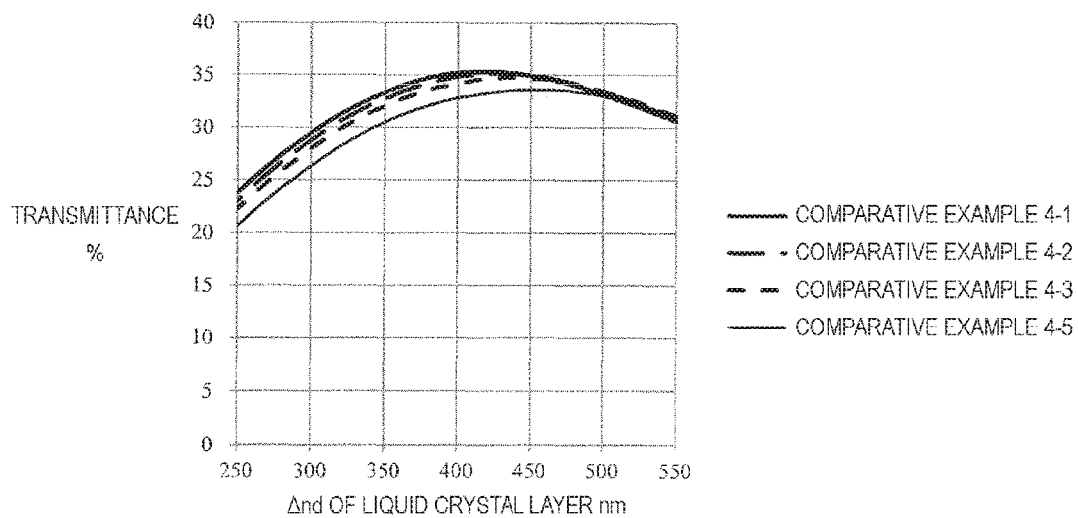
FIG. 22B is a graph illustrating Δnd dependences on transmittances of liquid crystal display panels according to Comparative Examples 4-1 to 4-3 and 4-5.

FIG. 22A is a graph illustrating the $\Delta$nd dependence of the transmittance in Examples 4-1 to 4-5, whereas FIG. 22B is a graph illustrating the $\Delta$nd dependence of the transmittance in Comparative Examples 4-1 to 4-3 and 4-5.

In comparing FIG. 22A and FIG. 22B, it can be seen that unlike the liquid crystal display panels according to the comparative examples, in the liquid crystal display panels according to the examples, the transmittance varies greatly depending on the L+S of the slitted structure, and the transmittance also varies greatly depending on the $\Delta$nd of the liquid crystal layer. As indicated in FIG. 22A and Table 4, it can be seen that as L+S increases from 4 µm to 8 µm, the $\Delta$nd at which the transmittance is maximum also increases, and that there is a preferred $\Delta$nd with respect to the L+S. It can be said that as long as L+S is greater than or equal to 4 µm and less than or equal to 8 µm, there will be a $\Delta$nd where the transmittance is maximum in a $\Delta$nd range of greater than or equal to 360 nm and less than or equal to 440 nm. More preferably, a transmittance of greater than or equal to 30% can be achieved in a $\Delta$nd range of greater than or equal to 360 nm and less than or equal to 440 nm in a case where L+S is in a range of 4 µm±0.5 µm. A transmittance of greater than or equal to 30% can be achieved in a $\Delta$nd range of greater than or equal to 370 nm and less than or equal to 440 nm in a case where L+S is in a range of 5 µm±0.5 µm. A transmittance of greater than or equal to 30% can be achieved in a $\Delta$nd range of greater than or equal to 370 nm and less than or equal to 450 nm in a case where L+S is in a range of 6 µm±0.5 µm. A transmittance of greater than or equal to 30% can be achieved in a $\Delta$nd range of greater than or equal to 380 nm and less than or equal to 440 nm in a case where L+S is in a range of 7 µm±0.5 µm. A transmittance of greater than or equal to 30% can be achieved in a $\Delta$nd range of greater than or equal to 400 nm and less than or equal to 440 nm in a case where L+S is in a range of 8 µm±0.5 µm.

From FIG. 22B, it can be seen that the transmittances of the liquid crystal display panels according to the comparative examples do not depend on $\Delta$nd significantly, and that the $\Delta$nd where the transmittance is maximum is at or near 400 nm. Thus, in the configurations according to the examples, a region of high transmittance is present only in a limited range of the $\Delta$nd of the liquid crystal layer, unlike in the configurations according to the comparative examples.

Figure 23A:
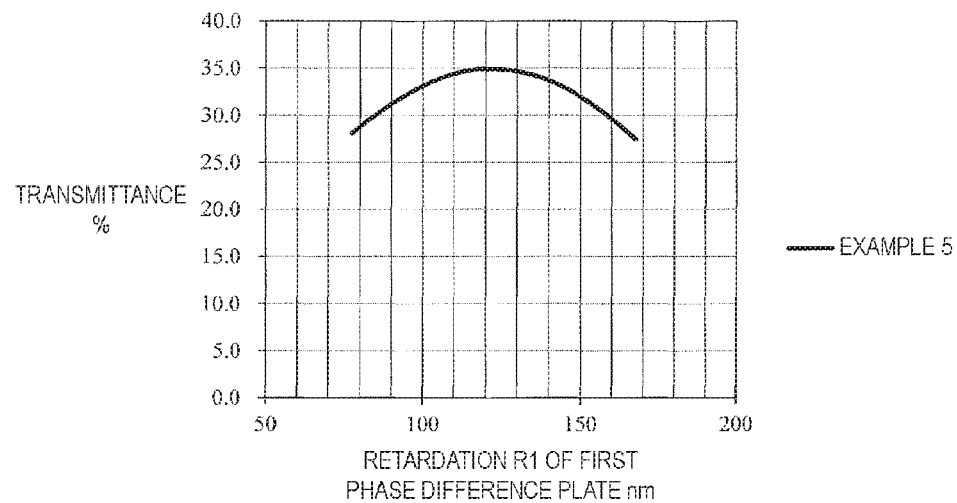
FIG. 23A is a graph illustrating the dependence of the in-plane retardation R1 of the first phase difference plate 32 on the transmittance in a liquid crystal display panel according to Example 5.
Figure 23B:
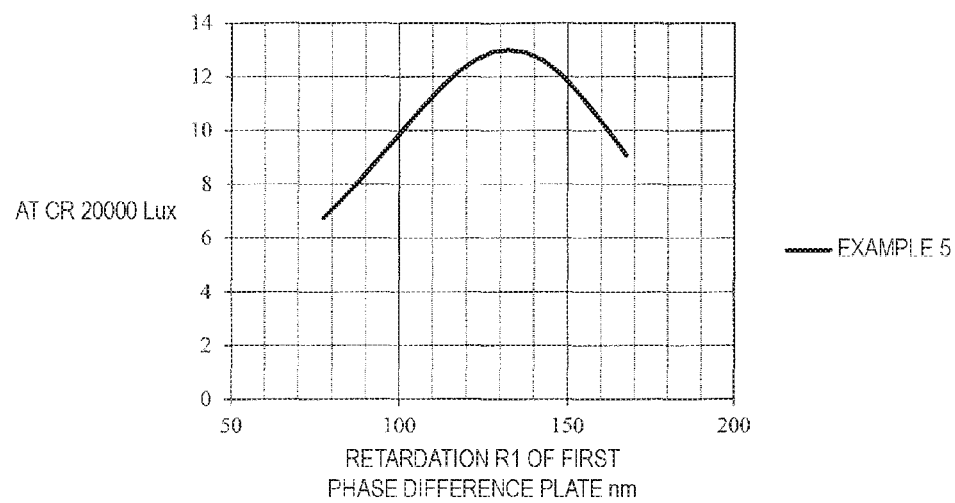
FIG. 23B is a graph illustrating the dependence of the in-plane retardation R1 of the first phase difference plate 32 on the contrast ratio in the liquid crystal display panel according to Example 5 at high illuminance.

Results of investigating an allowable range for the in-plane retardation R1 of the first phase difference plate 32 will be described next with reference to FIGS. 23A and 23B. Using a configuration of Example 3-3 as a base, the transmittance and contrast ratio at high illuminance were found through a simulation for a liquid crystal display panel according to Example 5, using 412.5 nm for the $\Delta$nd of the liquid crystal layer 18 and varying the in-plane retardation R1 of the first phase difference plate 32. The in-plane retardation R2 of the second phase difference plate 34 was set so that R2=$\Delta$nd−R1. The results are illustrated in FIGS. 23A and 23B.

An antireflective effect is highest when the in-plane retardation R1 of the first phase difference plate 32 is 137.5 nm ($\lambda$/4). On the other hand, the transmittance rises when R1 deviates from these conditions. As can be seen from FIG. 23A, the maximum value of the transmittance is at or near 120 nm. The contrast ratio at a high luminance of 20000 Lux is affected by both the degree of the antireflective effect and the transmittance. As can be seen from FIG. 23B, the value of R1 at which the contrast ratio at a high luminance of 20000 Lux is the maximum value is 130 nm, which is only slightly less than the 137.5 nm at which the antireflective effect is maximum. From the results illustrated in FIG. 23B, it can be seen that a contrast ratio of greater than or equal to 10 can be achieved at high illuminance as long as R1 is greater than or equal to 100 nm and less than or equal to 160 nm.

Figure 24:
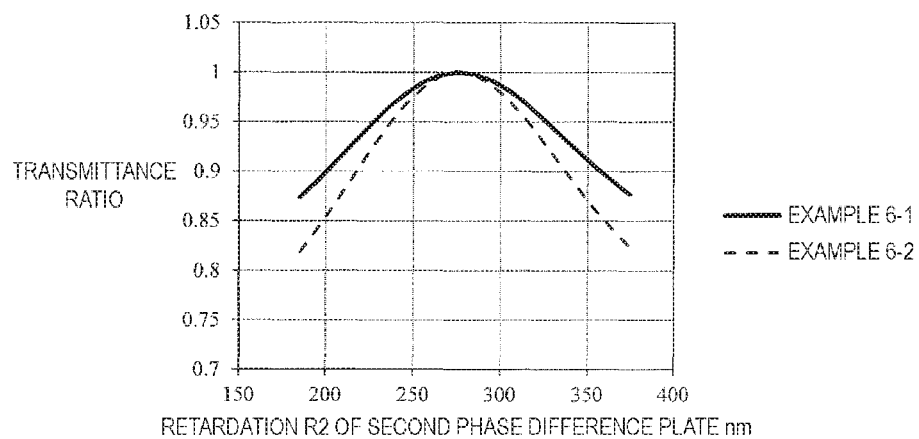
FIG. 24 is a graph illustrating the dependence of the in-plane retardation R2 of the second phase difference plate 34 on a luminance ratio in liquid crystal display panels according to Examples 6-1 and 6-2.

Results of investigating an allowable range for the in-plane retardation R2 of the second phase difference plate 34 will be described next with reference to FIG. 24. Using a configuration of Example 3-3 as a base, a transmittance was found through a simulation, using 137.5 nm ($\lambda$/4) for the in-plane retardation R1 of the first phase difference plate 32 and varying the value of the in-plane retardation R2 of the second phase difference plate 34. The $\Delta$nd of the liquid crystal layer was set to $\Delta$nd=R1+R2. Note that the transmittance ratio was found for two types of liquid crystal display panel, namely the liquid crystal display panel according to Example 6-1, having an opening ratio of 50%, and that according to Example 6-2, having an opening ratio of 30%. Here, the transmittance ratio is a value obtained in a case where the transmittance when the in-plane retardation R2 of the second phase difference plate 34 according to Examples 6-1 and 6-2, respectively, is set to 275 nm ($\lambda$/2). FIG. 24 illustrates the results. As can be seen from FIG. 24, the reusage efficiency of light reflected toward the backlight is high when the in-plane retardation R2 of the second phase difference plate 34 is 275 nm ($\lambda$/2). The same applies to when the opening ratio is 30% or 50%. Based on FIG. 24, the in-plane retardation R2 of the second phase difference plate is preferably greater than or equal to 200 nm and less than or equal to 360 nm, and more preferably greater than or equal to 220 nm and less than or equal to 330 nm. It is preferable that the lower the opening ratio of the liquid crystal display panel is, the closer the in-plane retardation R2 of the second phase difference plate be to 275 nm.

Figure 25:
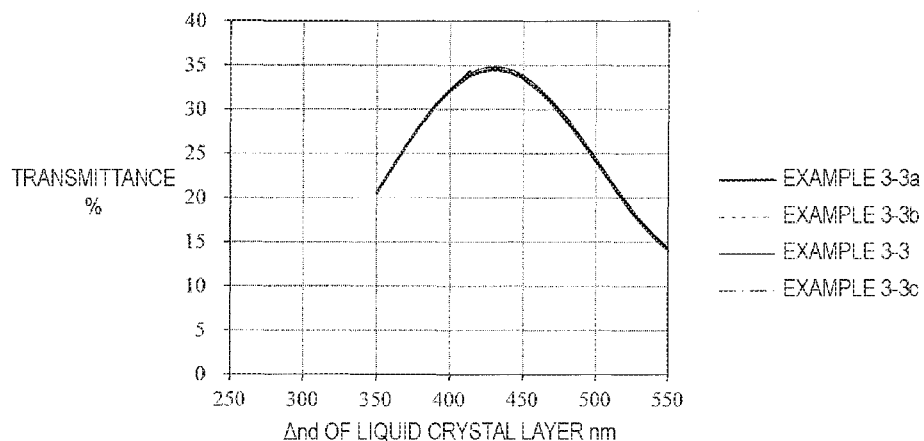
FIG. 25 is a graph illustrating Δnd dependences on the transmittances of liquid crystal display panels having different L/S (Examples 3-3a, 3-3b, and 3-3c).

Next, FIG. 25 illustrates the results of finding transmittances of the liquid crystal display panel according to Example 3-3, having a structure in which the $\Delta$nd of the liquid crystal layer is 412.5 nm, while varying the L/S in the liquid crystal display panel (Examples 3-3a, 3-3b, and 3-3c).

Values of the L/S of the liquid crystal display panels according to Examples 3-3a, 3-3b, and 3-3c are illustrated in Table 5 below.

TABLE 5

|  | Example 3-3 | Example 3-3a | Example 3-3b | Example 3-3c |
|---|---|---|---|---|
| Liquid crystal layer Δnd | 412.5 nm | 412.5 nm | 412.5 nm | 412.5 nm |
| L + S | 6 μm | 6 μm | 6 μm | 6 μm |
| L/S | 2.7 μm/ 3.3 μm 45/55 | 3.3 μm/2.7 μm 55/45 | 3.0 μm/3.0 μm 50/50 | 2.5 μm/3.5 μm 42/58 |

As can be seen from FIG. 25, the transmittance is not substantially affected by the L/S in an L/S range of greater than 40/60 and less than or equal to 55/45.

Figure 26:
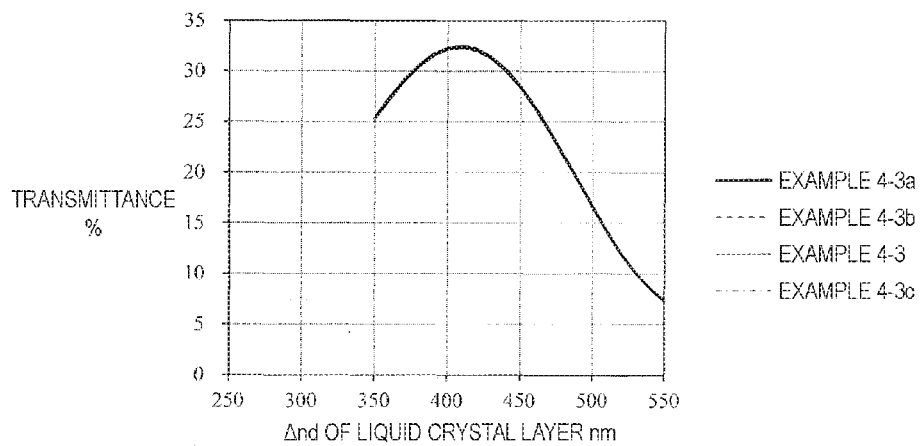
FIG. 26 is a graph illustrating Δnd dependences on the transmittances of liquid crystal display panels having different L/S (Examples 4-3a, 4-3b, and 4-3c).
Figure 27A:
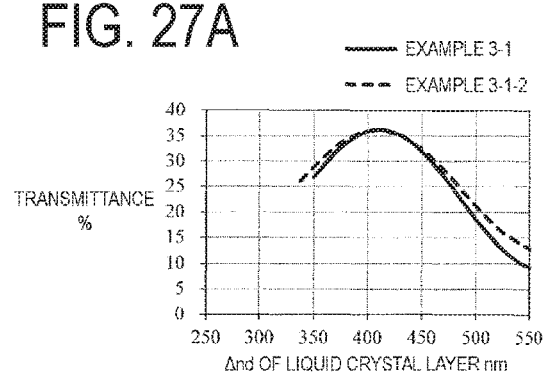
FIGS. 27A to 27D are graphs illustrating Δnd dependences on the transmittances of liquid crystal display panels in which d is fixed and Δn is varied (Examples 3-1-2, 3-2-2, 3-3-2, and 3-5-2).
Figure 27B:
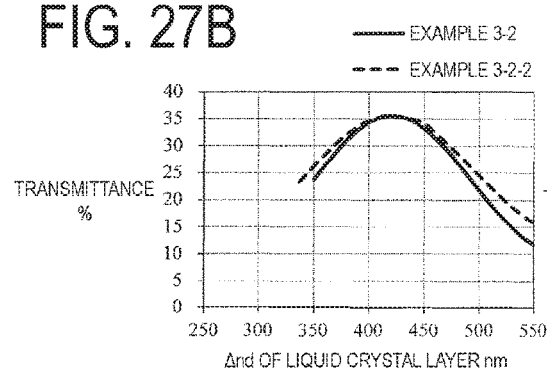
Figure 27C:
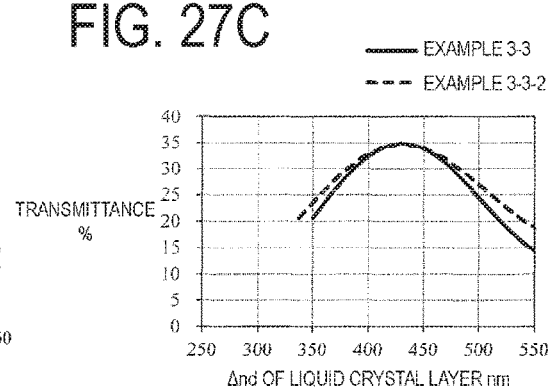
Figure 27D:
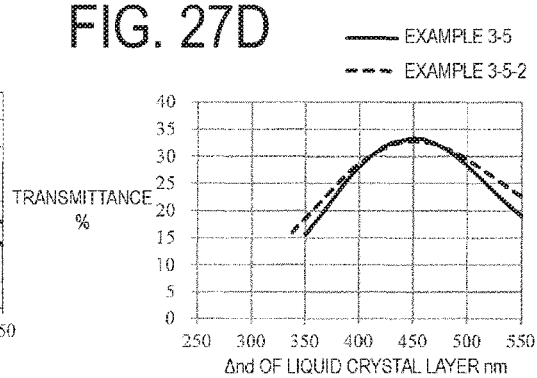
Figure 31:
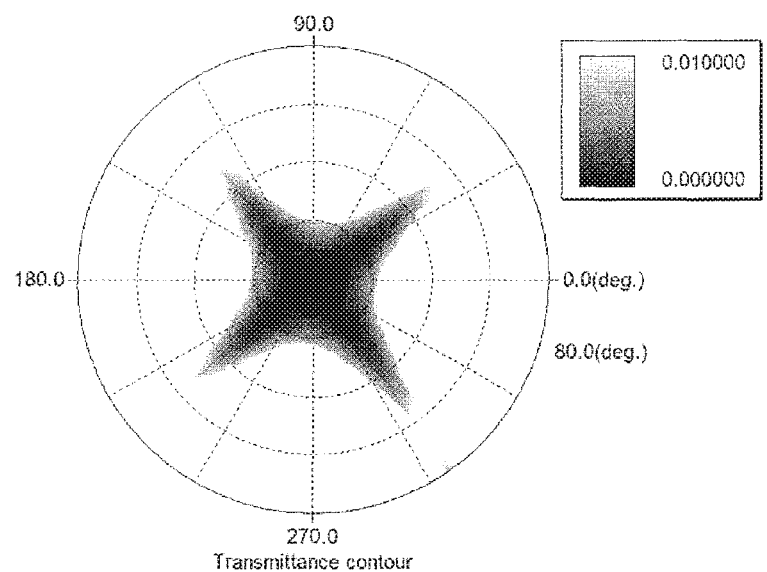
FIG. 31 is a diagram illustrating a black display transmittance (when no voltage is applied) of a liquid crystal display panel according to Reference Example 7-1 with respect to azimuth angle and polar angle.
Figure 32:
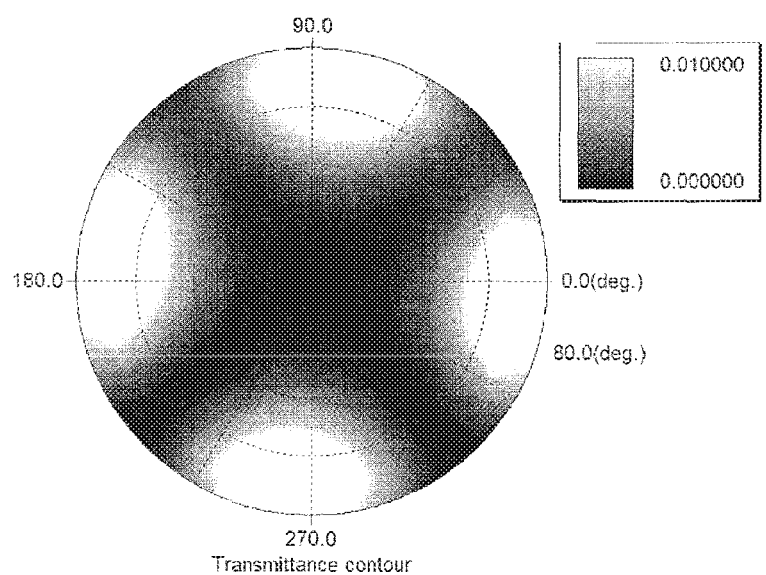
FIG. 32 is a diagram illustrating a black display transmittance (when no voltage is applied) of a liquid crystal display panel according to Example 7-1 relative to azimuth angle and polar angle.
Figure 33:
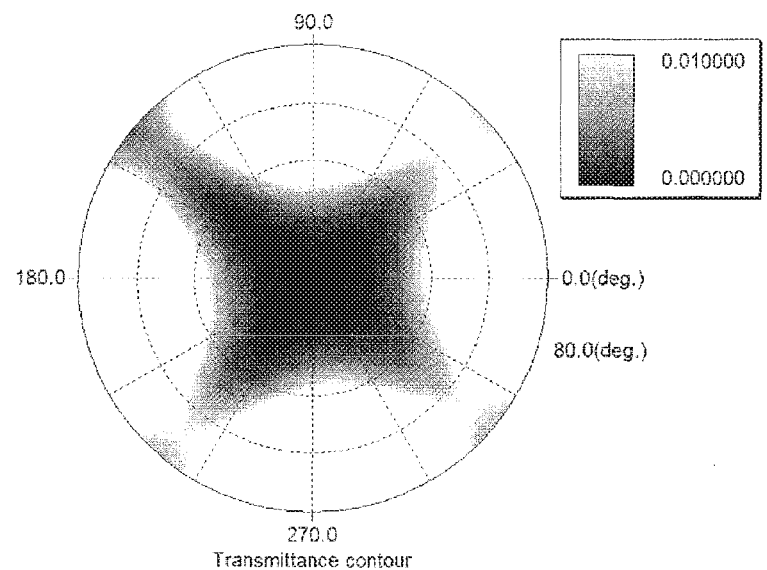
FIG. 33 is a diagram illustrating a black display transmittance (when no voltage is applied) of a liquid crystal display panel according to Example 7-2 with respect to azimuth angle and polar angle.
Figure 34:
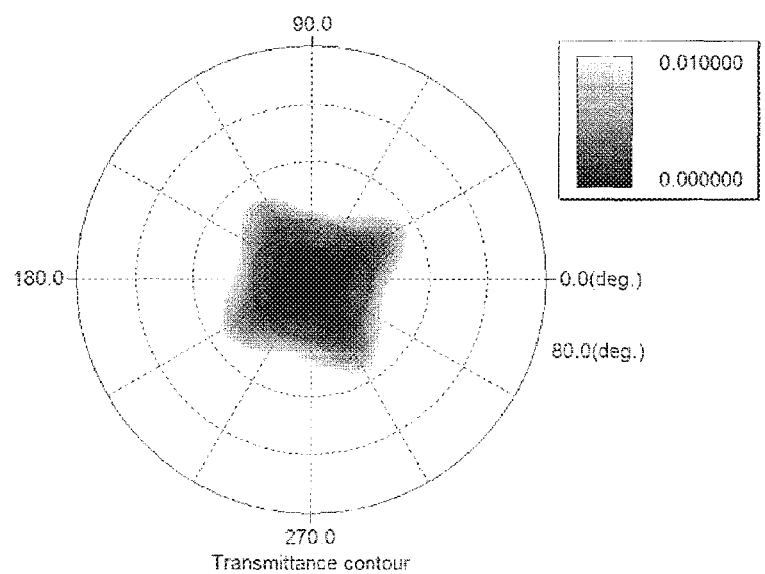
FIG. 34 is a diagram illustrating a black display transmittance (when no voltage is applied) of a liquid crystal display panel according to Example 7-3 with respect to azimuth angle and polar angle.
Figure 35:
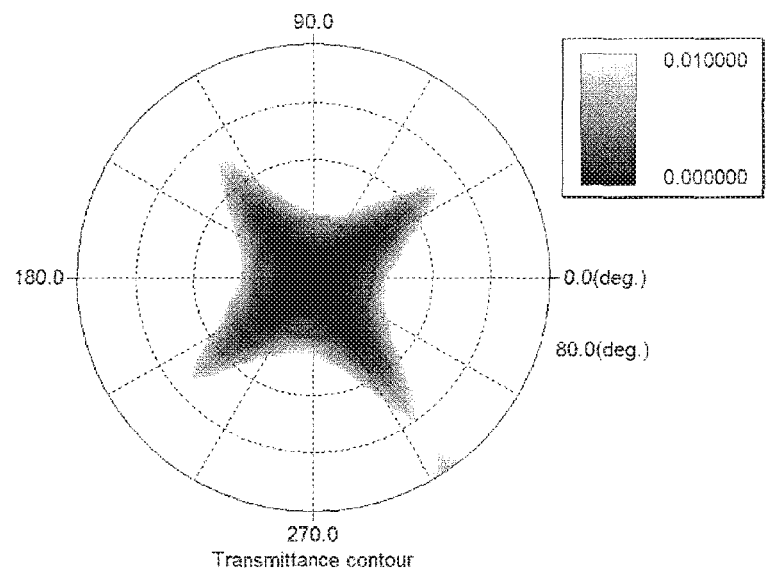
FIG. 35 is a diagram illustrating a black display transmittance (when no voltage is applied) of a liquid crystal display panel according to Example 7-4 with respect to azimuth angle and polar angle.
Figure 36:
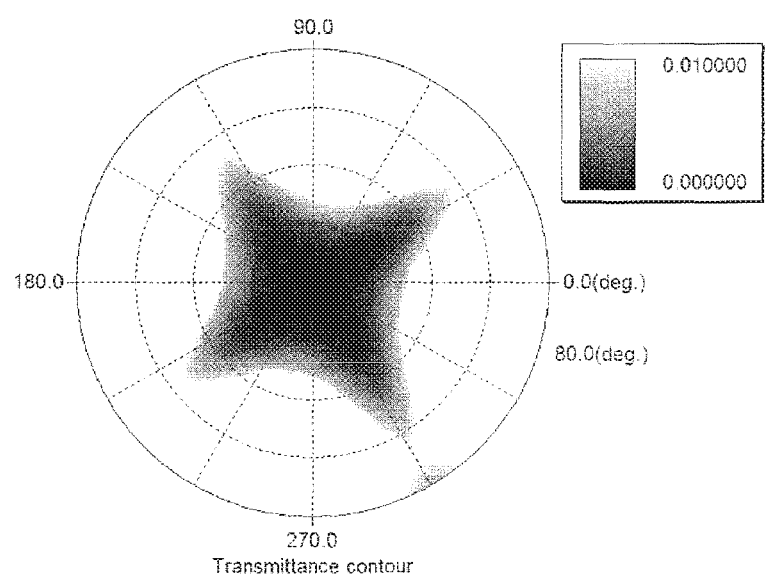
FIG. 36 is a diagram illustrating a black display transmittance (when no voltage is applied) of a liquid crystal display panel according to Example 7-5 with respect to azimuth angle and polar angle.
Figure 37:
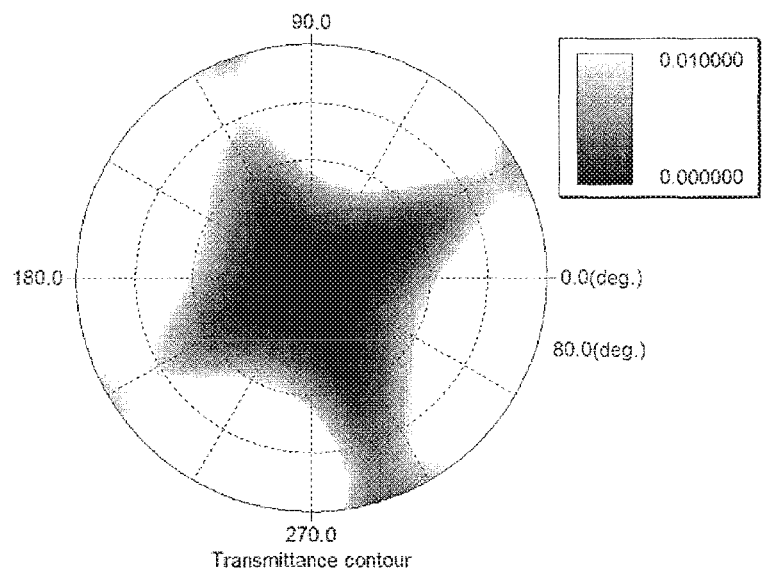
FIG. 37 is a diagram illustrating a black display transmittance (when no voltage is applied) of a liquid crystal display panel according to Example 7-6 with respect to azimuth angle and polar angle.
Figure 38:
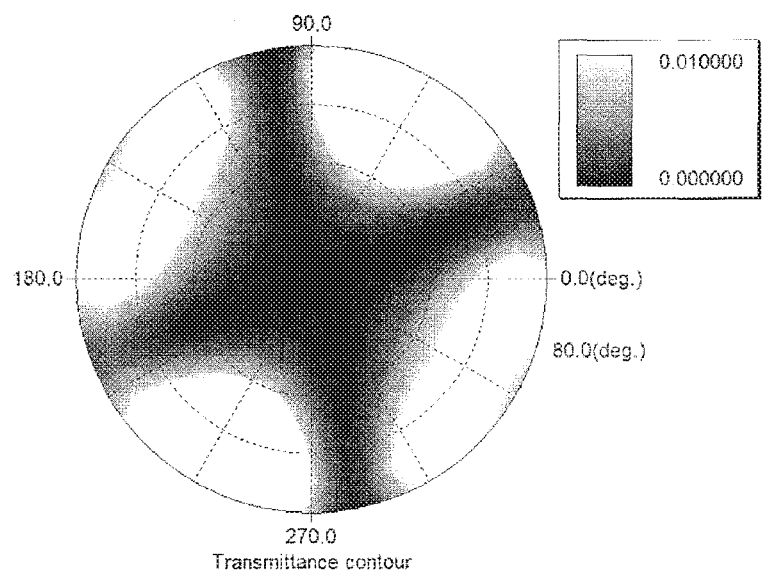
FIG. 38 is a diagram illustrating a black display transmittance (when no voltage is applied) of a liquid crystal display panel according to Example 7-7 with respect to azimuth angle and polar angle.
Figure 39:
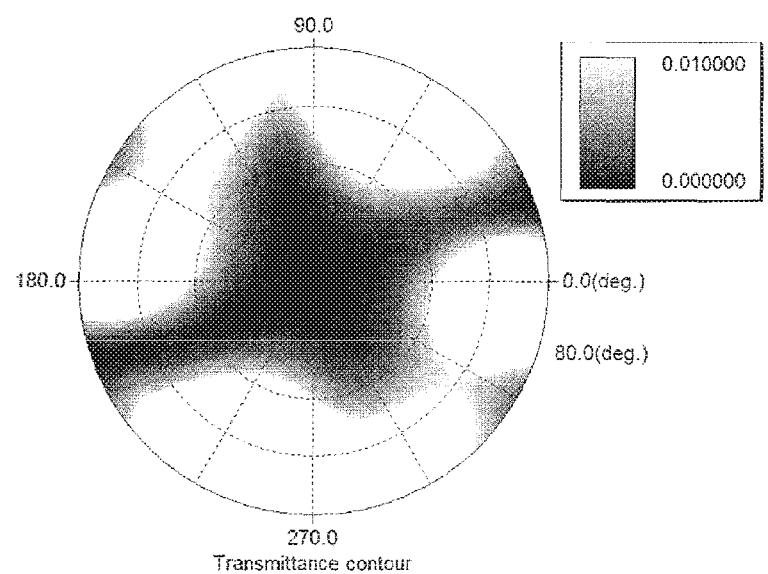
FIG. 39 is a diagram illustrating a black display transmittance (when no voltage is applied) of a liquid crystal display panel according to Example 7-8 with respect to azimuth angle and polar angle.
Figure 40:
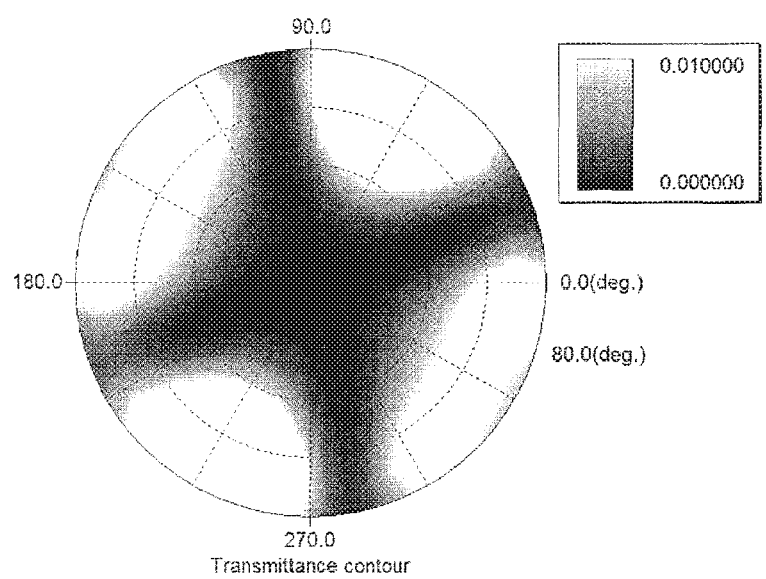
FIG. 40 is a diagram illustrating a black display transmittance (when no voltage is applied) of a liquid crystal display panel according to Example 7-9A with respect to azimuth angle and polar angle.
Figure 41:
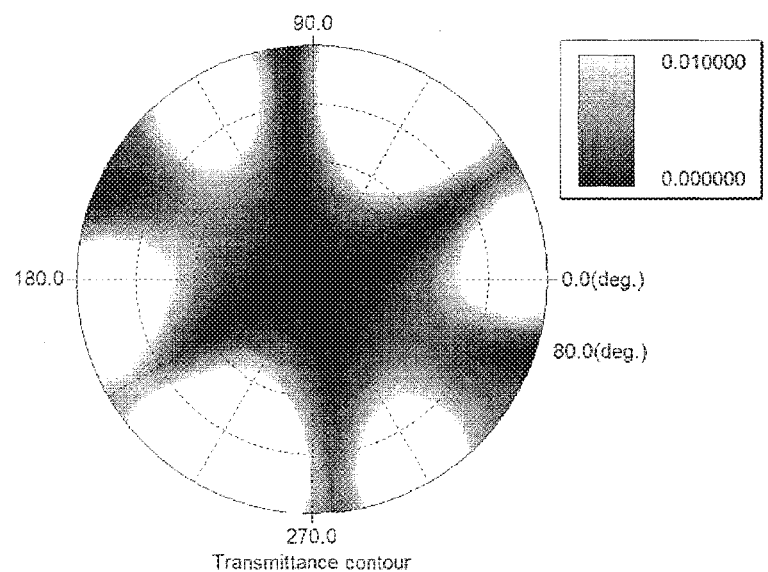
FIG. 41 is a diagram illustrating a black display transmittance (when no voltage is applied) of a liquid crystal display panel according to Example 7-9B with respect to azimuth angle and polar angle.
Figure 42:
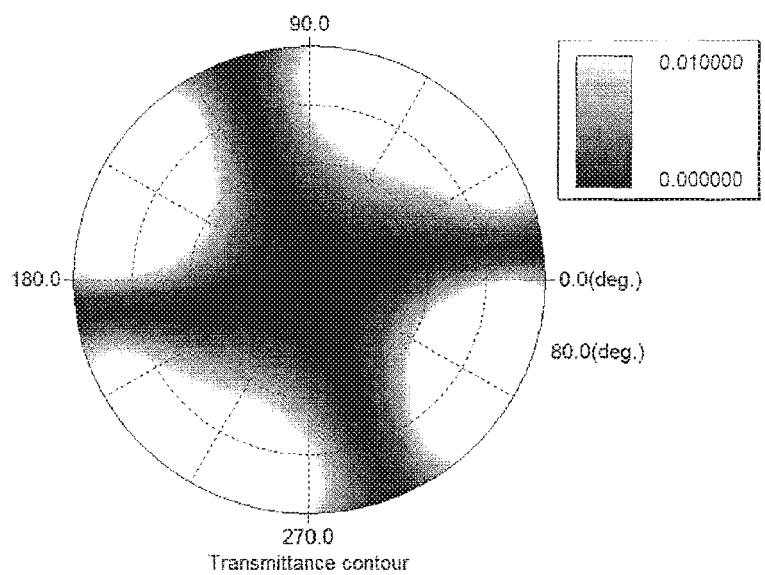
FIG. 42 is a diagram illustrating a black display transmittance (when no voltage is applied) of a liquid crystal display panel according to Example 7-9C with respect to azimuth angle and polar angle.
Figure 43:
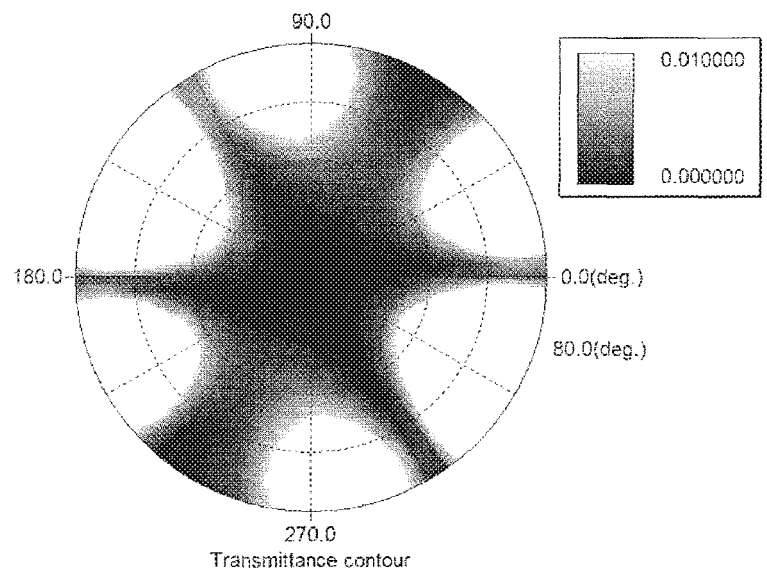
FIG. 43 is a diagram illustrating a black display transmittance (when no voltage is applied) of a liquid crystal display panel according to Example 7-9D with respect to azimuth angle and polar angle.
Figure 44:
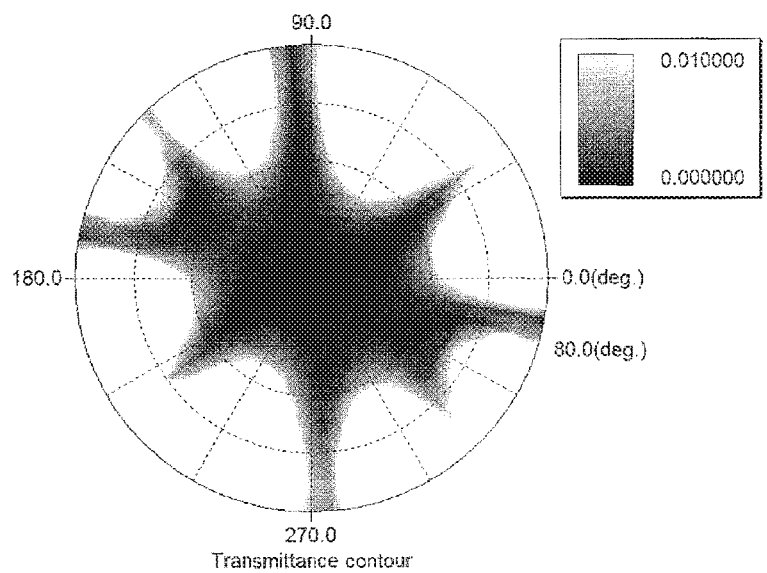
FIG. 44 is a diagram illustrating a black display transmittance (when no voltage is applied) of a liquid crystal display panel according to Example 7-9E with respect to azimuth angle and polar angle.
Figure 45:
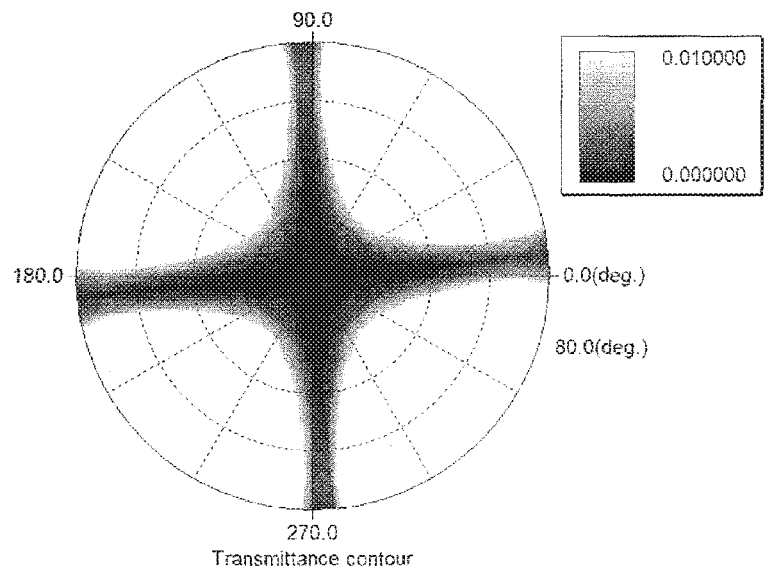
FIG. 45 is a diagram illustrating a black display transmittance (when no voltage is applied) of a liquid crystal display panel according to Example 7-9F with respect to azimuth angle and polar angle.
Figure 46:
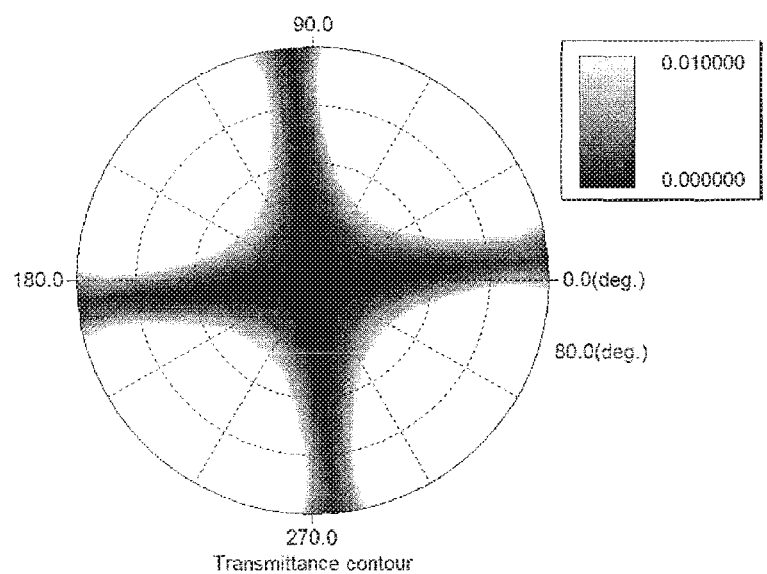
FIG. 46 is a diagram illustrating a black display transmittance (when no voltage is applied) of a liquid crystal display panel according to Example 7-9G with respect to azimuth angle and polar angle.
Figure 47:
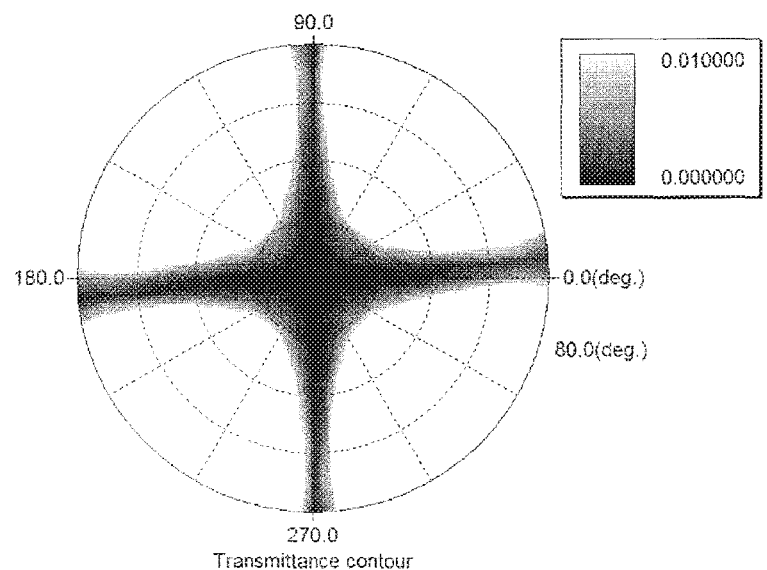
FIG. 47 is a diagram illustrating a black display transmittance (when no voltage is applied) of a liquid crystal display panel according to Example 7-9H with respect to azimuth angle and polar angle.
Figure 48:
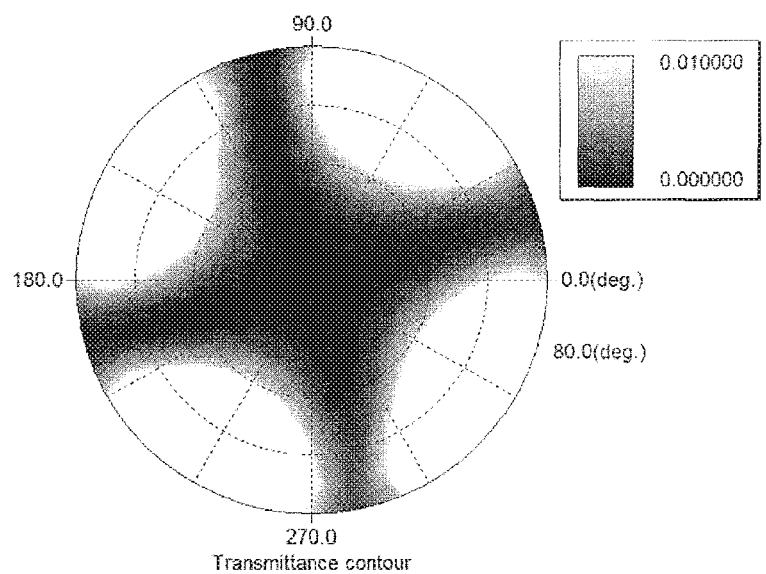
FIG. 48 is a diagram illustrating a black display transmittance (when no voltage is applied) of a liquid crystal display panel according to Example 7-9I with respect to azimuth angle and polar angle.
Figure 49:
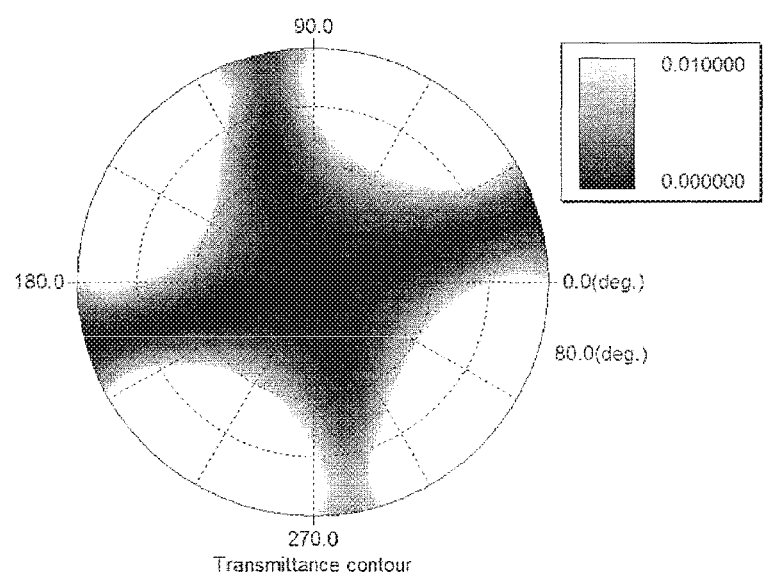
FIG. 49 is a diagram illustrating a black display transmittance (when no voltage is applied) of a liquid crystal display panel according to Example 7-9J with respect to azimuth angle and polar angle.
Figure 50:
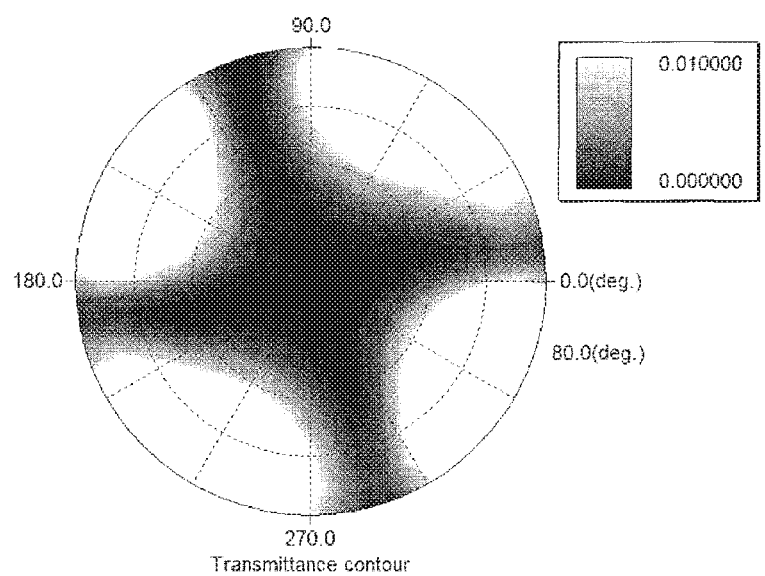
FIG. 50 is a diagram illustrating a black display transmittance (when no voltage is applied) of a liquid crystal display panel according to Example 7-9K with respect to azimuth angle and polar angle.
Figure 51:
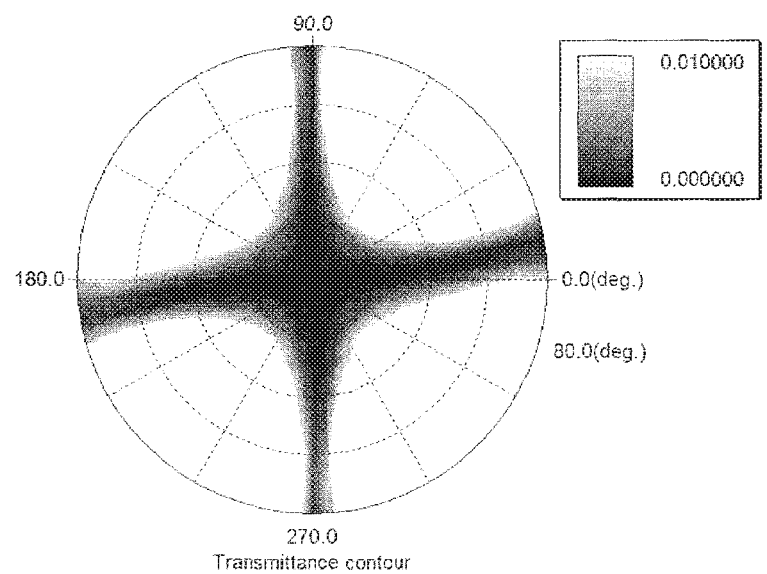
FIG. 51 is a diagram illustrating a black display transmittance (when no voltage is applied) of a liquid crystal display panel according to Example 7-9L with respect to azimuth angle and polar angle.
Figure 52:
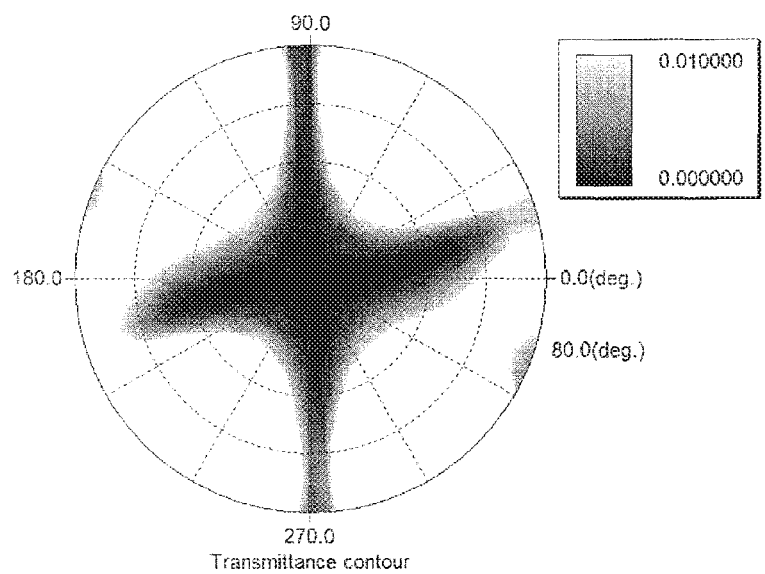
FIG. 52 is a diagram illustrating a black display transmittance (when no voltage is applied) of a liquid crystal display panel according to Example 7-9M with respect to azimuth angle and polar angle.
Figure 53:
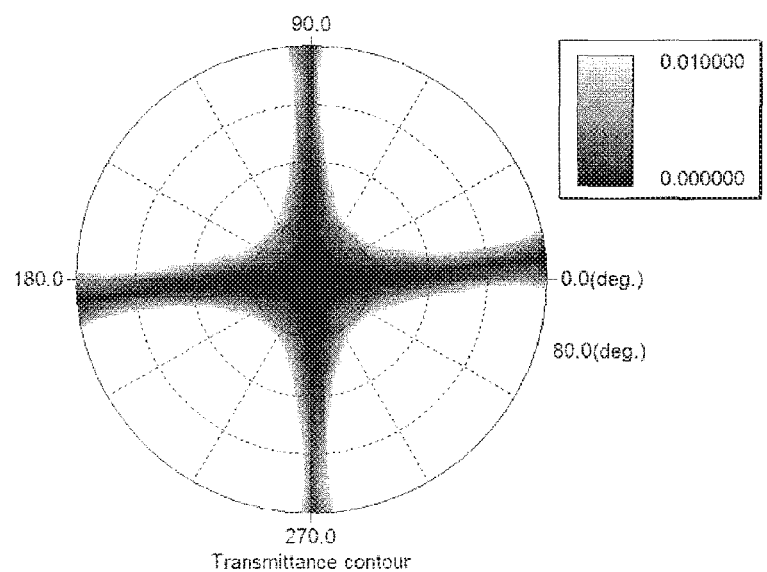
FIG. 53 is a diagram illustrating a black display transmittance (when no voltage is applied) of a liquid crystal display panel according to Example 7-9N with respect to azimuth angle and polar angle.
Figure 54:
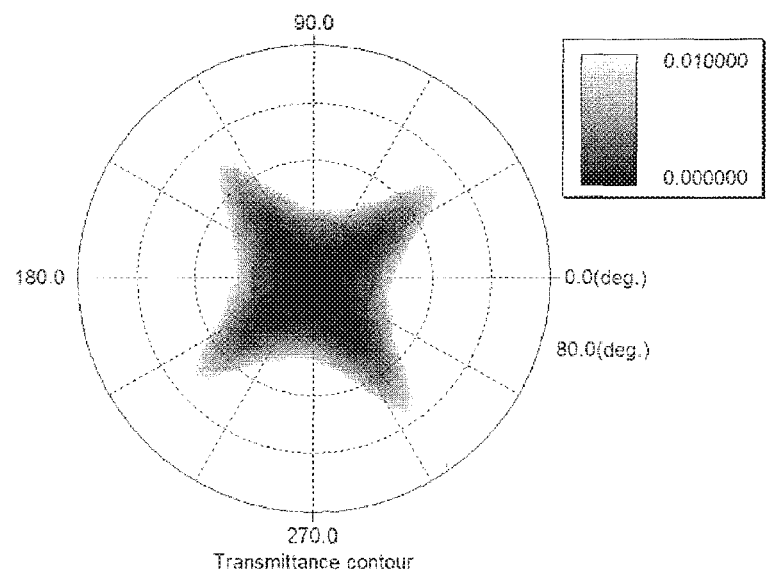
FIG. 54 is a diagram illustrating a black display transmittance (when no voltage is applied) of a liquid crystal display panel according to Example 7-10 with respect to azimuth angle and polar angle.
Figure 55:
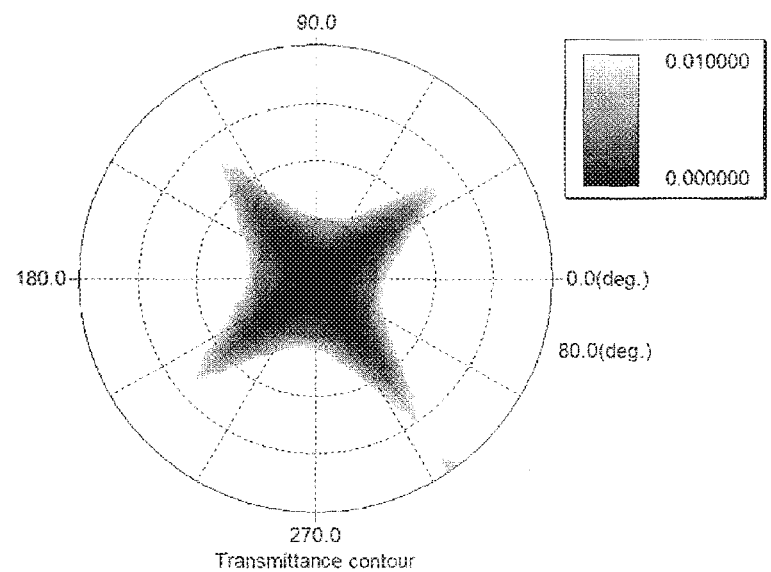
FIG. 55 is a diagram illustrating a black display transmittance (when no voltage is applied) of a liquid crystal display panel according to Example 7-11 with respect to azimuth angle and polar angle.
Figure 56:
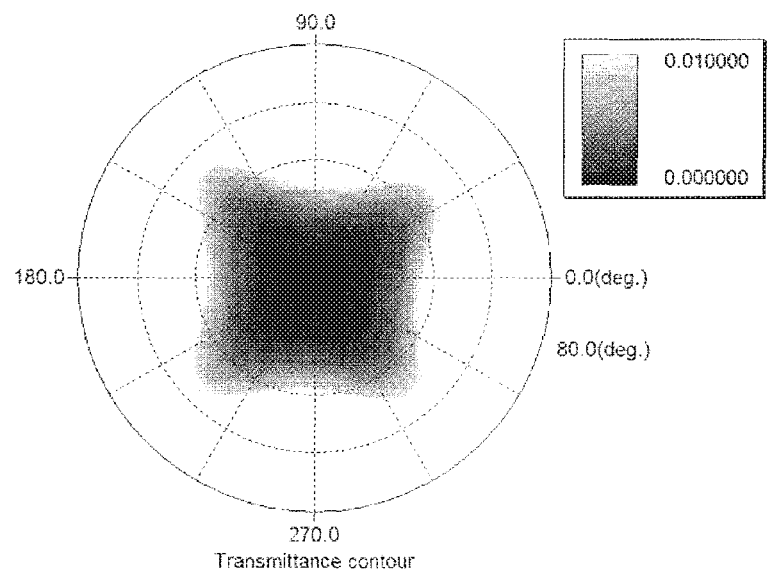
FIG. 56 is a diagram illustrating a black display transmittance (when no voltage is applied) of a liquid crystal display panel according to Example 7-12 with respect to azimuth angle and polar angle.
Figure 57:
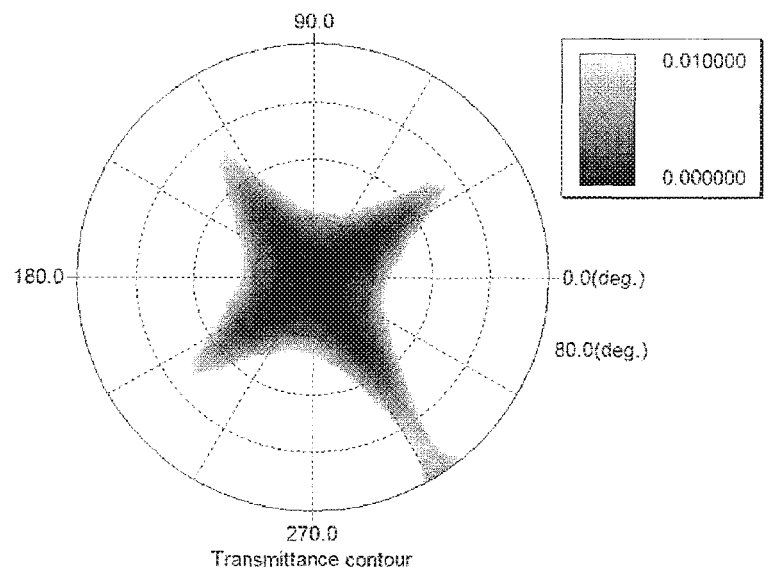
FIG. 57 is a diagram illustrating a black display transmittance (when no voltage is applied) of a liquid crystal display panel according to Example 7-13 with respect to azimuth angle and polar angle.
Figure 58:
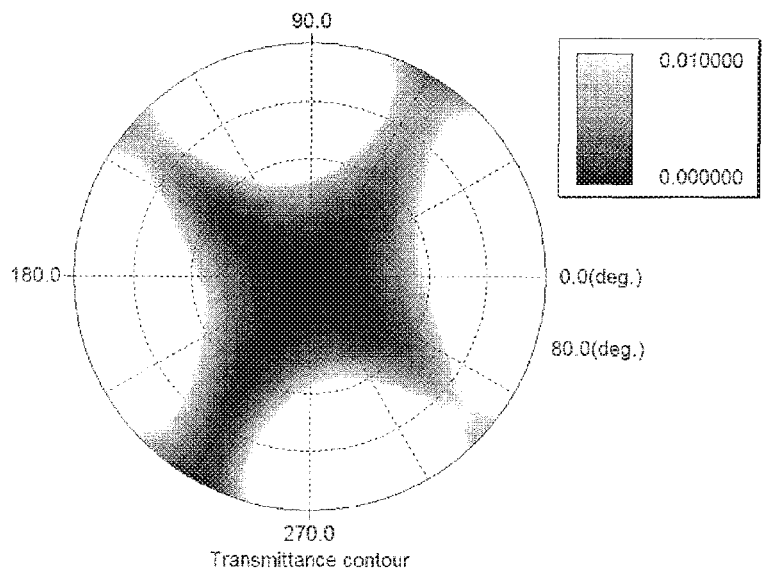
FIG. 58 is a diagram illustrating a black display transmittance (when no voltage is applied) of a liquid crystal display panel according to Example 7-14 with respect to azimuth angle and polar angle.
Figure 59:
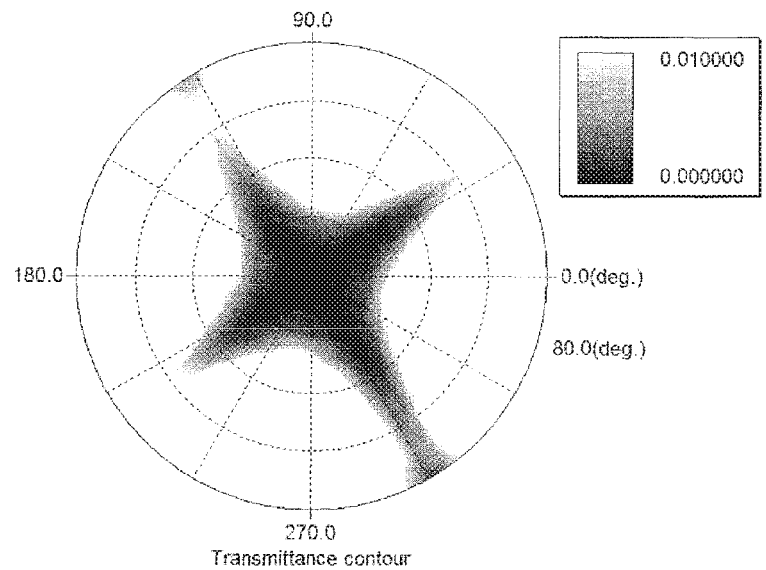
FIG. 59 is a diagram illustrating a black display transmittance (when no voltage is applied) of a liquid crystal display panel according to Example 7-15 with respect to azimuth angle and polar angle.
Figure 60:
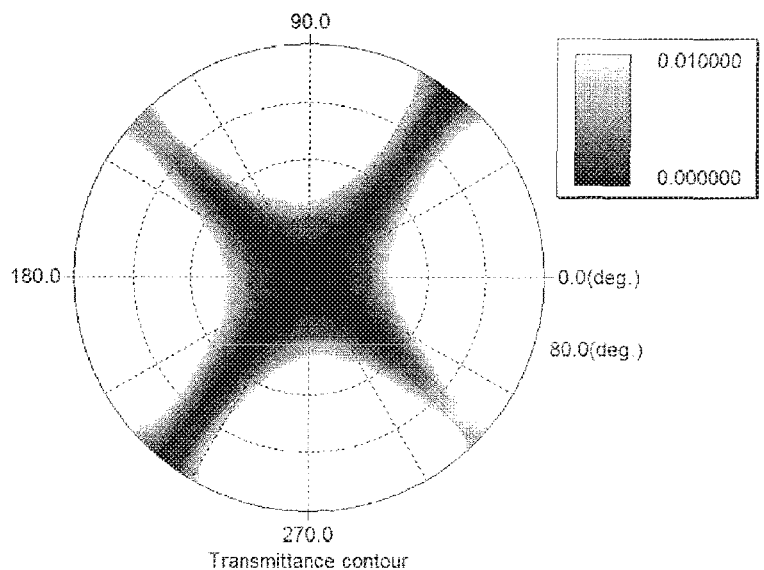
FIG. 60 is a diagram illustrating a black display transmittance (when no voltage is applied) of a liquid crystal display panel according to Example 7-16 with respect to azimuth angle and polar angle.
Figure 61:
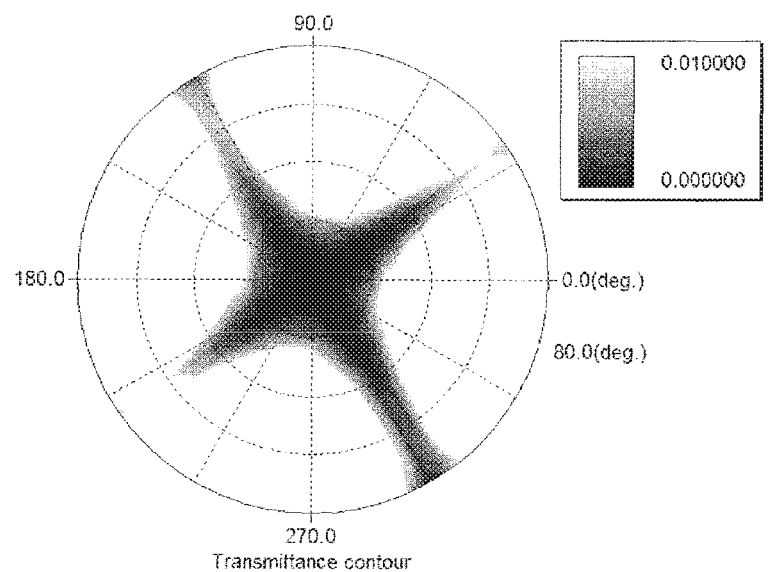
FIG. 61 is a diagram illustrating a black display transmittance (when no voltage is applied) of a liquid crystal display panel according to Example 7-17 with respect to azimuth angle and polar angle.
Figure 62:
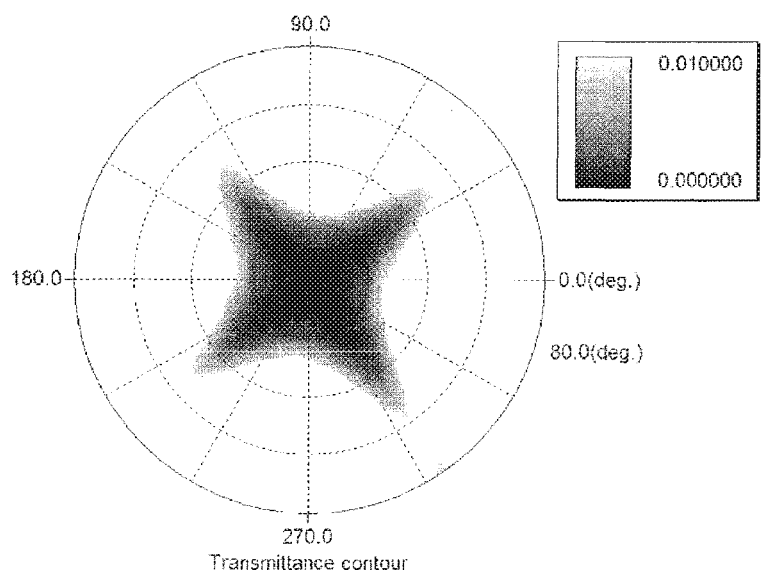
FIG. 62 is a diagram illustrating a black display transmittance (when no voltage is applied) of a liquid crystal display panel according to Example 7-18 with respect to azimuth angle and polar angle.
Figure 63:
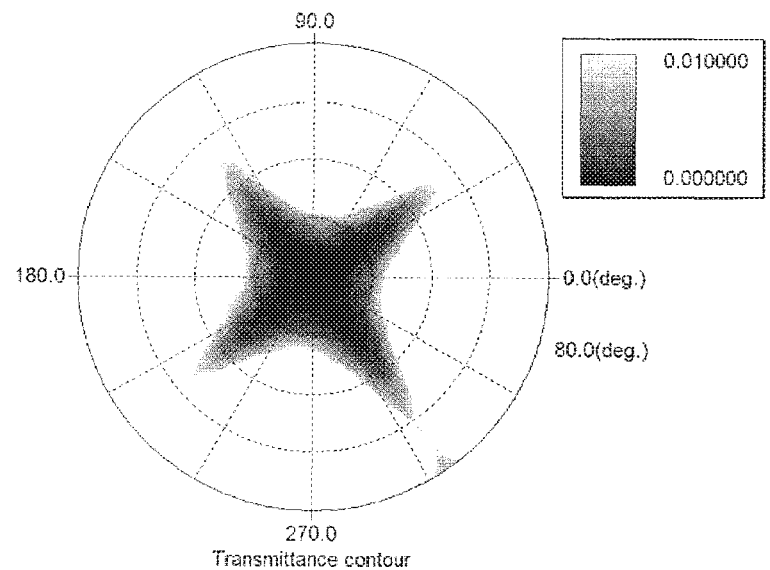
FIG. 63 is a diagram illustrating a black display transmittance (when no voltage is applied) of a liquid crystal display panel according to Example 7-19 with respect to azimuth angle and polar angle.
Figure 64:
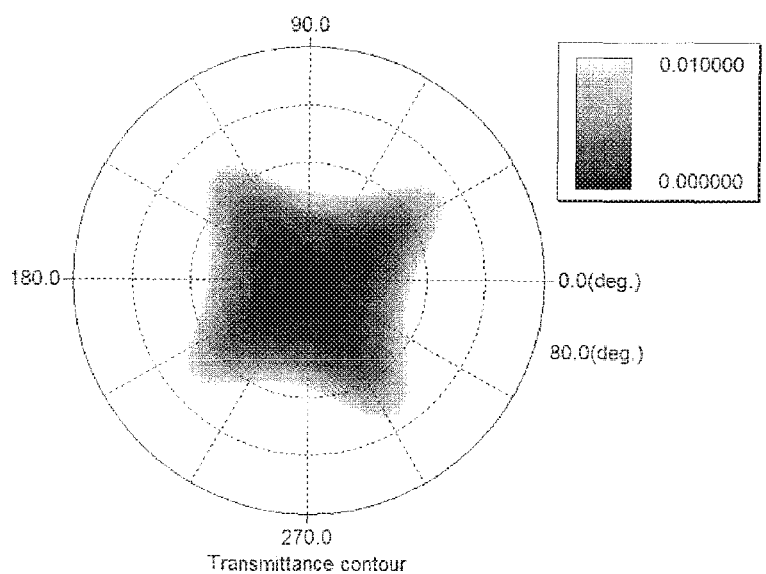
FIG. 64 is a diagram illustrating a black display transmittance (when no voltage is applied) of a liquid crystal display panel according to Example 7-20 with respect to azimuth angle and polar angle.
Figure 65:
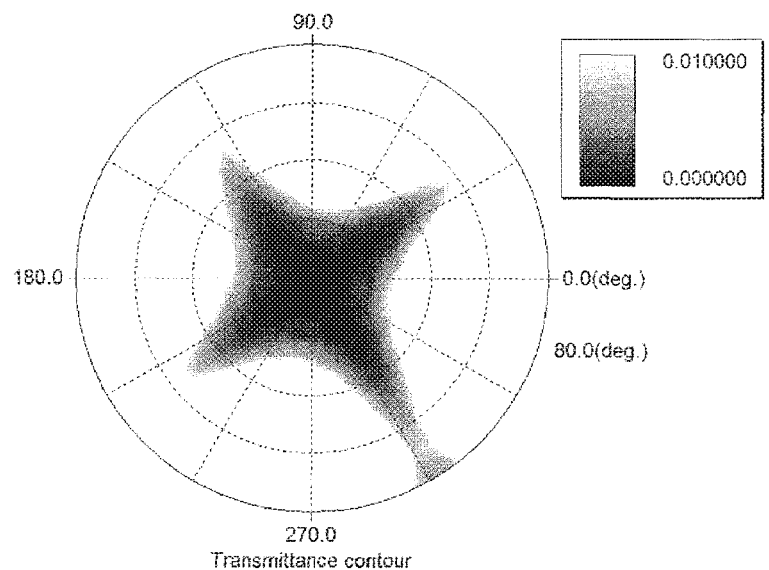
FIG. 65 is a diagram illustrating a black display transmittance (when no voltage is applied) of a liquid crystal display panel according to Example 7-21 with respect to azimuth angle and polar angle.
Figure 66:
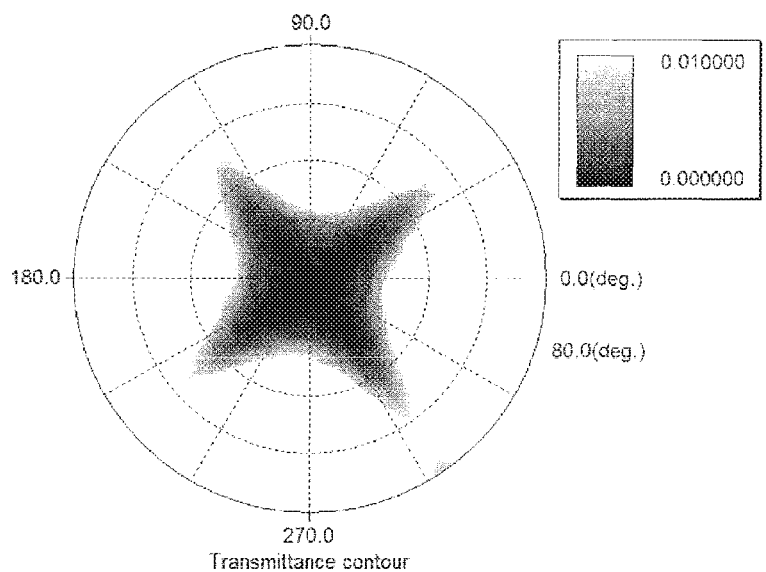
FIG. 66 is a diagram illustrating a black display transmittance (when no voltage is applied) of a liquid crystal display panel according to Example 7-22 with respect to azimuth angle and polar angle.
Figure 67:
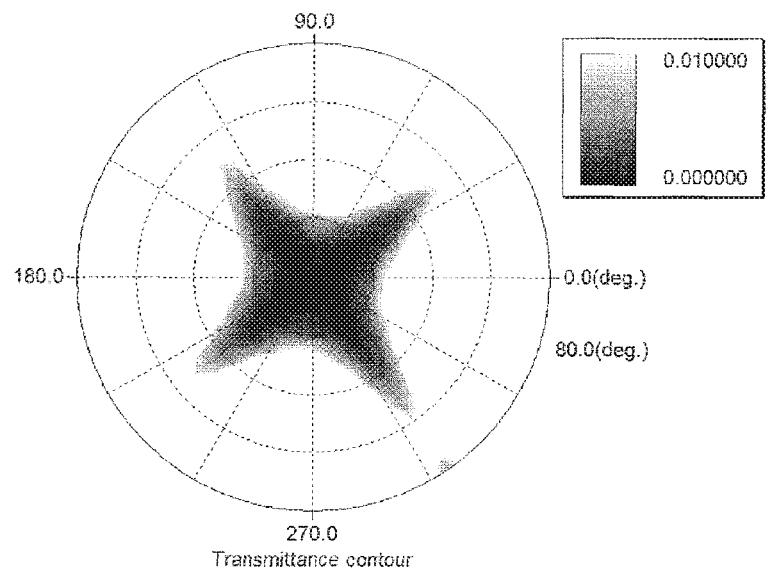
FIG. 67 is a diagram illustrating a black display transmittance (when no voltage is applied) of a liquid crystal display panel according to Example 7-23 with respect to azimuth angle and polar angle.
Figure 68:
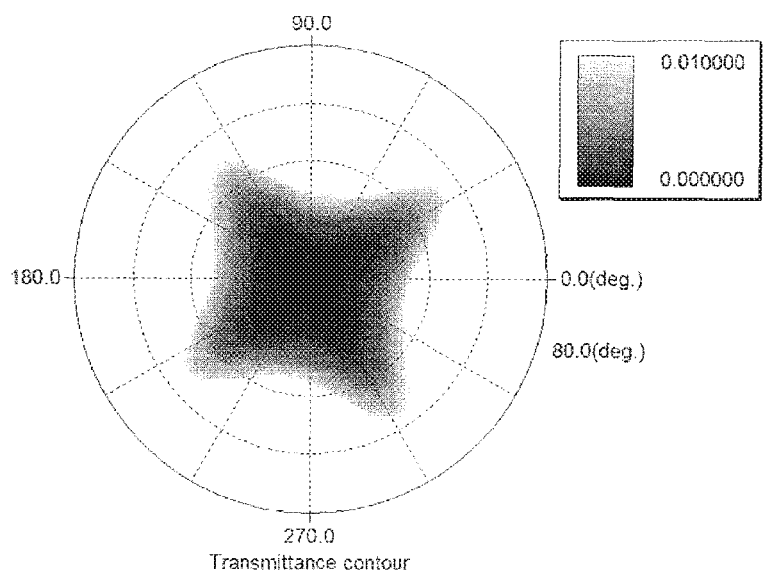
FIG. 68 is a diagram illustrating a black display transmittance (when no voltage is applied) of a liquid crystal display panel according to Example 7-24 with respect to azimuth angle and polar angle.
Figure 69:
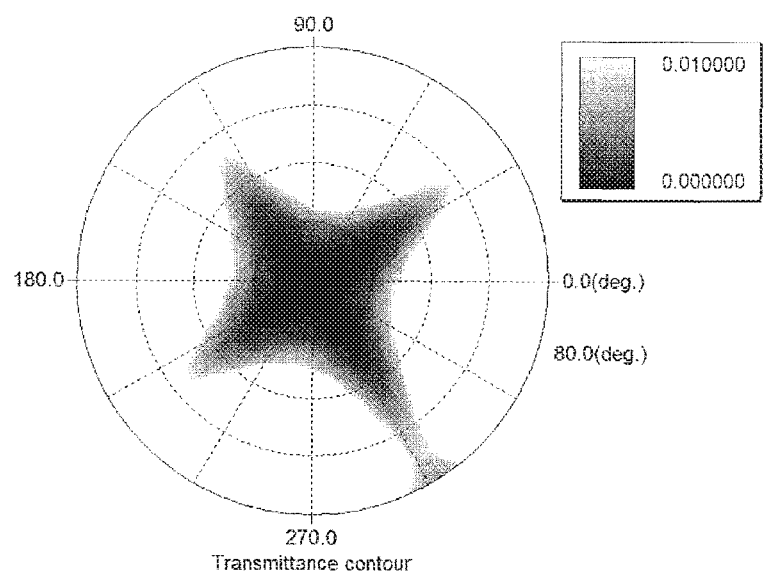
FIG. 69 is a diagram illustrating a black display transmittance (when no voltage is applied) of a liquid crystal display panel according to Example 7-25 with respect to azimuth angle and polar angle.
Figure 70:
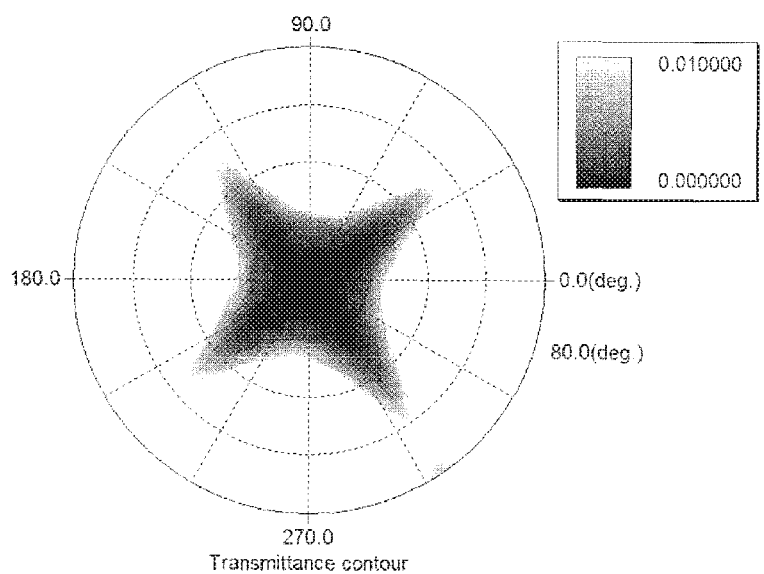
FIG. 70 is a diagram illustrating a black display transmittance (when no voltage is applied) of a liquid crystal display panel according to Example 7-26 with respect to azimuth angle and polar angle.
Figure 71:
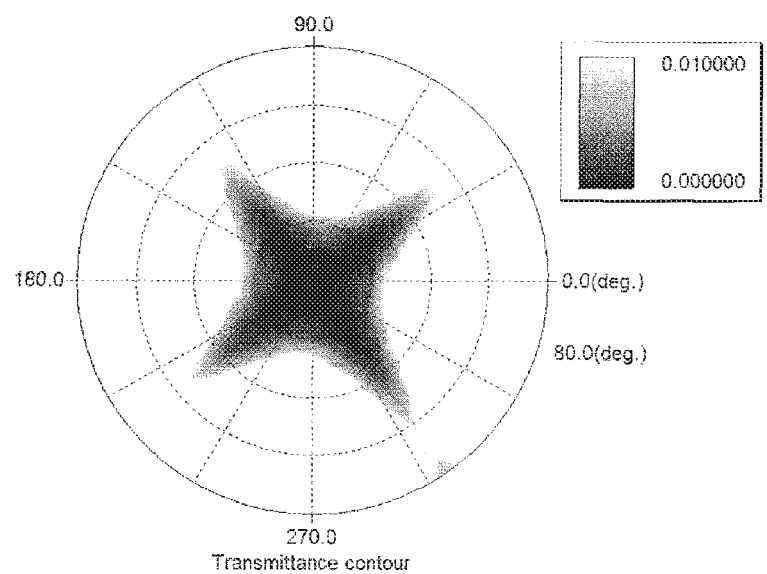
FIG. 71 is a diagram illustrating a black display transmittance (when no voltage is applied) of a liquid crystal display panel according to Example 7-27 with respect to azimuth angle and polar angle.
Figure 72:
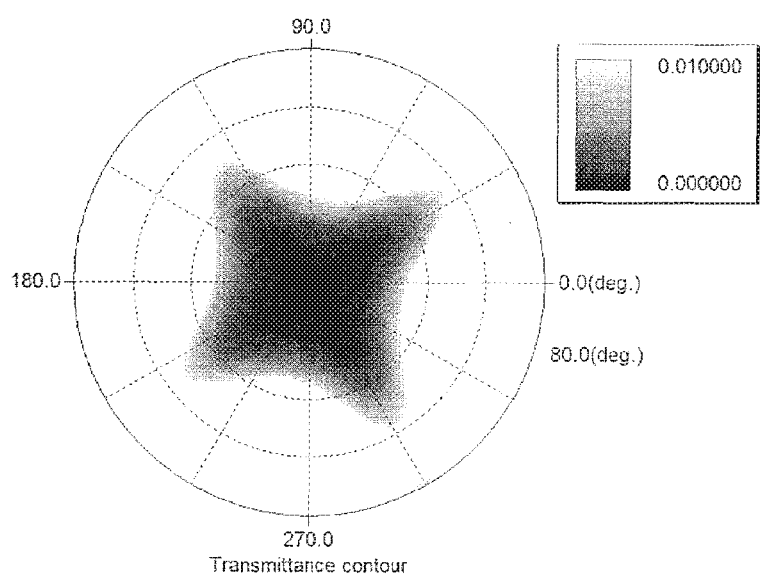
FIG. 72 is a diagram illustrating a black display transmittance (when no voltage is applied) of a liquid crystal display panel according to Example 7-28 with respect to azimuth angle and polar angle.
Figure 73:
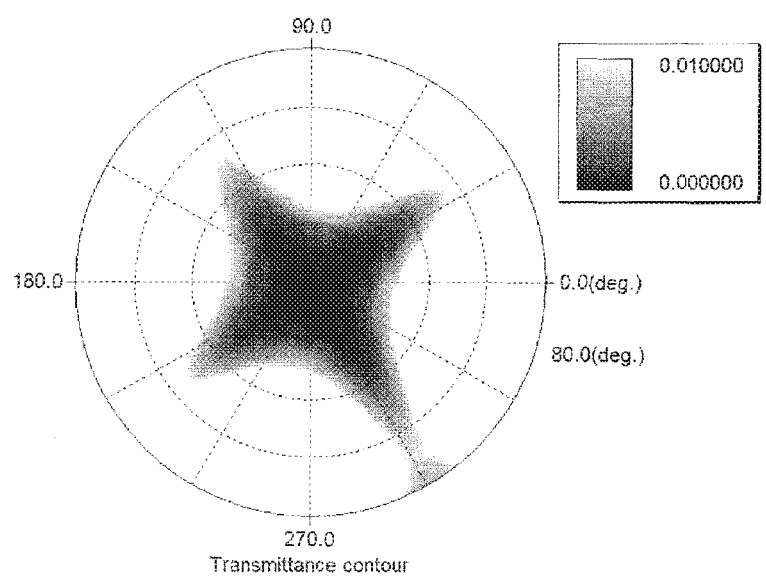
FIG. 73 is a diagram illustrating a black display transmittance (when no voltage is applied) of a liquid crystal display panel according to Example 7-29 with respect to azimuth angle and polar angle.

Next, FIG. 26 illustrates the results of finding transmittances of the liquid crystal display panel according to Example 4-3, having a structure in which the Δnd of the liquid crystal layer is 412.5 nm, while varying the L/S in the liquid crystal display panel (Examples 4-3a, 4-3b, and 4-3c). Values of the L/S of the liquid crystal display panels according to Examples 4-3a, 4-3b, and 4-3c are illustrated in Table 6 below.

TABLE 6

|  | Example 4-3 | Example 4-3a | Example 4-3b | Example 4-3c |
|---|---|---|---|---|
| Liquid crystal layer Δnd | 412.5 nm | 412.5 nm | 412.5 nm | 412.5 nm |
| L + S | 6 μm | 6 μm | 6 μm | 6 μm |
| L/S | 2.7 μm/ 3.3 μm 45/55 | 3.3 μm/2.7 μm 55/45 | 3.0 μm/3.0 μm 50/50 | 2.5 μm/3.5 μm 42/58 |

As can be seen from FIG. 26, even in a case where nematic liquid crystals having positive dielectric anisotropy are used, the transmittance is not substantially affected by the L/S in an L/S range of greater than 40/60 and less than or equal to 55/45.

Next, results of investigating the influence of the Δn of the liquid crystal material will be described with reference to FIGS. 27A to 28D. In the above Examples 3-1, 3-2, 3-3, and 3-5, Δn was fixed and d was varied in order to vary the Δnd of the liquid crystal layer. FIGS. 27A to 27D illustrate the results of simulations in the case where d was fixed and Δn was varied as Examples 3-1-2, 3-2-2, 3-3-2, and 3-5-2. Likewise, for the aforementioned Examples 4-1, 4-2, 4-3, and 4-5 using nematic liquid crystals having positive dielectric anisotropy, FIGS. 28A to 28D illustrate the results of simulations in the case where d was fixed and Δn was varied as Examples 4-1-2, 4-2-2, 4-3-2, and 4-5-2.

As can be seen from FIGS. 27A to 27D and FIGS. 28A to 28D, in a case where Δnd is the same, the influence of d is low.

FIG. 29 illustrates results when the elastic constant of the liquid crystal material used in the simulation of Example 3-3 was set to a value of 1.2× and when the stated elastic constant was set to a value of 0.8×. As is clear from FIG. 29, the value of the elastic constant also does not affect the results of the above-described simulations.

A liquid crystal display panel according to embodiments of the present invention, using a liquid crystal display panel in which the bottom-side substrate is a TFT substrate and the bottom-side substrate includes the electrode pair that generates a transverse electrical field in the liquid crystal layer as an example, has been described in the foregoing embodiment. However, the top-side substrate may be a TFT substrate and the top-side substrate may include the electrode pair that generates a transverse electrical field in the liquid crystal layer. In the liquid crystal display panel according to embodiments of the present invention, the first phase difference plate and the first polarizing plate basically function as a circular polarizing plate, and thus light reflected by wires or the like in the TFT substrate is reduced. Accordingly, the display quality will not drop, even when a TFT substrate is used as the top-side substrate.

Second Embodiment

A structure of a liquid crystal display panel according to a second embodiment of the present invention will be described below with reference to FIGS. 30A-A to 30C-B. FIG. 30A-A is a schematic exploded cross-sectional view of a liquid crystal display panel 100A according to the second embodiment of the present invention, and FIG. 30A-B is a schematic exploded cross-sectional view of a liquid crystal display panel 100B according to the second embodiment of the present invention. FIG. 30B-A is a schematic exploded cross-sectional view of a liquid crystal display panel 100B1 according to the second embodiment of the present invention; FIG. 30B-B is a schematic exploded cross-sectional view of a liquid crystal display panel 100B2 according to the second embodiment of the present invention; and FIG. 30B-C is a schematic exploded cross-sectional view of a liquid crystal display panel 100B3 according to the second embodiment of the present invention. FIG. 30C-A is a schematic exploded cross-sectional view of a liquid crystal display panel 100C1 according to the second embodiment of the present invention, and FIG. 30C-B is a schematic exploded cross-sectional view of a liquid crystal display panel 100C2 according to the second embodiment of the present invention. FIGS. 30A-A and 30A-B, FIGS. 30B-A to 30B-C, and FIGS. 30C-A and 30C-B also illustrate the backlight 50.

As illustrated schematically in FIG. 30A-A, the liquid crystal display panel 100A according to the second embodiment includes: a liquid crystal cell 10; a first polarizing plate 22 disposed on an observer side of the liquid crystal cell 10; a first phase difference plate 32a disposed between the liquid crystal cell 10 and the first polarizing plate 22; a second polarizing plate 24 disposed on a back surface side of the liquid crystal cell 10; and a second phase difference plate 34a disposed between the second polarizing plate 24 and the liquid crystal cell 10. The liquid crystal cell 10 is an FFS mode liquid crystal cell, and has the same structure as the liquid crystal cell 10 illustrated in FIG. 1B, for example.

In the liquid crystal display panel 100A according to the second embodiment, the thickness direction retardation of at least one of the first phase difference plate 32a and the second phase difference plate 34a has a negative value. When the thickness direction retardation of at least one of the first phase difference plate 32a and the second phase difference plate 34a has a negative value, the sum of the thickness direction retardations of the first phase difference plate 32a, the second phase difference plate 34a, and the liquid crystal layer 18 decreases. It was found that when the absolute value of the sum of the thickness direction retardations was low, a good black display when no voltage was applied can be achieved when observed from oblique viewing angles. The inventors of the present invention first confirmed this effect after carrying out many simulations.

The liquid crystal display panel according to the present embodiment is not limited to the liquid crystal display panel 100A illustrated as an example in FIG. 30A-A. The liquid crystal display panel according to the present embodiment may have a structure illustrated in FIG. 30A-B. In other words, the liquid crystal display panel may further include a third phase difference plate 32b and a fourth phase difference plate 34b.

As illustrated schematically in FIG. 30A-B, the liquid crystal display panel 100B according to the second embodiment includes: the liquid crystal cell 10; the first polarizing plate 22 disposed on an observer side of the liquid crystal cell 10; the first phase difference plate 32a disposed between the liquid crystal cell 10 and the first polarizing plate 22; the second polarizing plate 24 disposed on a back surface side of the liquid crystal cell 10; the second phase difference plate 34a disposed between the second polarizing plate 24 and the liquid crystal cell 10; the third phase difference plate 32b disposed between the liquid crystal cell 10 and the first polarizing plate 22; and the fourth phase difference plate 34b disposed between the second polarizing plate 24 and the liquid crystal cell 10. In the liquid crystal display panel 100B, the thickness direction retardation of at least one of the first phase difference plate 32a, the second phase difference plate 34a, the third phase difference plate 32b, and the fourth phase difference plate 34b has a negative value. The liquid crystal display panel 100B is different from the liquid crystal display panel 100A in that the liquid crystal display panel 100B further includes the third phase difference plate 32b and the fourth phase difference plate 34b.

When the thickness direction retardation of at least one of the first phase difference plate 32a, the second phase difference plate 34a, the third phase difference plate 32b, and the fourth phase difference plate 34b has a negative value, the sum of the thickness direction retardations of the first to fourth phase difference plates 32a, 34a, 32b, and 34b and the liquid crystal layer 18 decreases. When the absolute value of the sum of the thickness direction retardations is low, a good black display when no voltage is applied can be achieved when observed from oblique viewing angles.

The first and second phase difference plates 32a and 34a have in-plane retardations. The third phase difference plate 32b and the fourth phase difference plate 34b may each independently have in-plane retardations, or may not have in-plane retardations. In the present specification, a phase difference layer (a liquid crystal layer or a phase difference plate, for example) "having an in-plane retardation" means that the in-plane retardation of the phase difference layer is greater than 3 nm.

In the liquid crystal display panel 100B, the third phase difference plate 32b is disposed between the first phase difference plate 32a and the first polarizing plate 22, and the fourth phase difference plate 34b is disposed between the second phase difference plate 34a and the second polarizing plate 24. The arrangement relationship of the first phase difference plate 32a and the third phase difference plate 32b, and the arrangement relationship of the second phase difference plate 34a and the fourth phase difference plate 34b, are not limited to the configurations described here. For example, as illustrated in FIGS. 30B-A to 30B-C, the arrangement relationship of the first phase difference plate 32a and the third phase difference plate 32b may be reversed. The arrangement relationship of the second phase difference plate 34a and the fourth phase difference plate 34b may be reversed as well.

The third phase difference plate 32b may be disposed between the first phase difference plate 32a and the liquid crystal cell 10, as in the liquid crystal display panels 100B1 and 100B3 schematically illustrated in FIGS. 30B-A and 30B-C. The fourth phase difference plate 34b may be disposed between the second phase difference plate 34a and the liquid crystal cell 10, as in the liquid crystal display panels 100B1 and 100B2 schematically illustrated in FIGS. 30B-A and 30B-B. The liquid crystal display panels 100B1, 100B2, and 100B3 may be the same as the liquid crystal display panel 100B, except for the arrangement relationship of the first phase difference plate 32a and the third phase difference plate 32b and the arrangement relationship of the second phase difference plate 34a and the fourth phase difference plate 34b.

As illustrated in FIGS. 30C-A and 30C-B, the liquid crystal display panel according to the present embodiment may include either one of the third phase difference plate 32b or the fourth phase difference plate 34b.

As schematically illustrated in FIG. 30C-A, the liquid crystal display panel 100C1 is different from the liquid crystal display panel 100A in that the third phase difference plate 32b is further provided. The liquid crystal display panel 100C1 is different from the liquid crystal display panel 100B in that the fourth phase difference plate 34b is not provided.

In the liquid crystal display panel 100C1, the thickness direction retardation of at least one of the first phase difference plate 32a, the second phase difference plate 34a, and the third phase difference plate 32b has a negative value. When the thickness direction retardation of at least one of the first phase difference plate 32a, the second phase difference plate 34a, and the third phase difference plate 32b has a negative value, the sum of the thickness direction retardations of the first to third phase difference plates 32a, 34a, and 32b and the liquid crystal layer 18 decreases. When the absolute value of the sum of the thickness direction retardations is low, a good black display when no voltage is applied can be achieved when observed from oblique viewing angles.

As schematically illustrated in FIG. 30C-B, the liquid crystal display panel 100C2 is different from the liquid crystal display panel 100A in that the fourth phase difference plate 34b is further provided. The liquid crystal display panel 100C2 is different from the liquid crystal display panel 100B in that the third phase difference plate 32b is not provided.

In the liquid crystal display panel 100C2, the thickness direction retardation of at least one of the first phase difference plate 32a, the second phase difference plate 34a, and the fourth phase difference plate 34b has a negative value. When the thickness direction retardation of at least one of the first phase difference plate 32a, the second phase difference plate 34a, and the fourth phase difference plate has a negative value, the sum of the thickness direction retardations of the first, second, and fourth phase difference plates 32a, 34a, and 34b and the liquid crystal layer 18 decreases. When the absolute value of the sum of the thickness direction retardations is low, a good black display when no voltage is applied can be achieved when observed from oblique viewing angles.

Although not illustrated for the sake of simplicity, the arrangement relationship of the first phase difference plate 32a and the third phase difference plate 32b, and the arrangement relationship of the second phase difference plate 34a and the fourth phase difference plate 34b, may be reversed in the liquid crystal display panels 100C1 and 100C2 as well.

In the liquid crystal display panels 100A, 100B, 100B1, 100B2, 100B3, 100C1, and 100C2 according to the present embodiment, the first to fourth phase difference plates 32a, 34a, 32b, and 34b are, for example, phase difference plates including drawn polymer films, phase difference plates in which a liquid crystalline material has a fixed alignment, thin plates formed from an inorganic material, or the like.

The materials, manufacturing methods, and the like of the first and second polarizing plates 22 and 24 and the first to fourth phase difference plates 32a, 34a, 32b, and 34b are not particularly limited. For example, a plate obtained by adsorbing and aligning an anisotropic material such as an iodine complex having dichroism in a polyvinyl alcohol (PVA) film can be suitably used as the polarizing plate.

In the liquid crystal display panel 100A according to the present embodiment, the first polarizing plate 22 and the first phase difference plate 32a generally function as a circular polarizing plate or an elliptical polarizing plate. The first polarizing plate 22 and the first phase difference plate 32a are affixed to each other with an adhesion layer (an adhesive layer) interposed therebetween, in some cases. The first phase difference plate 32a may include a plurality of phase difference layers. A support layer (protection layer) may additionally be affixed, as appropriate. The support layer (protection layer) improves, for example, the mechanical strength and resistance to moisture and heat of the polarizing plate and the phase difference plate. The support layer (protection layer) is a triacetyl cellulose (TAC) film or an acrylic resin-based film, for example. The in-plane retardation of the adhesion layer (adhesive layer) is less than or equal to approximately 3 nm, and the absolute value of the thickness direction retardation is less than or equal to approximately 10 nm. The in-plane retardation of the support layer (protection layer) is less than or equal to approximately 3 nm, and the absolute value of the thickness direction retardation is less than or equal to approximately 50 nm. The absolute value of the thickness direction retardation of a support layer (protection layer) in which the absolute value of the phase difference has been actively reduced (also referred to as a "zero-phase difference support layer (protection layer)" or a "zero-phase difference film") is less than or equal to approximately 10 nm. Accordingly, the in-plane retardations and thickness direction retardations of the adhesion layer (adhesive layer) and the zero-phase difference support layer (protection layer) can be substantially ignored. It is difficult to ignore the thickness direction retardation of a support layer (protection layer) that is not a zero-phase difference support layer (protection layer), i.e. a support layer (protection layer) in which the absolute value of the thickness direction retardation is greater than approximately 10 nm, and thus such a layer may be handled as a phase difference plate or a phase difference layer in a phase difference plate. For example, the first phase difference plate 32a having a plurality of phase difference layers may include a support layer (protection layer) that is not a zero-phase difference support layer (protection layer) as one of the phase difference layers. Alternatively, the first phase difference plate 32a may be a support layer (protection layer) that is not a zero-phase difference support layer (protection layer).

The second polarizing plate 24 and the second phase difference plate 34a may have a similar configuration. The second polarizing plate 24 and the second phase difference plate 34a can function as a linear polarizing plate or an elliptical polarizing plate.

Likewise, in the liquid crystal display panels 100B, 100B1 to 100B3, 100C1, and 100C2 according to the present embodiment, the first polarizing plate 22, the first phase difference plate 32a, and the third phase difference plate 32b are sometimes affixed to each other with adhesion layers (adhesive layers) therebetween. The first phase difference plate 32a and the third phase difference plate 32b may each include a plurality of phase difference layers. A support layer (protection layer) may additionally be affixed, as appropriate. A similar configuration may apply to the second polarizing plate 24, the second phase difference plate 34a, and the fourth phase difference plate 34b.

Phase difference plates (or phase difference layers) are given names according to various methods based on the optical anisotropy thereof. For example, a phase difference plate having a uniaxial refractive index ellipsoid may be divided into the following four types depending on the shape of the refractive index ellipsoid. In a case where nx and ny are principle refractive indices in a plane of a phase difference plate and nz is a principle refractive index in the normal direction, a phase difference plate satisfying the relationship of nx>ny=nz is referred to as a "positive A plate", a phase difference plate satisfying the relationship of nx<ny=nz is referred to as a "negative A plate", a phase difference plate satisfying the relationship of nx=ny<nz is referred to as a "positive C plate", and a phase difference plate satisfying the relationship of nx=ny>nz is referred to as a "negative C plate". These names and classifications are well-known to those of ordinary skill in the art. In these classifications, xyz axes are read instead as ABC axes, and a phase difference plate in which the optical axis is in-plane (i.e. an A axis direction or a B axis direction) is referred to as an "A plate", whereas a phase difference plate in which the optical axis is in the normal direction (i.e. a C axis direction) is referred to as a "C plate". Then, either "positive" or "negative" is categorized depending on the sign of the result of the refractive index anisotropy=extraordinary refractive index−ordinary refractive index. In other words, "positive" denotes a case where the extraordinary refractive index is higher than the ordinary refractive index, and "negative" denotes a case where the extraordinary refractive index is smaller than the ordinary refractive index.

For example, a phase difference film including rod-shaped liquid crystals having a horizontal alignment and a uniaxially-stretched resin material having positive intrinsic birefringence (polycarbonate or cycloolefin polymer, for example) can be given as examples of a phase difference plate (or phase difference layer) classified as a positive A plate. A phase difference film including disk-shaped liquid crystals having a horizontal alignment and a uniaxially-stretched resin material having negative intrinsic birefringence (polystyrene, for example) can be given as examples of a phase difference plate (or phase difference layer) classified as a negative A plate. A phase difference film including disk-shaped liquid crystals having a vertical alignment and a biaxially-stretched resin material having positive intrinsic birefringence (polycarbonate or cycloolefin polymer, for example) can be given as examples of a phase difference plate (or phase difference layer) classified as negative C plate. A phase difference film including rod-shaped liquid crystals having a vertical alignment and a biaxially-stretched resin material having negative intrinsic birefringence (polystyrene, for example) can be given as examples of a phase difference plate (or phase difference layer) classified as a positive C plate.

The plates are not limited to the specific examples described above, and it is also possible to achieve spontaneous alignment in the film transport direction or the normal direction, and thereby achieve a phase difference, at the point in time when a film is formed in a typical method such as solvent casting or melt extrusion, without actively applying an alignment treatment or a stretching treatment. For example, in many cases, a triacetyl cellulose (TAC) film used as a protective film for a polarizing plate becomes a negative C plate at the point in time when the film is formed through solvent casting.

As described earlier, the in-plane retardation is defined as the absolute value of (nx−ny)×d, and the thickness direction retardation is defined as ((nx+ny)/2−nz)×d. According to these definitions, of the above-described four types of uniaxial phase difference plates, the negative A plate and the positive C plate have negative thickness direction retardations. The positive C plate does not have an in-plane retardation. Accordingly, in the liquid crystal display panel 100A according to the present embodiment, at least one of the first phase difference plate 32a and the second phase difference plate 34a having an in-plane retardation may be a negative A plate. Results of simulations of liquid crystal display panels according to Examples 7-1 to 7-3 will be described later, for example.

In the liquid crystal display panels 100B and 100B1 to 100B3 according to the present embodiment, for example, at least one of the third phase difference plate 32b and the fourth phase difference plate 34b may be a negative A plate or a positive C plate. At least one of the first phase difference plate 32a and the second phase difference plate 34a having an in-plane retardation may be a negative A plate. Results of simulations of liquid crystal display panels according to Examples 7-4 to 7-8, 7-9A to 7-9C, and 7-9F to 7-9N will be described later, for example.

Likewise, in the liquid crystal display panels 100C1 and 100C2 according to the present embodiment, for example, the third phase difference plate 32b or the fourth phase difference plate 34b may be a negative A plate or a positive C plate. At least one of the first phase difference plate 32a and the second phase difference plate 34a having an in-plane retardation may be a negative A plate. Results of simulations of liquid crystal display panels according to Examples 7-9D and 7-9E will be described later, for example.

A phase difference plate having a negative thickness direction retardation is not limited to a uniaxial refractive index ellipsoid. A phase difference plate having a biaxial refractive index ellipsoid and having a negative thickness direction retardation can be used. A phase difference plate having a biaxial refractive index ellipsoid generally has an in-plane retardation, and thus at least one of the first phase difference plate 32a, the second phase difference plate 34a, the third phase difference plate 32b, and the fourth phase difference plate 34b may be a phase difference plate having a biaxial refractive index ellipsoid and a negative thickness direction retardation. Results of simulations of liquid crystal display panels according to Examples 7-10 to 7-29 will be described later, for example.

NZ, which is defined as (ns−nz)/(ns−nf), is used as a parameter characterizing a biaxial phase difference plate. Here, ns represents a greater one of the in-plane principle refractive indices nx and ny (i.e., a refractive index with respect to an electrical field component oscillating in a direction parallel to an in-plane slow axis), whereas nf represents a smaller one of the in-plane principle refractive indices nx and ny (i.e., a refractive index with respect to an electrical field component oscillating in a direction parallel to an in-plane fast axis). NZ can be used for a uniaxial phase difference plate. For example, NZ of a positive A plate is 1, and NZ of a negative A plate is 0. For a C plate, in which the in-plane retardation is zero, the denominator of NZ is zero, and thus NZ is undefined. However, NZ of a positive C plate may be defined as −∞, and NZ of a negative C plate as +∞, for the sake of convenience. There are cases where using NZ makes it possible to grasp the properties of a uniaxial phase difference plate and a biaxial phase difference plate in a unified way, which is convenient.

With a uniaxial phase difference plate, error is allowed for the above-described relational expressions (equalities, in particular) of the principle refractive indices nx, ny, and nz. The allowable range for a uniaxial phase difference plate can be expressed using NZ. For example, a phase difference plate in which NZ is in a range from approximately 0.5 to 2.0 can be regarded as a positive A plate. A phase difference plate in which NZ is in a range from approximately 0.5 to −1.0 can be regarded as a negative A plate. A phase difference plate in which NZ is greater than approximately 5.0 can be regarded as a negative C plate. A phase difference plate in which NZ is less than approximately −4.0 can be regarded as a positive C plate.

The liquid crystal layers 18 in the liquid crystal display panels 100A, 100B, 100B1 to 100B3, 100C1, and 100C2 according to the present embodiment include nematic liquid crystals, and have a homogeneous alignment when no electrical field is applied. In a case where Δn is birefringence of the nematic liquid crystals and d is a thickness of the liquid crystal layer, the in-plane retardation Δnd of the liquid crystal layer 18 is greater than or equal to 360 nm and less than or equal to 490 nm, and is typically 412.5 nm (3λ/4). The first phase difference plate 32a and the second phase difference plate 34a have in-plane retardations. The in-plane retardation R1 of the first phase difference plate 32a is greater than or equal to 100 nm and less than or equal to 160 nm, and is typically 137.5 nm (λ/4). The slow axis of the first phase difference plate 32a and the slow axis of the second phase difference plate 34a are substantially parallel to each other, and the azimuthal directions of the nematic liquid crystal directors in the homogeneous alignment are substantially orthogonal to each other. A preferred configuration for the in-plane retardations of the liquid crystal layer 18 and the first and second phase difference plates 32a and 34a in the liquid crystal display panel according to the present embodiment may be the same as in the liquid crystal display panel according to the first embodiment.

Simulation results for the examples and reference examples will be described hereinafter.

Only the black display state, i.e. the transmittance when no voltage is applied, was examined in the simulations of the liquid crystal display panels according to the present embodiment. No voltage is applied during a black display, and thus the black display performance depends neither on whether a negative-working or positive-working liquid crystal material is used, nor on the direction in which the liquid crystal molecules rotate due to the transverse electrical field. However, employing the preferred conditions according to the first embodiment for the sign of the dielectric anisotropy of the nematic liquid crystals and the direction in which the liquid crystal molecules rotate due to the transverse electrical field makes it possible to achieve not only a good black display but also a display with a low viewing angle dependence of the γ properties.

The black display performance does not depend on the direction in which the slits of the pixel electrodes extend. Although an example in which the slits in the pixel electrodes extend parallel to the vertical direction of the drawing surface in the cross-sectional view is given here (see FIG. 1B, for example), the configuration is not limited thereto. Although there are cases where changing the azimuthal direction in which the slits in the pixel electrodes extend changes the white display transmittance, by changing all of the azimuthal directions, e.g. the azimuthal directions of the absorption axes of the polarizing plates, the azimuthal directions of the slow axes of the phase difference plates, and the director azimuthal direction of the liquid crystal layer, to be aligned with the azimuthal direction in which the slits in the pixel electrodes extend, the same white display transmittance as before the change can be achieved.

As described in the first embodiment, the azimuth angle corresponds to 0° in the direction of three o'clock on the face of a clock (x axis), and the counter-clockwise direction is defined as positive. The x axis direction is orthogonal to the direction in which the pixel electrodes extend.

Unless otherwise specified, the phase differences of the liquid crystal layer and the phase difference plates indicate values at a wavelength of 550 nm.

First, the results of simulations for the liquid crystal display panels according to Examples 7-1 to 7-3 and Reference Example 7-1 will be described. The liquid crystal display panels according to Examples 7-1 to 7-3 have the same configuration as the liquid crystal display panel 100A illustrated in FIG. 30A-A. In the liquid crystal display panels according to Examples 7-1 to 7-3, at least one of the first phase difference plate 32a and the second phase difference plate 34a is a negative A plate. The liquid crystal display panel according to Reference Example 7-1 is different from the liquid crystal display panels according to Examples 7-1 to 7-3 in that both the first phase difference plate 32a and the second phase difference plate 34a are positive A plates.

Table 7 illustrates design values of the liquid crystal display panels according to Reference Example 7-1 and Examples 7-1 to 7-3 (values used in the simulations) and transmittances calculated at a wavelength of 550 nm.

TABLE 7

|  |  | Reference Example 7-1 | Example 7-1 | Example 7-2 | Example 7-3 |
|---|---|---|---|---|---|
| First polarizing plate | Absorption axis (deg) | 40.0 | 40.0 | 40.0 | 40.0 |
| Third phase difference plate | Slow axis (deg) R3 (nm) Rth3 (nm) NZ |  |  |  |  |
| First phase difference plate | Slow axis (deg) | −5.0 | −5.0 | −5.0 | −5.0 |
|  | R1 (nm) | 137.5 | 137.5 | 137.5 | 137.5 |
|  | Rth1 (nm) | 68.75 | −68.75 | 68.75 | −68.75 |
|  | NZ | 1.00 | 0.00 | 1.00 | 0.00 |
| Liquid crystal layer | Δnd (nm) | 412.5 | 412.5 | 412.5 | 412.5 |
|  | RthLC (nm) | 206.3 | 206.3 | 206.3 | 206.3 |
|  | Alignment (deg) | 85.0 | 85.0 | 85.0 | 85.0 |
| Second phase difference plate | Slow axis (deg) | −5.0 | −5.0 | −5.0 | −5.0 |
|  | R2 (nm) | 275.0 | 275.0 | 275.0 | 275.0 |
|  | Rth2 (nm) | 137.50 | −137.50 | −137.50 | 137.50 |
|  | NZ | 1.00 | 0.00 | 0.00 | 1.00 |
| Fourth phase difference plate | Slow axis (deg) R4 (nm) Rth4 (nm) NZ |  |  |  |  |
| Second polarizing plate | Absorption axis (deg) | 130.0 | 130.0 | 130.0 | 130.0 |
| Sum of thickness direction retardations | RthS (nm) | 412.5 | 0.0 | 137.5 | 275.0 |
| Black display transmittance (Polar angle 60°) | Maximum | 0.257 | 0.016 | 0.065 | 0.159 |
|  | Average | 0.130 | 0.008 | 0.029 | 0.090 |

In the liquid crystal display panel according to Example 7-1, both the first phase difference plate 32a and the second phase difference plate 34a serve as negative A plates. In the liquid crystal display panel according to Example 7-2, the first phase difference plate 32a is a positive A plate and the second phase difference plate 34a serves as a negative A plate. In the liquid crystal display panel according to Example 7-3, the first phase difference plate 32a is a negative A plate and the second phase difference plate 34a serves as a positive A plate.

FIGS. 31 to 34 are diagrams illustrating black display transmittances (when no voltage is applied) of the liquid crystal display panels according to Reference Example 7-1 and Examples 7-1 to 7-3, respectively, with respect to azimuth angle and polar angle. The black display transmittance was calculated every 50 for azimuth angles from 0° to 360°, and was calculated every 10° for polar angles from 0° to 80°. Black display transmittances obtained by supplementing the calculation results were expressed using gradations on concentric coordinates indicating azimuth angle and polar angle. In the drawings, the three concentric circles represented by broken lines indicate polar angles of 20°, 40°, and 60° in order from the circle with the smallest radius, and the circle having a solid line outside the broken line circles indicate a polar angle of 80°. Hereinafter, drawings indicating the black display transmittances may have a similar configuration.

Table 7 illustrates, for the black display transmittances of the liquid crystal display panels, both a maximum value of the values at a polar angle of 60° and an average value of the values at a polar angle of 60°. As these values decrease, a better black display, having little light leakage when viewed from an oblique viewing angle, can be achieved.

A liquid crystal simulator (LCD master, manufactured by Shintech) was used in the simulations. The orthogonal transmittance of the polarizing layers used in the simulations was 0.0015%, and the parallel transmittance was 39.04%. The calculated values are obtained when a wavelength is 550 nm.

As illustrated in Table 7, the design values of the liquid crystal display panels according to Reference Example 7-1 and Examples 7-1 to 7-3 are the same as for the liquid crystal display panel according to the above-described Example 2-1 of the first embodiment, except for the thickness direction retardations of the liquid crystal layer 18, the first phase difference plate 32a, and the second phase difference plate 34a. That is, in a case where an in-plane retardation Δnd of the liquid crystal layer 18 is 3λ/4=412.5 nm, an in-plane retardation R1 of the first phase difference plate 32a is λ/4=137.5 nm, and an in-plane retardation R2 of the second phase difference plate 34a is λ/2=275.0 nm, Δnd=R1+R2 is satisfied. The nematic liquid crystal director is aligned to form an azimuth angle of 85°. The slow axis of the first phase difference plate 32a and the slow axis of the second phase difference plate 34a (azimuth angle −5°) are arranged orthogonal to the liquid crystal director (azimuth angle 85°). Δnd and R1+R2 cancel each other out, and the in-plane retardation becomes substantially zero, and thus when observed from a forward viewing angle, a good black display is achieved when no voltage is applied.

The absorption axis of the first polarizing plate 22 (azimuth angle 40°) is arranged to form an angle of −45° with respect to the liquid crystal director (azimuth angle 85°). The absorption axis of the second polarizing plate 24 (azimuth angle 130°) is arranged to form an angle of 45° with respect to the liquid crystal director (azimuth angle 85°). The absorption axis of the first polarizing plate 22 and the absorption axis of the second polarizing plate 24 are orthogonal to each other (a cross Nicol arrangement).

In the simulations, the birefringence Δn of the nematic liquid crystal material was 0.111, and the thickness d of the liquid crystal layer 18 was 3.716 μm. A width S of the openings 16a in the pixel electrodes 16 was 3.3 m, and a distance L between the openings 16a and the edges of the pixel electrodes 16 was 2.7 μm. The thickness of the dielectric layer 15 was set to 100 nm, and the relative dielectric constant was set to 6. In Examples 7-4 to 7-29 described below, a similar configuration will be used.

The in-plane retardations of the liquid crystal layer 18 and the first and second phase difference plates 32a and 34a preferably satisfy the relationship Δn=R1+R2, as with the liquid crystal display panels according to Examples 7-1 to 7-3. In this case, a good black display is achieved and the contrast of bright areas is improved when observed from a forward viewing angle. Additionally, as described in the first embodiment, in a case where the in-plane retardation R1 of the first phase difference plate 32a is greater than or equal to 100 nm and less than or equal to 160 nm, and the in-plane retardation R2 of the second phase difference plate 34a is greater than or equal to 200 nm and less than or equal to 360 nm, the reflection of light incident on the liquid crystal display panel from the observer side can be suppressed, and a display having a high contrast ratio when viewed from a forward viewing angle can be achieved.

An angle formed by the absorption axis of the first polarizing plate 22 and the slow axis of the first phase difference plate 32a is typically substantially 45° or substantially 135°, as in the liquid crystal display panels according to Examples 7-1 to 7-3. However, the present embodiment is not limited thereto. The ellipticity of an elliptical polarizing plate is generally determined by the angle formed by the absorption axis of the polarizing plate and the slow axis of the phase difference plate constituting the elliptical polarizing plate, and by the in-plane retardation of the phase difference plate. There are normally multiple combinations of angles formed by the absorption axis of the polarizing plate and the slow axis of the phase difference plate, and in-plane retardations of the phase difference plate, that give the same ellipticity. Accordingly, the angle formed by the absorption axis of the first polarizing plate 22 and the slow axis of the first phase difference plate 32a, and the in-plane retardation R1 of the first phase difference plate 32a, may be adjusted as appropriate to obtain the desired ellipticity.

An angle formed by the absorption axis of the second polarizing plate 24 and the slow axis of the second phase difference plate 34a is typically substantially 450 or substantially 135°, as in the liquid crystal display panels according to Examples 7-1 to 7-3. However, like the first polarizing plate 22 and the first phase difference plate 32a, the present embodiment is not limited thereto.

Table 7 also illustrates a sum RthS of the thickness direction retardations. The sum RthS of the thickness direction retardations is the total value including a thickness direction retardation RthLC of the liquid crystal layer 18, a thickness direction retardation Rth1 of the first phase difference plate 32, and a thickness direction retardation Rth2 of the second phase difference plate 34 (RthS=RthLC+Rth1+Rth2).

For an A plate, a relationship in which the absolute value of the thickness direction retardation is ½ of the in-plane retardation is satisfied. A liquid crystal layer having a homogeneous alignment is also classified as an A plate. The thickness direction retardation is not normally considered for a liquid crystal layer having a homogeneous alignment, but can be calculated, based on the definition of the thickness direction retardation. In the liquid crystal display panel according to Reference Example 7-1, the values of the thickness direction retardations Rth1 and Rth2 of the first and second phase difference plates 32a and 34a are both positive, and thus in combination with the relationship Δnd=R1+R2, the sum RthS of the thickness direction retardations is equal to the Δnd of the liquid crystal layer 18. In contrast, in the liquid crystal display panels according to Examples 7-1 to 7-3, at least one of the values of the thickness direction retardations Rth1 and Rth2 of the first and second phase difference plates 32a and 34a is negative, and thus the sum RthS of the thickness direction retardations is smaller than the Δnd of the liquid crystal layer 18.

As can be seen from FIGS. 31 to 34 and Table 7, it can be seen that the liquid crystal display panel according to Examples 7-1 to 7-3, in which the first phase difference plate 32a and/or the second phase difference plate 34a are negative A plates, achieves a better black display when observed from oblique viewing angles than the liquid crystal display panel according to Reference Example 7-1, which does not have a negative A plate. In particular, it can be seen from Table 7 that as the sum RthS of the thickness direction retardations decreases, the black display transmittance at a polar angle of 60° decreases as well. In other words, as the sum RthS of the thickness direction retardation decreases, a better black display when observed from oblique viewing angles is achieved.

Considering the simulation results for Examples 7-4 to 7-29, described later, along with Examples 7-1 to 7-3, it was found that a better black display was achieved as the absolute value of the sum of the thickness direction retardations decreases. The method for reducing the absolute value of the sum of the thickness direction retardations is not limited to providing a negative A plate as a phase difference plate.

The simulation results for Examples 7-4 to 7-29 will be described next. The liquid crystal display panels according to Examples 7-4 to 7-8, 7-9A to 7-9C, and 7-10 to 7-29 have the same configuration as the liquid crystal display panel 100B illustrated in FIG. 30A-B. The liquid crystal display panels according to Examples 7-9F to 7-9H have the same configuration as the liquid crystal display panel 100B1 illustrated in FIG. 30B-A. The liquid crystal display panels according to Examples 7-9I to 7-9K have the same configuration as the liquid crystal display panel 100B2 illustrated in FIG. 30B-B. The liquid crystal display panels according to Examples 7-9L to 7-9N have the same configuration as the liquid crystal display panel 100B3 illustrated in FIG. 30B-C. The liquid crystal display panel according to Example 7-9D has the same configuration as the liquid crystal display panel 100C1 illustrated in FIG. 30C-A. The liquid crystal display panel according to Example 7-9E has the same configuration as the liquid crystal display panel 100C2 illustrated in FIG. 30C-B.

The design values of the liquid crystal display panels according to Examples 7-4 to 7-29 are the same as the design values of the liquid crystal display panel according to Reference Example 7-1, except for the third phase difference plate 32b and the fourth phase difference plate 34b. In the liquid crystal display panels according to Examples 7-4 to 7-29, the first phase difference plate 32a and the second phase difference plate 34a are positive A plates. In other words, the thickness direction retardations Rth1 and Rth2 of the first phase difference plate 32a and the second phase difference plate 34a are both positive values. In the liquid crystal display panels according to Examples 7-4 to 7-29 (except for Examples 7-9D and 7-9E), thickness direction retardations Rth3 and Rth4 of the third phase difference plate 32b and the fourth phase difference plate 34b both have negative values. In the liquid crystal display panels according to Examples 7-9D and 7-9E, the thickness direction retardation Rth3 of the third phase difference plate 32b or the thickness direction retardation Rth4 of the fourth phase difference plate 34b has a negative value. Of course, the liquid crystal display panel according to the present embodiment is not limited to the examples described here. In a liquid crystal display panel having the first to fourth phase difference plates 32a, 34a, 32b, and 34b, it is sufficient for the thickness direction retardation of at least one of the phase difference plates to have a negative value. In a liquid crystal display panel having the first phase difference plate 32a, the second phase difference plate 34a, and the third phase difference plate 32b or the fourth phase difference plate 34b, it is sufficient for the thickness direction retardation of at least one of the phase difference plates to have a negative value.

The design values and black display transmittances of the liquid crystal display panels according to Examples 7-4 to 7-8 will be described next with reference to Table 8 and FIGS. 35 to 39.

Like Table 7, Table 8 illustrates design values of the liquid crystal display panels according to Examples 7-4 to 7-8 (values used in the simulations) and black display transmittances (when no voltage is applied) calculated at a wavelength of 550 nm. FIGS. 35 to 39 are diagrams illustrating black display transmittances (when no voltage is applied) of the liquid crystal display panels according to Examples 7-4 to 7-8, respectively, with respect to azimuth angle and polar angle.

TABLE 8

| | | Example 7-4 | Example 7-5 | Example 7-6 | Example 7-7 | Example 7-8 |
|---|---|---|---|---|---|---|
| First polarizing plate | Absorption axis (deg) | 40.0 | 40.0 | 40.0 | 40.0 | 40.0 |
| Third phase difference plate | Slow axis (deg) | — | — | — | — | — |
| | R3 (nm) | 0.0 | 0.0 | 0.0 | 0.0 | 0.0 |
| | Rth3 (nm) | −50.00 | −100.00 | −150.00 | −200.00 | −250.00 |
| | NZ | — | — | — | — | — |
| First phase difference plate | Slow axis (deg) | −5.0 | −5.0 | −5.0 | −5.0 | −5.0 |
| | R1 (nm) | 137.5 | 137.5 | 137.5 | 137.5 | 137.5 |
| | Rth1 (nm) | 68.75 | 68.75 | 68.75 | 68.75 | 68.75 |
| | NZ | 1.00 | 1.00 | 1.00 | 1.00 | 1.00 |
| Liquid crystal layer | Δnd (nm) | 412.5 | 412.5 | 412.5 | 412.5 | 412.5 |
| | RthLC (nm) | 206.3 | 206.3 | 206.3 | 206.3 | 206.3 |
| | Alignment (deg) | 85.0 | 85.0 | 85.0 | 85.0 | 85.0 |
| Second phase difference plate | Slow axis (deg) | −5.0 | −5.0 | −5.0 | −5.0 | −5.0 |
| | R2 (nm) | 275.0 | 275.0 | 275.0 | 275.0 | 275.0 |
| | Rth2 (nm) | 137.50 | 137.50 | 137.50 | 137.50 | 137.50 |
| | NZ | 1.00 | 1.00 | 1.00 | 1.00 | 1.00 |
| Fourth phase difference plate | Slow axis (deg) | — | — | — | — | — |
| | R4 (nm) | 0.0 | 0.0 | 0.0 | 0.0 | 0.0 |
| | Rth4 (nm) | −50.00 | −100.00 | −150.00 | −200.00 | −250.00 |
| | NZ | — | — | — | — | — |
| Second polarizing plate | Absorption axis (deg) | 130.0 | 130.0 | 130.0 | 130.0 | 130.0 |
| Sum of thickness direction retardations | RthS (nm) | 312.5 | 212.5 | 112.5 | 12.5 | −87.5 |

TABLE 8-continued

|  |  | Example 7-4 | Example 7-5 | Example 7-6 | Example 7-7 | Example 7-8 |
|---|---|---|---|---|---|---|
| Black display transmittance (Polar angle 60°) | Maximum | 0.181 | 0.109 | 0.056 | 0.040 | 0.049 |
|  | Average | 0.086 | 0.049 | 0.023 | 0.014 | 0.021 |

The liquid crystal display panels according to Examples 7-4 to 7-8 have positive C plates as the third phase difference plate 32b and the fourth phase difference plate 34b. A C plate does not have in-plane retardation, and thus the slow axis and NZ are undefined.

As illustrated in Table 8, in the liquid crystal display panels according to Examples 7-4 to 7-8, the thickness direction retardation Rth3 of the third phase difference plate 32b and the thickness direction retardation Rth4 of the fourth phase difference plate 34b have different values. Table 8 also illustrates the sum RthS of the thickness direction retardations. The sum RthS of the thickness direction retardations is the total value including the thickness direction retardation RthLC of the liquid crystal layer 18, the thickness direction retardation Rth1 of the first phase difference plate 32a, the thickness direction retardation Rth2 of the second phase difference plate 34s, the thickness direction retardation Rth3 of the third phase difference plate 32b, and the thickness direction retardation Rth4 of the fourth phase difference plate 34b (RthS=RthLC+Rth1+Rth2+Rth3+Rth4).

As can be seen from Table 8 and FIGS. 35 to 39, as the absolute value of the sum RthS of the thickness direction retardation decreases, a better black display having little light leakage when observed from oblique viewing angles is achieved.

The in-plane retardations of the liquid crystal display panels according to Examples 7-4 to 7-8 will be discussed next. The slow axis of the first phase difference plate 32a and the slow axis of the second phase difference plate 34a (azimuth angle −5°) are arranged orthogonal to the liquid crystal director (azimuth angle 85°). Δnd=R1+R2 is satisfied, and thus Δnd and R1+R2 cancel each other out. The third phase difference plate 32b and the fourth phase difference plate 34b are C plates having no in-plane retardations. Accordingly, the in-plane retardations of the liquid crystal display panels according to Examples 7-4 to 7-8 become substantially zero, and thus when observed from a forward viewing angle too, a good black display is achieved when no voltage is applied.

The design values and black display transmittances of liquid crystal display panels according to Examples 7-9A to 7-9N will be described next with reference to Tables 9 to 12 and FIGS. 40 to 53.

Like Table 8, Tables 9 to 12 illustrate design values of the liquid crystal display panels according to Examples 7-9A to 7-9N (values used in the simulations) and black display transmittances (when no voltage is applied) calculated at a wavelength of 550 nm. FIGS. 40 to 53 are diagrams illustrating black display transmittances (when no voltage is applied) of the liquid crystal display panels according to Examples 7-9A to 7-9N, respectively, with respect to azimuth angle and polar angle.

TABLE 9

|  |  | Example 7-9A | Example 7-9B | Example 7-9C | Example 7-9D | Example 7-9E |
|---|---|---|---|---|---|---|
| First polarizing plate | Absorption axis (deg) | 40.0 | 40.0 | 40.0 | 40.0 | 40.0 |
| Third phase difference plate | Slow axis (deg) | — | — | — | — |  |
|  | R3 (nm) | 0.0 | 0.0 | 0.0 | 0.0 |  |
|  | Rth3 (nm) | −206.25 | −137.50 | −275.00 | −412.50 |  |
|  | NZ | — | — | — | — |  |
| First phase difference plate | Slow axis (deg) | −5.0 | −5.0 | −5.0 | −5.0 | −5.0 |
|  | R1 (nm) | 137.5 | 137.5 | 137.5 | 137.5 | 137.5 |
|  | Rth1 (nm) | 68.75 | 68.75 | 68.75 | 68.75 | 68.75 |
|  | NZ | 1.00 | 1.00 | 1.00 | 1.00 | 1.00 |
| Liquid crystal layer | Δnd (nm) | 412.5 | 412.5 | 412.5 | 412.5 | 412.5 |
|  | RthLC (nm) | 206.3 | 206.3 | 206.3 | 206.3 | 206.3 |
|  | Alignment (deg) | 85.0 | 85.0 | 85.0 | 85.0 | 85.0 |
| Second phase difference plate | Slow axis (deg) | −5.0 | −5.0 | −5.0 | −5.0 | −5.0 |
|  | R2 (nm) | 275.0 | 275.0 | 275.0 | 275.0 | 275.0 |
|  | Rth2 (nm) | 137.50 | 137.50 | 137.50 | 137.50 | 137.50 |
|  | NZ | 1.00 | 1.00 | 1.00 | 1.00 | 1.00 |
| Fourth phase difference plate | Slow axis (deg) | — | — | — | — | — |
|  | R4 (nm) | 0.0 | 0.0 | 0.0 |  | 0.0 |
|  | Rth4 (nm) | −206.25 | −275.00 | −137.50 |  | −412.50 |
|  | NZ | — | — | — |  | — |
| Second polarizing plate | Absorption axis (deg) | 130.0 | 130.0 | 130.0 | 130.0 | 130.0 |
| Sum of thickness direction retardations | RthS (nm) | 0.0 | 0.0 | 0.0 | 0.0 | 0.0 |

TABLE 9-continued

|  |  | Example 7-9A | Example 7-9B | Example 7-9C | Example 7-9D | Example 7-9E |
|---|---|---|---|---|---|---|
| Black display transmittance (Polar angle 60°) | Maximum | 0.040 | 0.058 | 0.037 | 0.099 | 0.087 |
|  | Average | 0.014 | 0.017 | 0.015 | 0.026 | 0.031 |

TABLE 10

|  |  | Example 7-9F | Example 7-9G | Example 7-9H |
|---|---|---|---|---|
| First polarizing plate | Absorption axis (deg) | 40.0 | 40.0 | 40.0 |
| First phase difference plate | Slow axis (deg) | −5.0 | −5.0 | −5.0 |
|  | R1 (nm) | 137.5 | 137.5 | 137.5 |
|  | Rth1 (nm) | 68.75 | 68.75 | 68.75 |
|  | NZ | 1.00 | 1.00 | 1.00 |
| Third phase difference plate | Slow axis (deg) | — | — | — |
|  | R3 (nm) | 0.0 | 0.0 | 0.0 |
|  | Rth3 (nm) | −206.25 | −137.50 | −275.00 |
|  | NZ | — | — | — |
| Liquid crystal layer | Δnd (nm) | 412.5 | 412.5 | 412.5 |
|  | RthLC (nm) | 206.3 | 206.3 | 206.3 |
|  | Alignment (deg) | 85.0 | 85.0 | 85.0 |
| Fourth phase difference plate | Slow axis (deg) | — | — | — |
|  | R4 (nm) | 0.0 | 0.0 | 0.0 |
|  | Rth4(nm) | −206.25 | −275.00 | −137.50 |
|  | NZ | — | — | — |
| Second phase difference plate | Slow axis (deg) | −5.0 | −5.0 | −5.0 |
|  | R2 (nm) | 275.0 | 275.0 | 275.0 |
|  | Rth2 (nm) | 137.50 | 137.50 | 137.50 |
|  | NZ | 1.00 | 1.00 | 1.00 |
| Second polarizing plate | Absorption axis (deg) | 130.0 | 130.0 | 130.0 |
| Sum of thickness direction retardations | RthS (nm) | 0.0 | 0.0 | 0.0 |
| Black display transmittance (Polar angle 60°) | Maximum | 0.135 | 0.073 | 0.202 |
|  | Average | 0.066 | 0.039 | 0.096 |

TABLE 11

|  |  | Example 7-9I | Example 7-9J | Example 7-9K |
|---|---|---|---|---|
| First polarizing plate | Absorption axis (deg) | 40.0 | 40.0 | 40.0 |
| Third phase difference plate | Slow axis (deg) | — | — | — |
|  | R3 (nm) | 0.0 | 0.0 | 0.0 |
|  | Rth3 (nm) | −206.25 | −137.50 | −275.00 |
|  | NZ | — | — | — |
| First phase difference plate | Slow axis (deg) | −5.0 | −5.0 | −5.0 |
|  | R1 (nm) | 137.5 | 137.5 | 137.5 |
|  | Rth1 (nm) | 68.75 | 68.75 | 68.75 |
|  | NZ | 1.00 | 1.00 | 1.00 |
| Liquid crystal layer | Δnd (nm) | 412.5 | 412.5 | 412.5 |
|  | RthLC (nm) | 206.3 | 206.3 | 206.3 |
|  | Alignment (deg) | 85.0 | 85.0 | 85.0 |
| Fourth phase difference plate | Slow axis (deg) | — | — | — |
|  | R4 (nm) | 0.0 | 0.0 | 0.0 |
|  | Rth4 (nm) | −206.25 | −275.00 | −137.50 |
|  | NZ | — | — | — |
| Second phase difference plate | Slow axis (deg) | −5.0 | −5.0 | −5.0 |
|  | R2 (nm) | 275.0 | 275.0 | 275.0 |
|  | Rth2 (nm) | 137.50 | 137.50 | 137.50 |
|  | NZ | 1.00 | 1.00 | 1.00 |
| Second polarizing plate | Absorption axis (deg) | 130.0 | 130.0 | 130.0 |
| Sum of thickness direction retardations | RthS (nm) | 0.0 | 0.0 | 0.0 |
| Black display transmittance (Polar angle 60°) | Maximum | 0.038 | 0.037 | 0.044 |
|  | Average | 0.017 | 0.017 | 0.017 |

TABLE 12

|  |  | Example 7-9L | Example 7-9M | Example 7-9N |
|---|---|---|---|---|
| first polarizing plate | Absorption axis (deg) | 40.0 | 40.0 | 40.0 |
| first phase difference plate | Slow axis (deg) | −5.0 | −5.0 | −5.0 |
|  | R1 (nm) | 137.5 | 137.5 | 137.5 |
|  | Rth1 (nm) | 68.75 | 68.75 | 68.75 |
|  | NZ | 1.00 | 1.00 | 1.00 |
| Third phase difference plate | Slow axis (deg) | — | — | — |
|  | R3 (nm) | 0.0 | 0.0 | 0.0 |
|  | Rth3 (nm) | −206.25 | −137.50 | −275.00 |
|  | NZ | — | — | — |
| Liquid crystal layer | Δnd (nm) | 412.5 | 412.5 | 412.5 |
|  | RthLC (nm) | 206.3 | 206.3 | 206.3 |
|  | Alignment (deg) | 85.0 | 85.0 | 85.0 |
| Second phase difference plate | Slow axis (deg) | −5.0 | −5.0 | −5.0 |
|  | R2 (nm) | 275.0 | 275.0 | 275.0 |
|  | Rth2 (nm) | 137.50 | 137.50 | 137.50 |
|  | NZ | 1.00 | 1.00 | 1.00 |
| Fourth phase difference plate | Slow axis (deg) | — | — | — |
|  | R4 (nm) | 0.0 | 0.0 | 0.0 |
|  | Rth4 (nm) | −206.25 | −275.00 | −137.50 |
|  | NZ | — | — | — |
| Second polarizing plate | Absorption axis (deg) | 130.0 | 130.0 | 130.0 |
| Sum of thickness direction retardations | RthS (nm) | 0.0 | 0.0 | 0.0 |
| Black display transmittance (Polar angle 60°) | Maximum | 0.171 | 0.138 | 0.210 |
|  | Average | 0.073 | 0.050 | 0.100 |

The liquid crystal display panels according to Examples 7-9A to 7-9N have positive C plates as the third phase difference plate 32b and/or the fourth phase difference plate 34b. A C plate does not have in-plane retardation, and thus the slow axis and NZ are undefined. In the liquid crystal display panels according to Examples 7-9A to 7-9N, the values of the thickness direction retardations of the third phase difference plate 32b and the fourth phase difference plate 34b are set such that the sum RthS of the thickness direction retardations is zero.

As illustrated in Table 9, the liquid crystal display panels according to Examples 7-9A to 7-9C have the same configuration as the liquid crystal display panel 100B illustrated in FIG. 30A-B. In the liquid crystal display panels according to Examples 7-9A to 7-9C, the thickness direction retardation Rth3 of the third phase difference plate 32b and the thickness direction retardation Rth4 of the fourth phase difference plate 34b have mutually-different values. In the liquid crystal display panel according to Example 7-9A, the thickness direction retardation Rth3 of the third phase difference plate 32b and the thickness direction retardation Rth4 of the fourth phase difference plate 34b are equal to each other. In the liquid crystal display panel according to Example 7-9B, the thickness direction retardation Rth3 of the third phase difference plate 32b is greater than the thickness direction retardation Rth4 of the fourth phase difference plate 34b. In the liquid crystal display panel according to Example 7-9C, the thickness direction retardation Rth3 of the third phase difference plate 32b is less than the thickness direction retardation Rth4 of the fourth phase difference plate 34b.

As illustrated in Table 9, the liquid crystal display panel according to Example 7-9D has the same configuration as the liquid crystal display panel 100C1 illustrated in FIG. 30C-A, and the liquid crystal display panel according to Example 7-9E has the same configuration as the liquid crystal display panel 100C2 illustrated in FIG. 30C-B. In the liquid crystal display panels according to Examples 7-9D and 7-9E, the sum RthS of the thickness direction retardations is the total value including the thickness direction retardation RthLC of the liquid crystal layer 18, the thickness direction retardation Rth1 of the first phase difference plate 32a, the thickness direction retardation Rth2 of the second phase difference plate 34s, and the thickness direction retardation Rth3 of the third phase difference plate 32b or the thickness direction retardation Rth4 of the fourth phase difference plate 34b (RthS=RthLC+Rth1+Rth2+Rth3 or RthS=RthLC+Rth1+Rth2+Rth4).

In each of the liquid crystal display panels according to Examples 7-9A to 7-9E, the sum RthS of the thickness direction retardation is zero, and thus a good black display when viewing from oblique viewing angles can be achieved. In comparing the results of Examples 7-9A to 7-9E, it can be seen that a structure in which both the third and fourth phase difference plates 32b and 34b are provided, as in the liquid crystal display panels according to Examples 7-9A to 7-9C, achieves a better black display when observed from oblique viewing angles than a structure in which only the third phase difference plate 32b or the fourth phase difference plate 34b is provided, as in the liquid crystal display panels according to Example 7-9D or Example 7-9E. In comparing the results of Examples 7-9A to 7-9C, it can be seen that when priority is given to reducing the black display transmittance at a polar angle of 60° by the average value rather than the maximum value, it tends to be preferable that the thickness direction retardation Rth3 of the third phase difference plate 32b and the thickness direction retardation Rth4 of the fourth phase difference plate 34b be equal to each other, as in the liquid crystal display panel according to Example 7-9A.

The liquid crystal display panels according to Examples 7-9F to 7-9H illustrated in Table 10, the liquid crystal display panels according to Examples 7-9I to 7-9K illustrated in Table 11, and the liquid crystal display panels according to Examples 7-9L to 7-9N illustrated in Table 12 are the same as the liquid crystal display panels according to Examples 7-9A to 7-9C illustrated in Table 9 in terms of the values of the thickness direction retardation Rth3 of the third phase difference plate 32b and the thickness direction retardation Rth4 of the fourth phase difference plate 34b.

As illustrated in Table 10, the liquid crystal display panels according to Examples 7-9F to 7-9H have the same configuration as the liquid crystal display panel 100B1 illustrated in FIG. 30B-A. The liquid crystal display panels according to Examples 7-9F to 7-9H are the reverse of the liquid crystal display panels according to Examples 7-9A to 7-9C in terms of the arrangement relationship of the first phase difference plate 32a and the third phase difference plate 32b, and the arrangement relationship of the second phase difference plate 34a and the fourth phase difference plate 34b.

As illustrated in Table 11, the liquid crystal display panels according to Examples 7-9I to 7-9K have the same configuration as the liquid crystal display panel 100B2 illustrated in FIG. 30B-B. The liquid crystal display panels according to Examples 7-9I to 7-9K are the reverse of the liquid crystal display panels according to Examples 7-9A to 7-9C in terms of the arrangement relationship of the second phase difference plate 34a and the fourth phase difference plate 34b.

As illustrated in Table 12, the liquid crystal display panels according to Examples 7-9L to 7-9N have the same configuration as the liquid crystal display panel 100B3 illustrated in FIG. 30B-C. The liquid crystal display panels according to Examples 7-9L to 7-9N are the reverse of the liquid crystal display panels according to Examples 7-9A to 7-9C in terms of the arrangement relationship of the first phase difference plate 32a and the third phase difference plate 32b.

A preferred arrangement relationship of the first phase difference plate 32a and the third phase difference plate 32b, and a preferred arrangement relationship of the second phase difference plate 34a and the fourth phase difference plate 34b, were investigated by comparing the results illustrated in Tables 9 to 12. In comparing the results of Examples 7-9A to 7-9N, it can be seen that an excellent black display when observed from oblique viewing angles is achieved by the liquid crystal display panels according to Examples 7-9A to 7-9C and the liquid crystal display panels according to Examples 7-9I to 7-9K. The liquid crystal display panels according to Examples 7-9A to 7-9C in particular have excellent black displays when observed from oblique viewing angles. It tends to be preferable that the third phase difference plate 32b be disposed between the first phase difference plate 32a and the first polarizing plate 22, as long as the sum of the thickness direction retardations is the same. Additionally, it is further preferable that the fourth phase difference plate 34b be disposed between the second phase difference plate 34a and the second polarizing plate 24.

The in-plane retardations of the liquid crystal display panels according to Examples 7-9A to 7-9N will be discussed next. The slow axis of the first phase difference plate 32a and the slow axis of the second phase difference plate 34a (azimuth angle −5°) are arranged orthogonal to the liquid crystal director (azimuth angle 85°). $\Delta nd = R1 + R2$ is satisfied, and thus $\Delta nd$ and $R1 + R2$ cancel each other out. The third phase difference plate 32b and the fourth phase difference plate 34b are C plates having no in-plane retardations. Accordingly, the in-plane retardations of the liquid crystal display panels according to Examples 7-9A to 7-9N become substantially zero, and thus when observed from a forward viewing angle too, a good black display is achieved when no voltage is applied.

The design values and black display transmittances of the liquid crystal display panels according to Examples 7-10 to 7-17 will be described next with reference to Table 13 and FIGS. 54 to 61. Like Table 8, Table 13 illustrates design values of the liquid crystal display panels according to Examples 7-10 to 7-17 (values used in the simulations) and black display transmittances (when no voltage is applied) calculated at a wavelength of 550 nm. FIGS. 54 to 61 are diagrams illustrating black display transmittances (when no voltage is applied) of the liquid crystal display panels according to Examples 7-10 to 7-17, respectively, with respect to azimuth angle and polar angle.

TABLE 13

| | | Example 7-10 | Example 7-11 | Example 7-12 | Example 7-13 | Example 7-14 | Example 7-15 | Example 7-16 | Example 7-17 |
|---|---|---|---|---|---|---|---|---|---|
| First polarizing plate | Absorption axis (deg) | 40.0 | 40.0 | 40.0 | 40.0 | 40.0 | 40.0 | 40.0 | 40.0 |
| Third phase difference plate | Slow axis (deg) | 40.0 | 130.0 | 40.0 | 130.0 | 40.0 | 130.0 | 40.0 | 130.0 |
| | R3 (nm) | 33.3 | 33.3 | 66.6 | 66.6 | 99.9 | 99.9 | 133.2 | 133.2 |
| | Rth3 (nm) | −49.95 | −49.95 | −99.9 | −99.9 | −149.9 | −149.9 | −199.8 | −199.8 |
| | NZ | −1.00 | −1.00 | −1.00 | −1.00 | −1.00 | −1.00 | −1.00 | −1.00 |
| First phase difference plate | Slow axis (deg) | −5.0 | −5.0 | −5.0 | −5.0 | −5.0 | −5.0 | −5.0 | −5.0 |
| | R1 (nm) | 137.5 | 137.5 | 137.5 | 137.5 | 137.5 | 137.5 | 137.5 | 137.5 |
| | Rth1 (nm) | 68.75 | 68.75 | 68.75 | 68.75 | 68.75 | 68.75 | 68.75 | 68.75 |
| | NZ | 1.00 | 1.00 | 1.00 | 1.00 | 1.00 | 1.00 | 1.00 | 1.00 |
| Liquid crystal layer | $\Delta nd$ (nm) | 412.5 | 412.5 | 412.5 | 412.5 | 412.5 | 412.5 | 412.5 | 412.5 |
| | RthLC (nm) | 206.3 | 206.3 | 206.3 | 206.3 | 206.3 | 206.3 | 206.3 | 206.3 |
| | Alignment (deg) | 85.0 | 85.0 | 85.0 | 85.0 | 85.0 | 85.0 | 85.0 | 85.0 |
| Second phase difference plate | Slow axis (deg) | −5.0 | −5.0 | −5.0 | −5.0 | −5.0 | −5.0 | −5.0 | −5.0 |
| | R2 (nm) | 275.0 | 275.0 | 275.0 | 275.0 | 275.0 | 275.0 | 275.0 | 275.0 |
| | Rth2 (nm) | 137.50 | 137.50 | 137.50 | 137.50 | 137.50 | 137.50 | 137.50 | 137.50 |
| | NZ | 1.00 | 1.00 | 1.00 | 1.00 | 1.00 | 1.00 | 1.00 | 1.00 |
| Fourth phase difference plate | Slow axis (deg) | 130.0 | 40.0 | 130.0 | 40.0 | 130.0 | 40.0 | 130.0 | 40.0 |
| | R4 (nm) | 33.3 | 33.3 | 66.6 | 66.6 | 99.9 | 99.9 | 133.2 | 133.2 |
| | Rth4 (nm) | −49.95 | −49.95 | −99.9 | −99.9 | −149.9 | −149.9 | −199.8 | −199.8 |
| | NZ | −1.00 | −1.00 | −1.00 | −1.00 | −1.00 | −1.00 | −1.00 | −1.00 |
| Second polarizing plate | Absorption axis (deg) | 130.0 | 130.0 | 130.0 | 130.0 | 130.0 | 130.0 | 130.0 | 130.0 |
| Sum of thickness direction retardations | RthS (nm) | 312.6 | 312.6 | 212.7 | 212.7 | 112.8 | 112.8 | 12.9 | 12.9 |

TABLE 13-continued

|  |  | Example 7-10 | Example 7-11 | Example 7-12 | Example 7-13 | Example 7-14 | Example 7-15 | Example 7-16 | Example 7-17 |
| --- | --- | --- | --- | --- | --- | --- | --- | --- | --- |
| Black display transmittance (Polar angle 60°) | Maximum | 0.154 | 0.210 | 0.067 | 0.179 | 0.061 | 0.173 | 0.123 | 0.196 |
|  | Average | 0.072 | 0.103 | 0.031 | 0.084 | 0.025 | 0.081 | 0.055 | 0.093 |

In the liquid crystal display panels according to Examples 7-10 to 7-17, biaxial phase difference plates having negative thickness direction retardations are used as the third phase difference plate 32b and the fourth phase difference plate 34b. In Examples 7-10 to 7-17, the NZs of the biaxial phase difference plates used are all −1. In the liquid crystal display panels according to Examples 7-10, 7-12, and 7-14, the thickness direction retardations Rth3 and Rth4 of the third and fourth phase difference plates 32b and 34b have mutually-different values. In the liquid crystal display panels according to Examples 7-10, 7-12, and 7-14, the in-plane retardations R3 and R4 of the third and fourth phase difference plates 32b and 34b also have mutually-different values. In comparing these results, is can be seen that as the absolute value of the sum RthS of the thickness direction retardation decreases, a better black display when observed from oblique viewing angles tends to be achieved. However, in Example 7-16, although the sum RthS of the thickness direction retardations is smaller than in Examples 7-10, 7-12, and 1-14, the black display transmittance at a polar angle of 60° is greater than in Examples 7-12 and 7-14. In the liquid crystal display panel according to Example 7-16, the in-plane retardation R3 of the third phase difference plate 32b and the in-plane retardation R4 of the fourth phase difference plate 34b are each 133.2 nm. When the in-plane retardation R3 of the third phase difference plate 32b and the in-plane retardation R4 of the fourth phase difference plate 34b are high (greater than 100 nm, for example), the sum RthS of the thickness direction retardations decrease, and there are thus cases where it is difficult to reduce the black display transmittance at a polar angle of 60°. Preferably, the in-plane retardation R3 of the third phase difference plate 32b and the in-plane retardation R4 of the fourth phase difference plate 34b are both less than 100 nm, for example.

In the liquid crystal display panels according to Examples 7-10 and 7-11, the thickness direction retardations Rth3 and Rth4 of the third and fourth phase difference plates 32b and 34b are the same, but the angle formed by the absorption axis of the first polarizing plate 22 and the slow axis of the third phase difference plate 32b, and the angle formed by the absorption axis of the second polarizing plate 24 and the slow axis of the fourth phase difference plate 34b, are different from each other. In the liquid crystal display panel according to Example 7-10, the absorption axis of the first polarizing plate 22 and the slow axis of the third phase difference plate 32b are parallel to each other, and the absorption axis of the second polarizing plate 24 and the slow axis of the fourth phase difference plate 34b are parallel to each other. However, in the liquid crystal display panel according to Example 7-11, the absorption axis of the first polarizing plate 22 and the slow axis of the third phase difference plate 32b are orthogonal to each other, and the absorption axis of the second polarizing plate 24 and the slow axis of the fourth phase difference plate 34b are orthogonal to each other. The same relationship applies in the liquid crystal display panels according to Examples 7-12 and 7-13, 7-14 and 7-15, and 7-16 and 7-17, respectively.

In comparing the results of the liquid crystal display panels according to Examples 7-10 and 7-11, the liquid crystal display panel according to Example 7-10 has a lower black display transmittance, and achieves a better black display when observed from oblique viewing angles, despite the sums of the thickness direction retardations being the same. It can be seen that compared to a case where the absorption axis of the first polarizing plate 22 and the slow axis of the third phase difference plate 32b are orthogonal and the absorption axis of the second polarizing plate 24 and the slow axis of the fourth phase difference plate 34b are orthogonal to each other, it is preferable that the absorption axis of the first polarizing plate 22 and the slow axis of the third phase difference plate 32b be parallel to each other and the absorption axis of the second polarizing plate 24 and the slow axis of the fourth phase difference plate 34b be parallel to each other. To rephrase, it can be seen that preferably, the polarization axis (transmission axis) of the first polarizing plate 22 and the slow axis of the third phase difference plate 32b be orthogonal to each other, and the polarization axis (transmission axis) of the second polarizing plate 24 and the slow axis of the fourth phase difference plate 34b be orthogonal to each other. The same results are obtained by the liquid crystal display panels according to Examples 7-12 and 7-13, 7-14 and 7-15, and 7-16 and 7-17, respectively.

In a case where the angle formed by the absorption axis of the first polarizing plate 22 and the slow axis of the third phase difference plate 32b is the same as the angle formed by the absorption axis of the second polarizing plate 24 and the slow axis of the fourth phase difference plate 34b, a better black display when observed from oblique viewing angles tends to be achieved as the absolute value of the sum RthS of the thickness direction retardations decreases. However, such a configuration may not be the case when the sizes of these angles differ. For example, in comparing the liquid crystal display panel according to Example 7-12 with the liquid crystal display panel according to Example 7-15, the absolute value of the sum RthS of the thickness direction retardations is higher than in the liquid crystal display panel according to Example 7-15, but the black display transmittance at a polar angle of 60° is smaller than in the liquid crystal display panel according to Example 7-15. In other words, a good black display can be achieved by appropriately adjusting not only the sum RthS of the thickness direction retardations, but also the angle formed by the absorption axis of the first polarizing plate 22 and the slow axis of the third phase difference plate 32b, and the angle formed by the absorption axis of the second polarizing plate 24 and the slow axis of the fourth phase difference plate 34b.

The angle formed by the absorption axis of the first polarizing plate 22 and the slow axis of the third phase difference plate 32b is typically substantially 0° or substantially 90°, as in the liquid crystal display panels according to Examples 7-10 to 7-17. However, the present embodiment is not limited thereto. Likewise, the angle formed by the absorption axis of the second polarizing plate 24 and the slow axis of the fourth phase difference plate 34b is typically substantially 0° or substantially 90°, as in the liquid crystal display panels according to Examples 7-10 to 7-17. However, the present embodiment is not limited thereto.

The in-plane retardations of the liquid crystal display panels according to Examples 7-10 to 7-17 will be discussed next. The slow axis of the first phase difference plate 32a and the slow axis of the second phase difference plate 34a (azimuth angle −5°) are arranged orthogonal to the liquid crystal director (azimuth angle 85°). Δnd=R1+R2 is satisfied, and thus Δnd and R1+R2 cancel each other out. The in-plane retardation R3 of the third phase difference plate 32b and the in-plane retardation R4 of the fourth phase difference plate 34b are equal. The slow axis of the third phase difference plate 32b (azimuth angle 40° in Examples 7-10, 7-12, 7-14, and 7-16; azimuth angle 130° in Examples 7-11, 7-13, 7-15, and 7-17) and the slow axis of the fourth phase difference plate 34b (azimuth angle 130° in Examples 7-10, 7-12, 7-14, and 7-16; azimuth angle 40° in Examples 7-11, 7-13, 7-15, and 7-17) are orthogonal to each other. Accordingly, the in-plane retardation R3 of the third phase difference plate 32b and the in-plane retardation R4 of the fourth phase difference plate 34b cancel each other out.

Thus, the in-plane retardations of the liquid crystal display panels according to Examples 7-10 to 7-17 become substantially zero, and thus when observed from a forward viewing angle too, a good black display is achieved when no voltage is applied.

The design values and black display transmittances of the liquid crystal display panels according to Examples 7-18 to 7-29 will be described next with reference to Tables 14 and 15 and FIGS. 62 to 73. Table 14 illustrates design values of the liquid crystal display panels according to Examples 7-18 to 7-25 (values used in the simulations) and black display transmittances (when no voltage is applied) calculated at a wavelength of 550 nm. Table 15 illustrates design values of the liquid crystal display panels according to Examples 7-26 to 7-29 (values used in the simulations) and black display transmittances (when no voltage is applied) calculated at a wavelength of 550 nm. FIGS. 62 to 73 are diagrams illustrating black display transmittances (when no voltage is applied) of the liquid crystal display panels according to Examples 7-18 to 7-29, respectively, with respect to azimuth angle and polar angle.

TABLE 14

| | | Example 7-18 | Example 7-19 | Example 7-20 | Example 7-21 | Example 7-22 | Example 7-23 | Example 7-24 | Example 7-25 |
|---|---|---|---|---|---|---|---|---|---|
| First polarizing plate | Absorption axis (deg) | 40.0 | 40.0 | 40.0 | 40.0 | 50.0 | 40.0 | 40.0 | 40.0 |
| Third phase difference plate | Slow axis (deg) | 40.0 | 130.0 | 40.0 | 130.0 | 40.0 | 130.0 | 40.0 | 130.0 |
| | R3 (nm) | 20.0 | 20.0 | 40.0 | 40.0 | 14.3 | 14.3 | 28.60 | 28.60 |
| | Rth3 (nm) | −50.00 | −50.00 | −100.0 | −100.0 | −50.05 | −50.05 | −100.10 | −100.10 |
| | NZ | −2.00 | −2.00 | −2.00 | −2.00 | −3.00 | −3.00 | −3.00 | −3.00 |
| First phase difference plate | Slow axis (deg) | −5.0 | −5.0 | −5.0 | −5.0 | −5.0 | −5.0 | −5.0 | −5.0 |
| | R1 (nm) | 137.5 | 137.5 | 137.5 | 137.5 | 137.5 | 137.5 | 137.5 | 137.5 |
| | Rth1 (nm) | 68.75 | 68.75 | 68.75 | 68.75 | 68.75 | 68.75 | 68.75 | 68.75 |
| | NX | 1.00 | 1.00 | 1.00 | 1.00 | 1.00 | 1.00 | 1.00 | 1.00 |
| Liquid crystal layer | Δnd (nm) | 412.5 | 412.5 | 412.5 | 412.5 | 412.5 | 412.5 | 412.5 | 412.5 |
| | RthLC (nm) | 206.3 | 206.3 | 206.3 | 206.3 | 206.3 | 206.3 | 206.3 | 206.3 |
| | Alignment (deg) | 85.0 | 85.0 | 85.0 | 85.0 | 85.0 | 85.0 | 85.0 | 85.0 |
| Second phase difference plate | Slow axis (deg) | −5.0 | −5.0 | −5.0 | −5.0 | −5.0 | −5.0 | −5.0 | −5.0 |
| | R2 (nm) | 275.0 | 275.0 | 275.0 | 275.0 | 275.0 | 275.0 | 275.0 | 275.0 |
| | Rth2 (nm) | 137.50 | 137.50 | 137.50 | 137.50 | 137.50 | 137.50 | 137.50 | 137.50 |
| | NZ | 1.00 | 1.00 | 1.00 | 1.00 | 1.00 | 1.00 | 1.00 | 1.00 |
| Fourth phase difference plate | Slow axis (deg) | 130.0 | 40.0 | 130.0 | 40.0 | 130.0 | 40.0 | 130.0 | 40.0 |
| | R4 (nm) | 20.0 | 20.0 | 40.0 | 40.0 | 14.3 | 14.3 | 28.60 | 28.60 |
| | Rth4 (nm) | −50.00 | −50.00 | −100.00 | −100.00 | −50.05 | −50.05 | −100.10 | −100.10 |
| | NZ | −2.00 | −2.00 | −3.00 | −3.00 | −3.00 | −3.00 | −3.00 | −3.00 |
| Second polarizing plate | Absorption axis (deg) | 130.0 | 130.0 | 130.0 | 130.0 | 130.0 | 130.0 | 130.0 | 130.0 |
| Sum of thickness direction retardations | RthS (nm) | 312.5 | 312.5 | 212.5 | 212.5 | 312.4 | 312.4 | 212.3 | 212.3 |
| Black display Transmittance (Polar angle 60°) | Maximum | 0.164 | 0.199 | 0.076 | 0.151 | 0.169 | 0.194 | 0.084 | 0.139 |
| | Average | 0.077 | 0.096 | 0.034 | 0.070 | 0.080 | 0.093 | 0.037 | 0.063 |

TABLE 5

| | | Example 7-26 | Example 7-27 | Example 7-28 | Example 7-29 |
|---|---|---|---|---|---|
| First polarizing plate | Absorption axis (deg) | 40.0 | 40.0 | 40.0 | 40.0 |
| Third phase difference plate | Slow axis (deg) | 40.0 | 130.0 | 40.0 | 130.0 |
| | R3 (nm) | 11.1 | 11.1 | 22.2 | 22.2 |
| | Rth3 (nm) | −49.95 | −49.95 | −99.9 | −99.9 |
| | NZ | −4.00 | −4.00 | −4.00 | −4.00 |
| First phase difference plate | Slow axis (deg) | −5.0 | −5.0 | −5.0 | −5.0 |
| | R1 (nm) | 137.5 | 137.5 | 137.5 | 137.5 |
| | Rth1 (nm) | 68.75 | 68.75 | 68.75 | 68.75 |
| | NZ | 1.00 | 1.00 | 1.00 | 1.00 |
| Liquid crystal layer | Δnd (nm) | 412.5 | 412.5 | 412.5 | 412.5 |
| | RthLC (nm) | 206.3 | 206.3 | 206.3 | 206.3 |
| | Alignment (deg) | 85.0 | 85.0 | 85.0 | 85.0 |

TABLE 5-continued

|  |  | Example 7-26 | Example 7-27 | Example 7-28 | Example 7-29 |
|---|---|---|---|---|---|
| Second phase difference plate | Slow axis (deg) | −5.0 | −5.0 | −5.0 | −5.0 |
|  | R2 (nm) | 275.0 | 275.0 | 275.0 | 275.0 |
|  | Rth2 (nm) | 137.50 | 137.50 | 137.50 | 137.50 |
|  | NZ | 1.00 | 1.00 | 1.00 | 1.00 |
| Fourth phase difference plate | Slow axis (deg) | 130.0 | 40.0 | 130.0 | 40.0 |
|  | R4 (nm) | 11.1 | 11.1 | 22.2 | 22.2 |
|  | Rth4 (nm) | −49.95 | −49.95 | −99.9 | −99.9 |
|  | NZ | −4.00 | −4.00 | −4.00 | −4.00 |
| Second polarizing plate | Absorption axis (deg) | 130.0 | 130.0 | 130.0 | 130.0 |
| Sum of thickness direction retardations | RthS (nm) | 312.6 | 312.6 | 212.7 | 212.7 |
| Black display transmittance (Polar angle 60°) | Maximum | 0.172 | 0.191 | 0.089 | 0.132 |
|  | Average | 0.081 | 0.092 | 0.040 | 0.060 |

In the liquid crystal display panels according to Examples 7-18 to 7-29, biaxial phase difference plates having negative thickness direction retardations are used as the third phase difference plate 32b and the fourth phase difference plate 34b. In the liquid crystal display panels according to Examples 7-18 to 7-21, the NZ of the third phase difference plate 32b and the fourth phase difference plate 34b are −2. In the liquid crystal display panels according to Examples 7-22 to 7-25, the NZ of the third phase difference plate 32b and the fourth phase difference plate 34b are −3. In the liquid crystal display panels according to Examples 7-26 to 7-29, the NZ of the third phase difference plate 32b and the fourth phase difference plate 34b are −4.

In the liquid crystal display panels according to Examples 7-18 and 7-20, the values of the thickness direction retardations Rth3 and Rth4, and the values of the in-plane retardations R3 and R4, of the third and fourth phase difference plates 32b and 34b are different. Likewise, in the liquid crystal display panels according to Examples 7-19 and 7-21, the values of the thickness direction retardations Rth3 and Rth4, and the values of the in-plane retardations R3 and R4, of the third and fourth phase difference plates 32b and 34b are different. In comparing these results, as the absolute value of the sum RthS of the thickness direction retardation decreases, a better black display when observed from oblique viewing angles is achieved.

In the liquid crystal display panels according to Examples 7-18 and 7-19, the angle formed by the absorption axis of the first polarizing plate 22 and the slow axis of the third phase difference plate 32b, and the angle formed by the absorption axis of the second polarizing plate 24 and the slow axis of the fourth phase difference plate 34b, are different from each other. In the liquid crystal display panel according to Example 7-18, the absorption axis of the first polarizing plate 22 and the slow axis of the third phase difference plate 32b are parallel to each other, and the absorption axis of the second polarizing plate 24 and the slow axis of the fourth phase difference plate 34b are parallel to each other. However, in the liquid crystal display panel according to Example 7-19, the absorption axis of the first polarizing plate 22 and the slow axis of the third phase difference plate 32b are orthogonal to each other, and the absorption axis of the second polarizing plate 24 and the slow axis of the fourth phase difference plate 34b are orthogonal to each other. The liquid crystal display panels according to Examples 7-20 and 7-21 have the same relationship as the liquid crystal display panels according to Examples 7-18 and 7-19.

In comparing the results of the liquid crystal display panels according to Examples 7-18 and 7-19, the liquid crystal display panel according to Example 7-18 has a lower black display transmittance, and achieves a better black display when observed from oblique viewing angles, despite the sums of the thickness direction retardations being the same. The liquid crystal display panels according to Examples 7-20 and 7-21 also have similar results. It can be seen that compared to a case where the absorption axis of the first polarizing plate 22 and the slow axis of the third phase difference plate 32b are orthogonal and the absorption axis of the second polarizing plate 24 and the slow axis of the fourth phase difference plate 34b are orthogonal to each other, it is preferable that the absorption axis of the first polarizing plate 22 and the slow axis of the third phase difference plate 32b be parallel to each other and the absorption axis of the second polarizing plate 24 and the slow axis of the fourth phase difference plate 34b be parallel to each other. To rephrase, it can be seen that preferably, the polarization axis (transmission axis) of the first polarizing plate 22 and the slow axis of the third phase difference plate 32b be orthogonal to each other, and the polarization axis (transmission axis) of the second polarizing plate 24 and the slow axis of the fourth phase difference plate 34b be orthogonal to each other.

The liquid crystal display panels according to Examples 7-22 to 7-25 and 7-26 to 7-29 have the same relationship as the liquid crystal display panels according to Examples 7-18 to 7-21.

Examples 7-10 to 7-13 (where the NZ of the third and fourth phase difference plates 32b and 34b is −1), Examples 7-18 to 7-21 (where the NZ of the third and fourth phase difference plates 32b and 34b is −2), Examples 7-22 to 7-25 (where the NZ of the third and fourth phase difference plates 32b and 34b is −3), and Examples 7-26 to 7-29 (where the NZ of the third and fourth phase difference plates 32b and 34b is −4), will be compared. In comparing Examples 7-4 to 7-8 (where the third and fourth phase difference plates 32b and 34b are positive C plates and the NZ is −∞) as well, it can be seen that a biaxial phase difference plate approaches a positive C plate as the absolute value of the NZ of the biaxial phase difference plate increases. For example, in comparing Examples 7-12, 7-20, 7-24, 7-28, and 7-5, in which the thickness direction retardations Rth3 and Rth4 of the third and fourth phase difference plates 32b and 34b are all 100 nm, the black display transmittance increases as the absolute value of the NZ increases, and approaches the value of the black display transmittance in the positive C plate (Example 7-5). Furthermore, with respect to the angle formed by the absorption axis of the first polarizing plate 22 and the slow axis of the third phase difference plate 32*b*, and the angle formed by the absorption axis of the second polarizing plate 24 and the slow axis of the fourth phase difference plate 34*b*, in comparing Examples 7-13, 7-21, 7-25, 7-29, and 7-5, the black display transmittance decreases as the absolute value of the NZ increases, and approaches the value of the black display transmittance of a positive C plate (Example 7-5). As the absolute value of the NZ of a biaxial phase difference plate increases, the change (dependence) of the black display transmittance with respect to the angle formed by the absorption axis of the first polarizing plate 22 and the slow axis of the third phase difference plate 32*b*, and the angle formed by the absorption axis of the second polarizing plate 24 and the slow axis of the fourth phase difference plate 34*b*, decreases; from this too, it can be seen that the biaxial phase difference plate approaches a positive C plate. For example, it can be seen that a biaxial phase difference plate in which the NZ is less than −4 can substantially be considered to be a positive C plate.

An angle formed by the absorption axis of the first polarizing plate 22 and the slow axis of the third phase difference plate 32*b* is typically substantially 0° or substantially 90°, as in the liquid crystal display panels according to Examples 7-18 to 7-29. However, the present embodiment is not limited thereto. Likewise, the angle formed by the absorption axis of the second polarizing plate 24 and the slow axis of the fourth phase difference plate 34*b* is typically substantially 0° or substantially 90°, as in the liquid crystal display panels according to Examples 7-18 to 7-29. However, the present embodiment is not limited thereto.

The in-plane retardations of the liquid crystal display panels according to Examples 7-18 to 7-29 will be discussed next. The slow axis of the first phase difference plate 32*a* and the slow axis of the second phase difference plate 34*a* (azimuth angle −5°) are arranged orthogonal to the liquid crystal director (azimuth angle 85°). $\Delta$nd=R1+R2 is satisfied, and thus $\Delta$nd and R1+R2 cancel each other out. The in-plane retardation R3 of the third phase difference plate 32*b* and the in-plane retardation R4 of the fourth phase difference plate 34*b* are equal. The slow axis of the third phase difference plate 32*b* (azimuth angle 40° in Examples 7-18, 7-20, 7-22, 7-24, 7-26, and 7-28; azimuth angle 130° in Examples 7-19, 7-21, 7-23, 7-25, 7-27, and 7-29) and the slow axis of the fourth phase difference plate 34*b* (azimuth angle 130° in Examples 7-18, 7-20, 7-22, 7-24, 7-26, and 7-28; azimuth angle 40° in Examples 7-19, 7-21, 7-23, 7-25, 7-27, and 7-29) are orthogonal to each other. Accordingly, the in-plane retardation R3 of the third phase difference plate 32*b* and the in-plane retardation R4 of the fourth phase difference plate 34*b* cancel each other out. Thus, the in-plane retardations of the liquid crystal display panels according to Examples 7-18 to 7-29 become substantially zero, and thus when observed from a forward viewing angle too, a good black display is achieved when no voltage is applied.

As indicated by Examples 7-4 to 7-29, the angle formed by the absorption axis of the first polarizing plate 22 and the slow axis of the first phase difference plate 32*a* is typically substantially 45° or substantially 135° in the liquid crystal display panels 100B, 100B1 to 100B3, 100C1, and 100C2 according to the present embodiment. An angle formed by the absorption axis of the second polarizing plate 24 and the slow axis of the second phase difference plate 34*a* is typically substantially 45° or substantially 135°. However, the present embodiment is not limited thereto, and can be adjusted as appropriate.

The liquid crystal display panels according to embodiments of the present invention (including the first and second embodiments) can be produced using a known production method for a transverse electrical field mode liquid crystal cell. Processes for attaching the polarizing plates and the phase difference plates to the liquid crystal cell in a predetermined direction also can of course be carried out using a known method.

The liquid crystal cell 10 of the liquid crystal display panels 100, 100A, 100B, 100B1, 100B2, 100B3, 100C1, and 100C2 can be produced as follows, for example.

The bottom-side substrate 10 is prepared through a known method. For example, circuit elements such as TFTs, gate bus lines, source bus lines, and common wiring are formed on the glass substrate 32*a*. The common electrode 14, the dielectric layer 15, and the pixel electrodes 16 are then formed. An alignment film is formed on the liquid crystal layer 18-side surface of the bottom-side substrate 10Sa. The alignment film is then subjected to a rubbing treatment, for example, so that the liquid crystal molecules near the bottom-side substrate 10 are aligned in a predetermined direction.

The top-side substrate 10 produced through a known method is then prepared. The top-side substrate 10 has, for example, a black matrix and a color filter layer upon the glass substrate 12*b*, and has an alignment film on the liquid crystal layer 18 side. The alignment film is then subjected to a rubbing treatment, for example, so that the liquid crystal molecules near the top-side substrate 10Sb are aligned in a predetermined direction.

Controlling the thickness of the liquid crystal layer 18 using spacers formed on the bottom-side substrate 10Sa or the top-side substrate 10Sb, the liquid crystal layer 18 is formed through one drop filling, for example, and the bottom-side substrate 10Sa and the top-side substrate 10Sb are then affixed to each other to prepare the liquid crystal cell 10.

Note that the alignment treatment of the alignment film is not limited to a rubbing treatment, and an optical alignment treatment may be carried out using an optical alignment film. A rubbing treatment and an optical alignment treatment may be combined as well.

The TFT of the liquid crystal display panels 100, 100A, 100B, 100B1, 100B2, 100B3, 100C 1, and 100C2 according to embodiments of the present invention may be a known TFT such as an amorphous silicon TFT (a-Si TFT), a polysilicon TFT (p-Si TFT), or a microcrystalline silicon TFT (μC-Si TFT), but it is preferable to use a TFT having an oxide semiconductor layer (an oxide TFT). Using an oxide TFT makes it possible to reduce the surface area of the TFT, and thus the pixel aperture ratio can be increased.

The oxide semiconductor included in the oxide semiconductor layer may be an amorphous oxide semiconductor or a crystalline oxide semiconductor having a crystalline part. A polycrystalline oxide semiconductor, a microcrystalline oxide semiconductor, and a crystalline oxide semiconductor in which the c-axis is oriented substantially orthogonal to the layer surface can be given as examples of the crystalline oxide semiconductor.

The oxide semiconductor layer may have a layered structure including two or more layers. In a case where the oxide semiconductor layer has a layered structure, the oxide semiconductor layer may include an amorphous oxide semiconductor layer and a crystalline oxide semiconductor layer.

Alternatively, a plurality of crystalline oxide semiconductor layers having different crystal structures may be included. In addition, a plurality of amorphous oxide semiconductor layers may be included. In a case where the oxide semiconductor layer has a two-layer structure including an upper layer and a lower layer, the energy gap of the oxide semiconductor included in the upper layer is preferably greater than the energy gap of the oxide semiconductor included in the lower layer. However, in a case where the difference in energy gap between these layers is comparatively small, the energy gap of the lower-layer oxide semiconductor may be greater than the energy gap of the upper-layer oxide semiconductor.

A material, a structure, and a film formation method of the amorphous oxide semiconductor and each of the above-described crystalline oxide semiconductors, a configuration of an oxide semiconductor layer having a layered structure, and the like are described in, for example, JP 2014-007399 A. The entire contents of JP 2014-007399 A are incorporated into the present specification by reference.

The oxide semiconductor layer may include at least one metal element selected from In, Ga, and Zn, for example. The oxide semiconductor layer includes, for example, an In—Ga—Zn—O semiconductor (indium-gallium-zinc oxide, for example). Here, the In—Ga—Zn—O semiconductor is a ternary oxide of In (indium), Ga (gallium), and Zn (zinc); the ratio of In, Ga, and Zn (the composition ratio) is not particularly limited, and includes, for example, In:Ga:Zn=2:2:1, In:Ga:Zn=1:1:1, In:Ga:Zn=1:1:2, and the like. Such an oxide semiconductor layer can be formed from an oxide semiconductor film including an In—Ga—Zn—O semiconductor. Note that a channel-etched TFT having an active layer including an oxide semiconductor such as an In—Ga—Zn—O semiconductor may be referred to as a "CE-OS-TFT".

The In—Ga—Zn—O semiconductor may be amorphous or crystalline. For a crystalline In—Ga—Zn—O semiconductor, a crystalline In—Ga—Zn—O semiconductor in which the c-axis is oriented generally perpendicular to the layer surface is preferable.

Note that JP 2014-007399 A, JP 2012-134475 A, and JP 2014-209727 A, for example, disclose crystal structures of crystalline In—Ga—Zn—O semiconductors. The entire contents of JP 2012-134475 A and JP 2014-209727 A are incorporated into the present specification by reference. A TFT having an In—Ga—Zn—O semiconductor layer has a high mobility (greater than 20 times that of an a-Si TFT) and a low leak current (less than 1/100th that of an a-Si TFT), and thus can be used favorably as a driving TFT (for example, a TFT included in a drive circuit provided on the same substrate as a display region including a plurality of pixels, in the periphery of the display region) and a pixel TFT (a TFT provided in a pixel).

The oxide semiconductor layer may include another oxide semiconductor, instead of an In—Ga—Zn—O semiconductor. For example, the oxide semiconductor layer may include an In—Sn—Zn—O semiconductor ($In_2O_3$—$SnO_2$—ZnO or InSnZnO, for example). The In—Sn—Zn—O semiconductor is a ternary oxide of in (indium), Sn (tin), and Zn (zinc). Alternatively, the oxide semiconductor layer may include an In—Al—Zn—O semiconductor, an In—Al—Sn—Zn—O semiconductor, a Zn—O semiconductor, an In—Zn—O semiconductor, a Zn—Ti—O semiconductor, a Cd—Ge—O semiconductor, a Cd—Pb—O semiconductor, CdO (cadmium oxide), a Mg—Zn—O semiconductor, an In—Ga—Sn—O semiconductor, an In—Ga—O semiconductor, a Zr—In—Zn—O semiconductor, an Hf—In—Zn—O semiconductor, an Al—Ga—Zn—O semiconductor, a Ga—Zn—O semiconductor, or the like.

INDUSTRIAL APPLICABILITY

The present invention is broadly applicable to liquid crystal display panels in transverse electrical field modes. The present invention is particularly suited to use in transverse electrical field mode liquid crystal display panels to be used outdoors.

REFERENCE SIGNS LIST

10 Liquid crystal cell
10Sa Bottom-side substrate (first substrate)
10Sb Top-side substrate (second substrate)
12*a*, 12*b* Transparent substrate (glass substrate)
14 Common electrode
15 Dielectric layer
16 Pixel electrode
16*a* Opening in pixel electrode (slit)
22 First polarizing plate
24 Second polarizing plate
32, 32*a* First phase difference plate
34, 34*a* Second phase difference plate
32*b* Third phase difference plate
34*b* Fourth phase difference plate
100, 100A, 100B, 100B1, 100B2, 100B3, 100C1, 100C2 Liquid crystal display panel

The invention claimed is:
1. A liquid crystal display panel comprising:
a liquid crystal cell including a bottom-side substrate, a top-side substrate, a liquid crystal layer, and an electrode pair, the top-side substrate being disposed on an observer side of the bottom-side substrate, the liquid crystal layer being provided between the bottom-side substrate and the top-side substrate, and the electrode pair being formed on one of the bottom-side substrate and the top-side substrate and generating a transverse electrical field in the liquid crystal layer;
a first polarizing plate disposed on an observer side of the liquid crystal cell;
a first phase difference plate disposed between the liquid crystal layer and the first polarizing plate and having an in-plane retardation R1;
a second polarizing plate disposed on a back surface side of the liquid crystal cell;
a second phase difference plate disposed between the second polarizing plate and the liquid crystal layer and having an in-plane retardation R2;
a third phase difference plate disposed between the liquid crystal layer and the first polarizing plate; and
a fourth phase difference plate disposed between the second polarizing plate and the liquid crystal layer,
wherein the liquid crystal layer includes a nematic liquid crystal and has a homogeneous alignment when no electrical field is applied, and Δnd is greater than or equal to 360 nm and less than or equal to 490 nm, where Δn represents a birefringence of the nematic liquid crystal and d represents a thickness of the liquid crystal layer,
the in-plane retardation R1 of the first phase difference plate is greater than or equal to 100 nm and less than or equal to 160 nm,
a thickness direction retardation of at least one of the first phase difference plate, the second phase difference plate, the third phase difference plate, and the fourth phase difference plate has a negative value, and a slow axis of the first phase difference plate and a slow axis of the second phase difference plate are substantially parallel to each other and substantially orthogonal to an azimuthal direction of a director of the nematic liquid crystal in the homogeneous alignment, wherein the third phase difference plate is disposed between the first phase difference plate and the first polarizing plate.

2. The liquid crystal display panel according to claim 1, wherein the third phase difference plate is disposed between the first phase difference plate and the liquid crystal layer.

3. The liquid crystal display panel according to claim 1, wherein the fourth phase difference plate is disposed between the second phase difference plate and the second polarizing plate.

4. The liquid crystal display panel according to claim 1, wherein the fourth phase difference plate is disposed between the second phase difference plate and the liquid crystal layer.

5. The liquid crystal display panel according to claim 1, wherein the thickness direction retardation of the third phase difference plate and the thickness direction retardation of the fourth phase difference plate are substantially equal.

6. The liquid crystal display panel according to claim 3, wherein a sum of Rth1+Rth2+Rth3+Rth4 is smaller than the Δnd of the liquid crystal layer, where Rth1 represents a thickness direction retardation of the first phase difference plate, Rth2 represents a thickness direction retardation of the second phase difference plate, Rth3 represents a thickness direction retardation of the third phase difference plate, and Rth4 represents a thickness direction retardation of the fourth phase difference plate.

7. The liquid crystal display panel according to claim 1, wherein a sum of Rth1+Rth2+Rth3+Rth4 is substantially zero, where Rth1 represents a thickness direction retardation of the first phase difference plate, Rth2 represents a thickness direction retardation of the second phase difference plate, Rth3 represents a thickness direction retardation of the third phase difference plate, and Rth4 represents a thickness direction retardation of the fourth phase difference plate.

8. The liquid crystal display panel according to claim 1, wherein at least one of the first phase difference plate, the second phase difference plate, the third phase difference plate, and the fourth phase difference plate is a phase difference plate having a negative thickness direction retardation and having a dual-axis refractive index ellipsoid.

9. The liquid crystal display panel according to claim 1, wherein the third phase difference plate has an in-plane retardation R3, the fourth phase difference plate has an in-plane retardation R4, the in-plane retardation R3 of the third phase difference plate and the in-plane retardation R4 of the fourth phase difference plate are substantially equal to one another, and a slow axis of the third phase difference plate and a slow axis of the fourth phase difference plate are substantially orthogonal to each other.

10. The liquid crystal display panel according to claim 1, wherein an absorption axis of the first polarizing plate and the slow axis of the third phase difference plate are substantially parallel to each other, and an absorption axis of the second polarizing plate and a slow axis of the fourth phase difference plate are substantially parallel to each other.

11. The liquid crystal display panel according to claim 1, wherein at least one of the third phase difference plate and the fourth phase difference plate is a positive C plate.

12. The liquid crystal display panel according to claim 1, wherein the in-plane retardation R3 of the third phase difference plate and the in-plane retardation R4 of the fourth phase difference plate are substantially zero.

13. A liquid crystal display panel comprising:

a liquid crystal cell including a bottom-side substrate, a top-side substrate, a liquid crystal layer, and an electrode pair, the top-side substrate being disposed on an observer side of the bottom-side substrate, the liquid crystal layer being provided between the bottom-side substrate and the top-side substrate, and the electrode pair being formed on one of the bottom-side substrate and the top-side substrate and generating a transverse electrical field in the liquid crystal layer;

a first polarizing plate disposed on an observer side of the liquid crystal cell;

a first phase difference plate disposed between the liquid crystal layer and the first polarizing plate and having an in-plane retardation R1;

a second polarizing plate disposed on a back surface side of the liquid crystal cell;

a second phase difference plate disposed between the second polarizing plate and the liquid crystal layer and having an in-plane retardation R2;

a third phase difference plate disposed between the liquid crystal layer and the first polarizing plate; and a fourth phase difference plate disposed between the second polarizing plate and the liquid crystal layer, wherein the liquid crystal layer includes a nematic liquid crystal and has a homogeneous alignment when no electrical field is applied, and Δnd is greater than or equal to 360 nm and less than or equal to 490 nm, where Δn represents a birefringence of the nematic liquid crystal and d represents a thickness of the liquid crystal layer, the in-plane retardation R1 of the first phase difference plate is greater than or equal to 100 nm and less than or equal to 160 nm, a thickness direction retardation of at least one of the first phase difference plate, the second phase difference plate, the third phase difference plate, and the fourth phase difference plate has a negative value, and a slow axis of the first phase difference plate and a slow axis of the second phase difference plate are substantially parallel to each other and substantially orthogonal to an azimuthal direction of a director of the nematic liquid crystal in the homogeneous alignment, wherein the fourth phase difference plate is disposed between the second phase difference plate and the liquid crystal layer.

14. The liquid crystal display panel according to claim 13, wherein the third phase difference plate is disposed between the first phase difference plate and the first polarizing plate.

15. The liquid crystal display panel according to claim 13, wherein the third phase difference plate is disposed between the first phase difference plate and the liquid crystal layer.

16. The liquid crystal display panel according to claim 13, wherein the fourth phase difference plate is disposed between the second phase difference plate and the second polarizing plate.

17. The liquid crystal display panel according to claim 13, wherein the thickness direction retardation of the third phase difference plate and the thickness direction retardation of the fourth phase difference plate are substantially equal.

18. The liquid crystal display panel according to claim 13, wherein a sum of Rth1+Rth2+Rth3+Rth4 is smaller than the Δnd of the liquid crystal layer, where Rth1 represents a thickness direction retardation of the first phase difference plate, Rth2 represents a thickness direction retardation of the second phase difference plate, Rth3 represents a thickness direction retardation of the third phase difference plate, and Rth4 represents a thickness direction retardation of the fourth phase difference plate.

19. The liquid crystal display panel according to claim 13, wherein a sum of Rth1+Rth2+Rth3+Rth4 is substantially zero, where Rth1 represents a thickness direction retardation of the first phase difference plate, Rth2 represents a thickness direction retardation of the second phase difference plate, Rth3 represents a thickness direction retardation of the third phase difference plate, and Rth4 represents a thickness direction retardation of the fourth phase difference plate.

20. The liquid crystal display panel according to claim 13, wherein at least one of the first phase difference plate, the second phase difference plate, the third phase difference plate, and the fourth phase difference plate is a phase difference plate having a negative thickness direction retardation and having a dual-axis refractive index ellipsoid.

21. The liquid crystal display panel according to claim 13, wherein the third phase difference plate has an in-plane retardation R3, the fourth phase difference plate has an in-plane retardation R4, the in-plane retardation R3 of the third phase difference plate and the in-plane retardation R4 of the fourth phase difference plate are substantially equal to one another, and a slow axis of the third phase difference plate and a slow axis of the fourth phase difference plate are substantially orthogonal to each other.

22. The liquid crystal display panel according to claim 13, wherein an absorption axis of the first polarizing plate and the slow axis of the third phase difference plate are substantially parallel to each other, and an absorption axis of the second polarizing plate and a slow axis of the fourth phase difference plate are substantially parallel to each other.

23. The liquid crystal display panel according to claim 13, wherein at least one of the third phase difference plate and the fourth phase difference plate is a positive C plate.

24. The liquid crystal display panel according to claim 13, wherein the in-plane retardation R3 of the third phase difference plate and the in-plane retardation R4 of the fourth phase difference plate are substantially zero.

* * * * *